United States Patent

[11] 3,622,705

[72] Inventors Winston Theodore Duerdoth Ruislip; Charles Joseph Hughes, London; John Frederick Hesketh, Greenford; John Roy Jarvis, St. Albans; Martin Reed, Watford; William Desmond Morton, Richkmansworth; William George Tilston Jones, London; Frank Trevor Ball, East Barnet; Norman Thorogood Thurlow, London, all of England

[21] Appl. No. 782,541
[22] Filed Dec. 10, 1968
[45] Patented Nov. 23, 1971
[73] Assignee Her Majesty's Postmaster General London, England
[32] Priority Dec. 11, 1967
[33] Great Britain
[31] 56,149/67

[54] TELECOMMUNICATION SWITCHING SYSTEMS
8 Claims, 58 Drawing Figs.

[52] U.S. Cl. .......... 179/15 AQ
[51] Int. Cl. .......... H04j 3/00
[50] Field of Search .......... 179/15 AT, 18.7 YA, 18, 18.9, 15 T, 15 BY, 15 AC

[56] References Cited

UNITED STATES PATENTS

| | | | |
|---|---|---|---|
| 3,263,030 | 7/1966 | Stiefel et al. | 179/15 AT |
| 3,311,883 | 3/1967 | Schmitz et al. | 179/18.7 YA |
| 3,347,992 | 10/1967 | Von Sanden et al. | 179/15 AT |
| 3,376,393 | 4/1968 | Sternung | 179/18.7 YA |
| 3,385,931 | 5/1968 | Lucas et al. | 179/18 |
| 3,449,526 | 6/1969 | Seemann et al. | 179/18.7 YA |
| 3,047,840 | 7/1962 | Harms et al. | 179/18 T |
| 3,217,106 | 11/1965 | Muroga et al. | 179/15 AT |
| 3,236,951 | 2/1966 | Yamamoto et al. | 179/15 AT |
| 3,340,363 | 9/1967 | Bour et al. | 179/15 AC |
| 3,433,899 | 3/1969 | Pfleiderer et al. | 179/15 AT |
| 3,461,242 | 8/1969 | Inose et al. | 179/15 AT |
| 3,324,248 | 6/1967 | Seemann et al. | 179/18.7 YA |

*Primary Examiner*—Kathleen H. Claffy
*Assistant Examiner*—David L. Stewart
*Attorney*—Hall & Houghton

ABSTRACT: A time division multiplex communication switching system employing pulse code modulation in which a connection between any two channels is effected by connecting the first channel to all available paths through the system, such paths incorporating time delays of different values including zero, and comparing at the output of the paths the time positions of the first channel and the time position of the second channel and selecting a path having a time position coincident with that of the second channel.

WINSTON T. DUERDOTH,
CHARLES J. HUGHES,
JOHN F. HESKETH,
JOHN R. JAVIS,
MARTIN REED,
WILLIAM D. MORTON,
WILLIAM G. T. JONES,
FRANK T. BALL,
NORMAN T. THURLOW

INVENTORS

BY Hall & Houghton

ATTORNEY

PART SYSTEM UNIT

PART SYSTEM UNIT

PART SYSTEM UNIT

PART SYSTEM UNIT

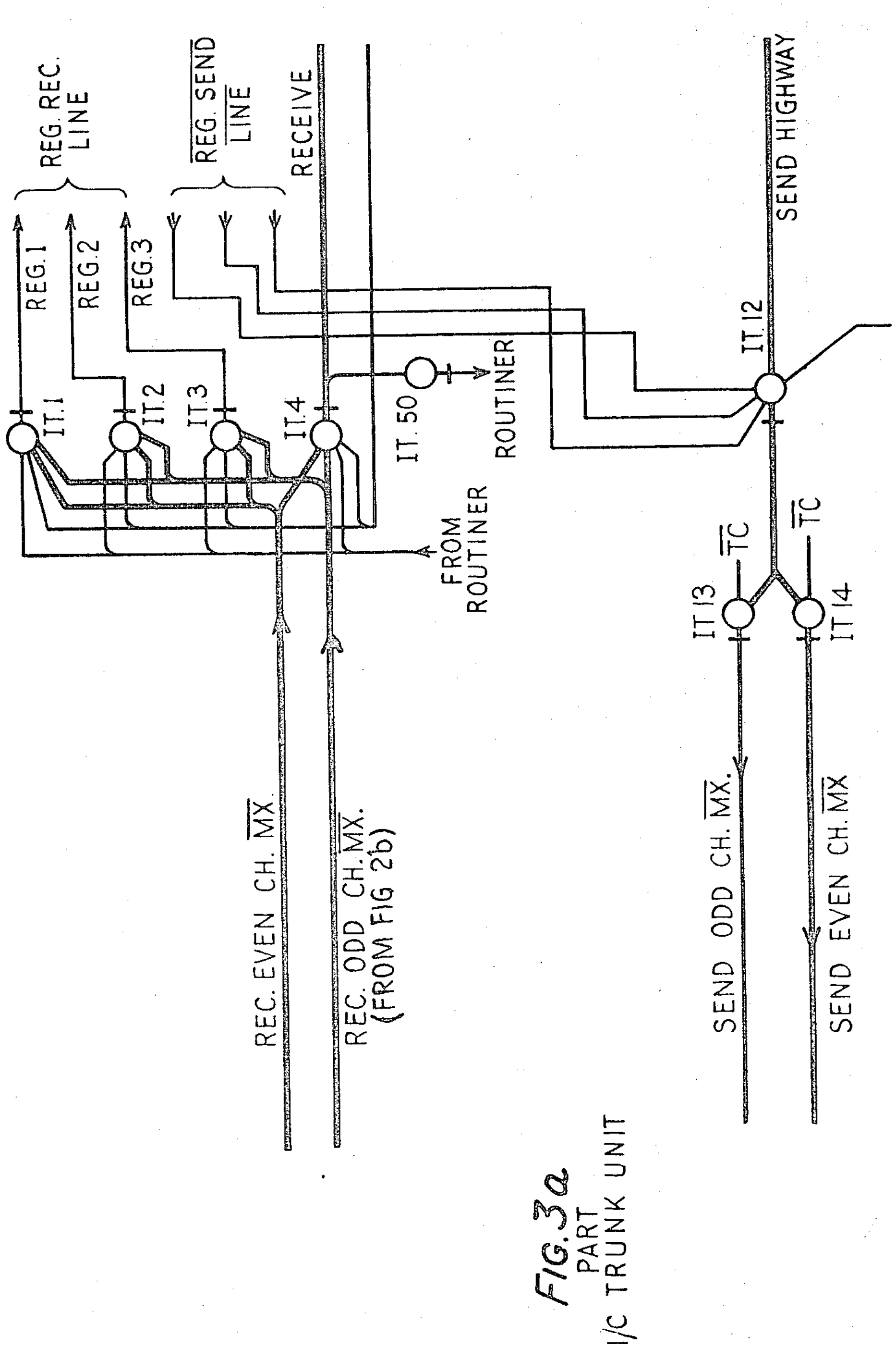
FIG. 3a PART I/C TRUNK UNIT

PART I/C TRUNK UNIT

PART I/C TRUNK UNIT

PART I/C TRUNK UNIT

PART I/C TRUNK UNIT

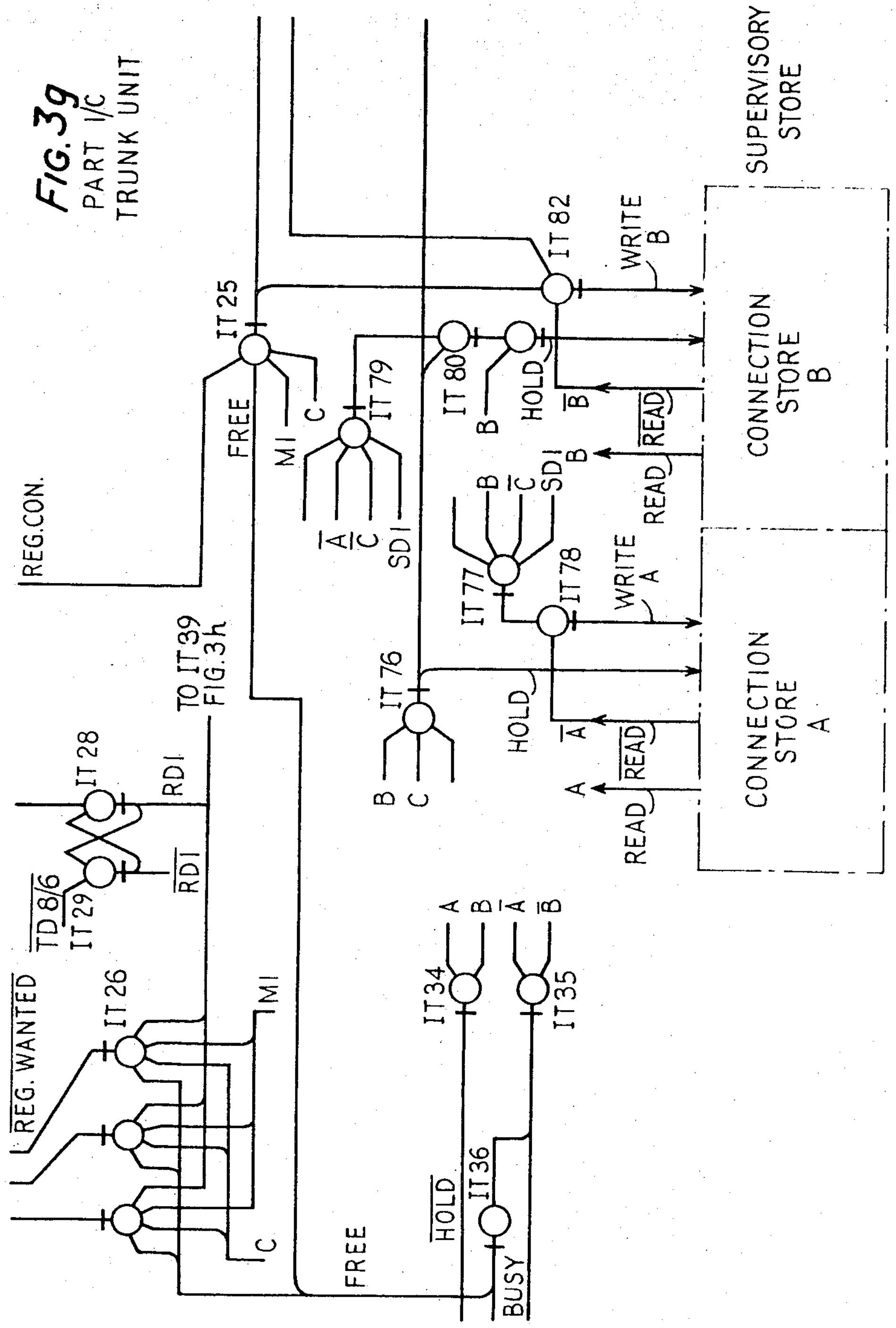
FIG. 3g PART I/C TRUNK UNIT

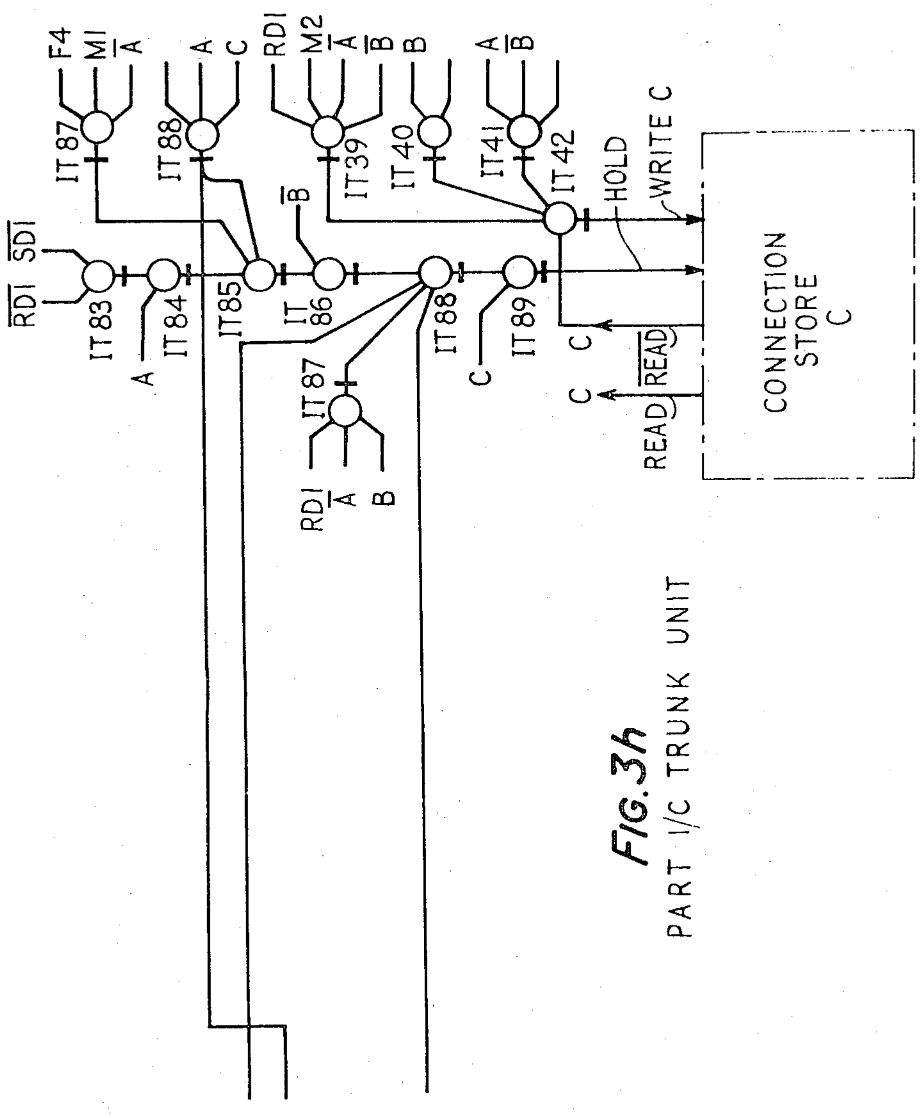
FIG. 3h PART I/C TRUNK UNIT

PART REGISTER CONNECTION SWITCH

| TRUNK NO. | STORE COMBINATIONS | | | |
|---|---|---|---|---|
| | A | B | C | D |
| 1 | 1 | 1 | 1 | 0 |
| 2 | 1 | 1 | 0 | 1 |
| 3 | 1 | 0 | 1 | 1 |
| 4 | 0 | 1 | 1 | 1 |

PART REGISTER CONNECTION SWITCH

PART REGISTER CONNECTION SWITCH

PART REGISTER CONNECTION SWITCH

PART REGISTER CONNECTION SWITCH

PART A SWITCH

PART A SWITCH

PART A SWITCH

TRUNK CODING

| I/C TRUNKS | STORE OUTPUTS Xpt A | B | C CHECK |
|---|---|---|---|
| T1 | 1 | 0 | 1 |
| T2 | 0 | 1 | 1 |
| T3 | 1 | 1 | 0 |
| FREE | 0 | 0 | 0 |

PART A SWITCH

PART A-B LINK/BZ SWITCH

PART
A-B LINK/
BZ SWITCH

PART A-B LINK/BZ SWITCH

| STORE CODING | | | |
|---|---|---|---|
| LINK | X pt | | CHECK |
| | A | B | C |
| 1 | 1 | 0 | 1 |
| 2 | 0 | 1 | 1 |
| 3 | 1 | 1 | 0 |
| FREE | 0 | 0 | 0 |

PART A-B LINK/
BZ SWITCH

PART
BI SWITCH

PART BI SWITCH

PART BI SWITCH

| STORE CODING | | | |
|---|---|---|---|
| I/C LINK | X pt A | X pt B | CHECK C |
| 1 | 1 | 0 | 1 |
| 2 | 0 | 1 | 1 |
| 3 | 1 | 1 | 0 |
| FREE | 0 | 0 | 0 |

PART BI SWITCH

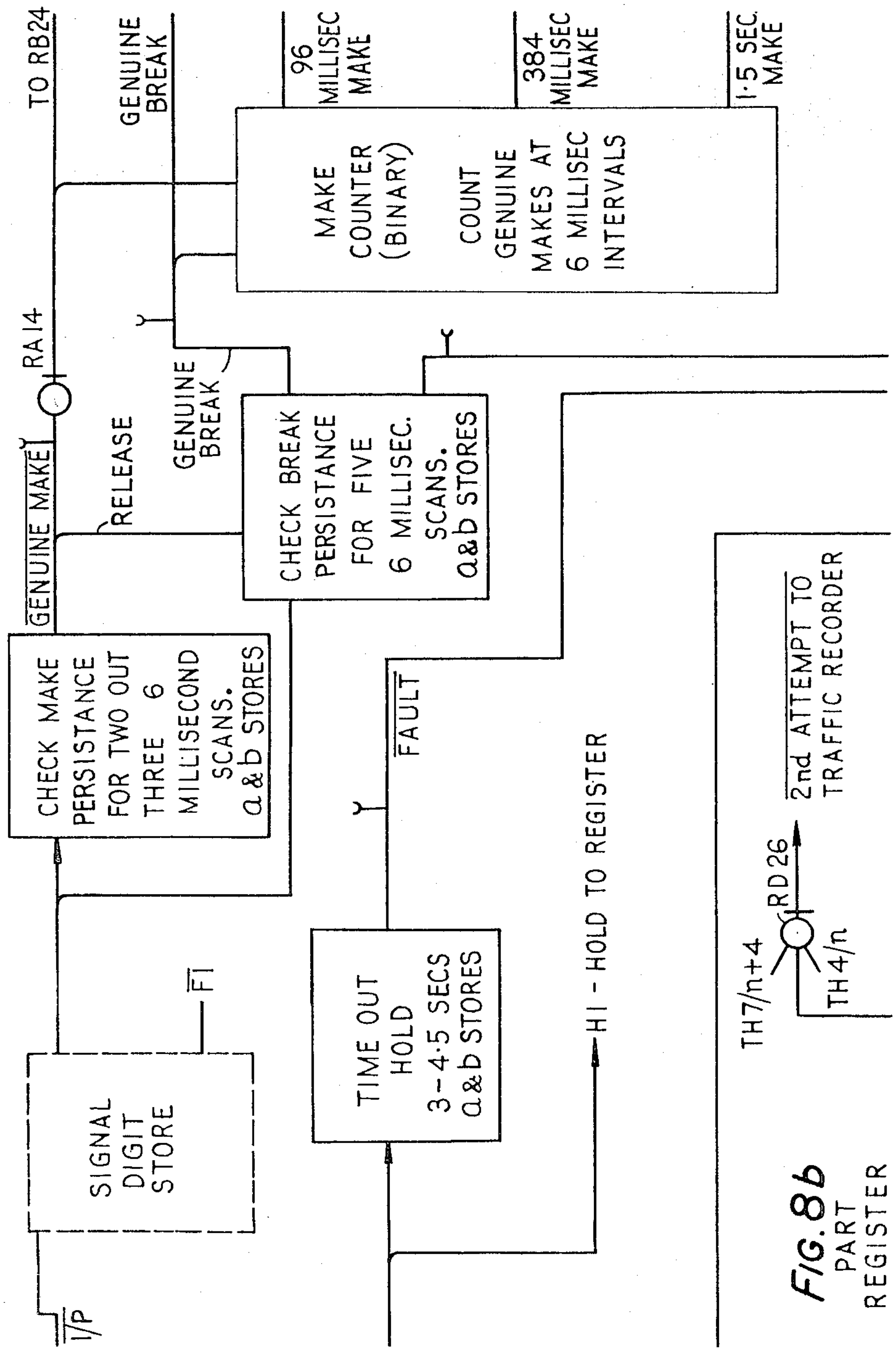
FIG. 8b PART REGISTER

FIG. 8d PART REGISTER
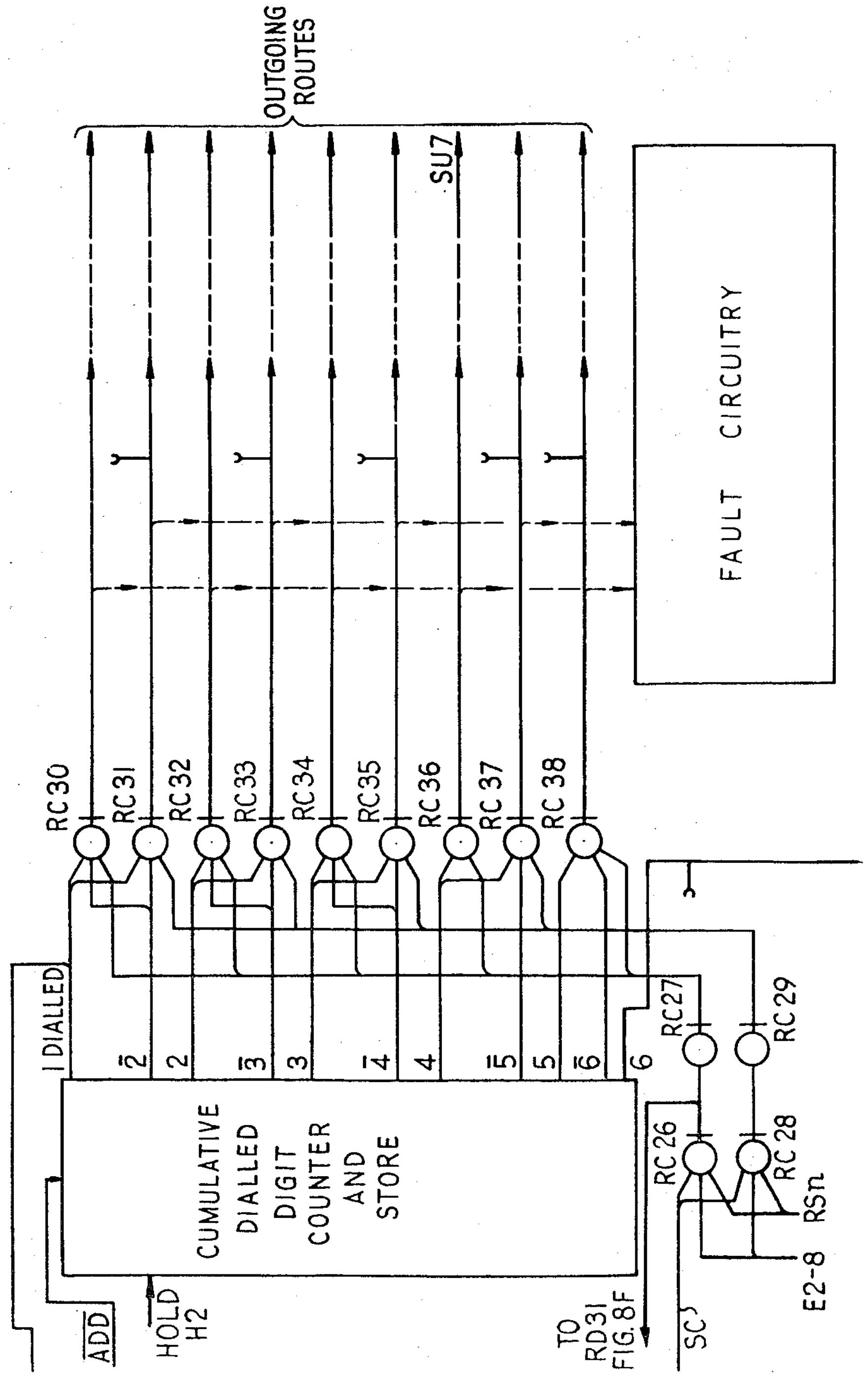

PART REGISTER

PART REGISTER

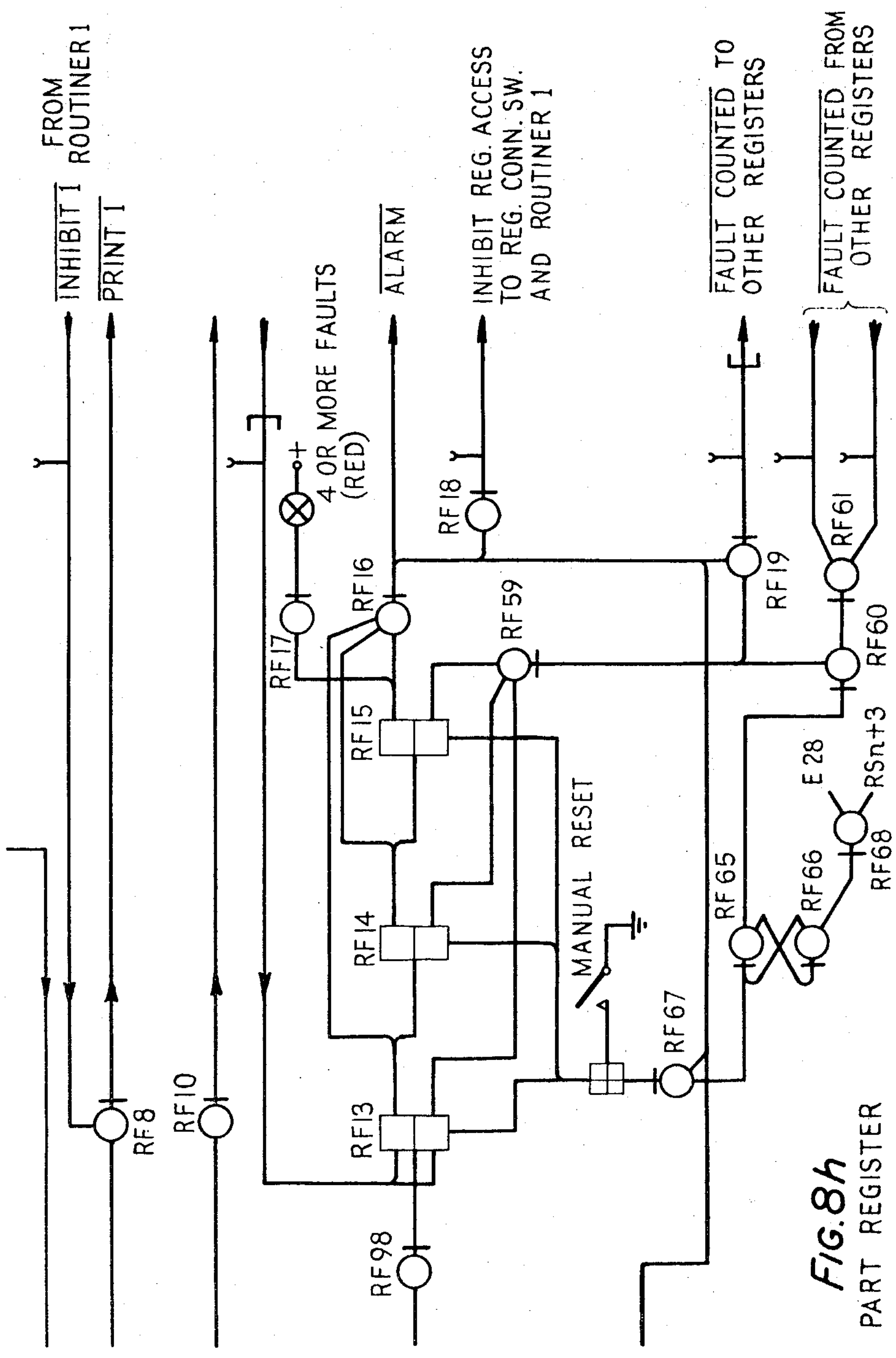
FIG. 8h PART REGISTER

B SWITCH COMMON UNIT

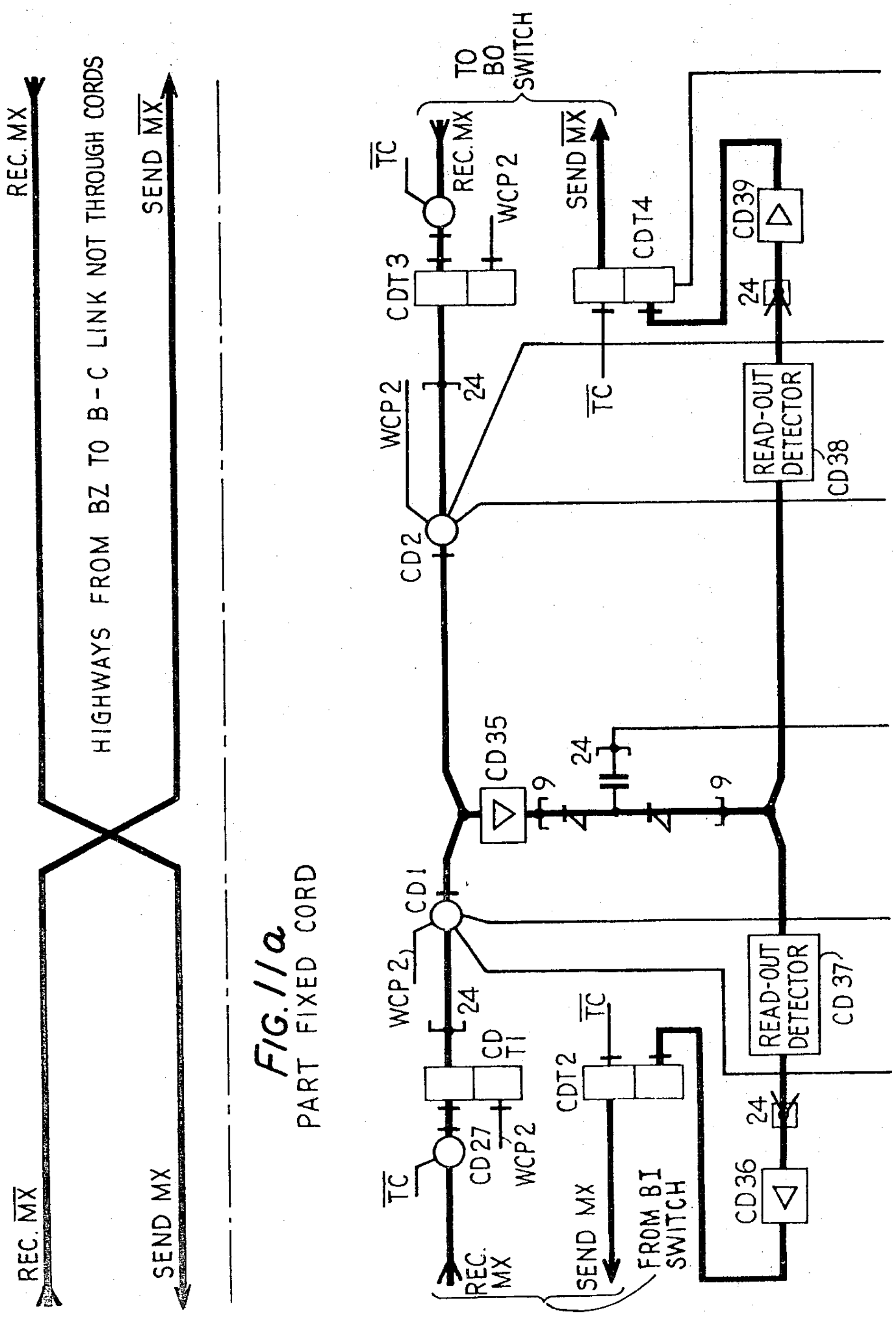
FIG. 11a PART FIXED CORD

PART FIXED CORD

PART VARIABLE DELAY CORD

PART VARIABLE DELAY CORD

PART BO SWITCH

PART BO SWITCH

PART BO SWITCH

NOTE.
WAVEFORMS FOR FIXED DELAY.
VARIABLE CORD USES E7, E9.

PART BO SWITCH

| STORE CODING | | | |
|---|---|---|---|
| LINK | X pt A | X pt B | CHECK C |
| 1 | 1 | 0 | 1 |
| 2 | 0 | 1 | 1 |
| 3 | 1 | 1 | 0 |
| FREE | 0 | 0 | 0 |

B-C LINK

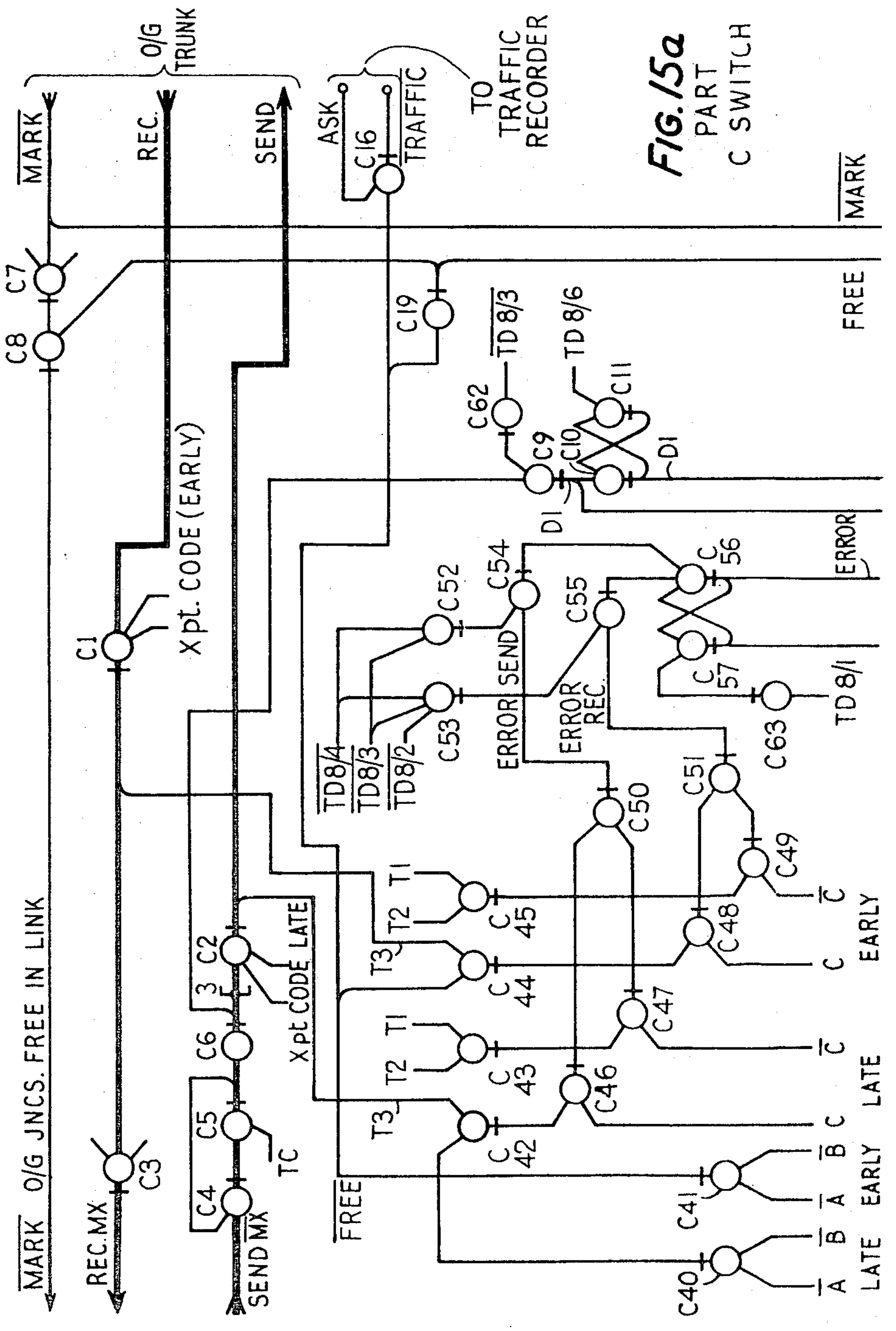
FIG. 15a PART C SWITCH

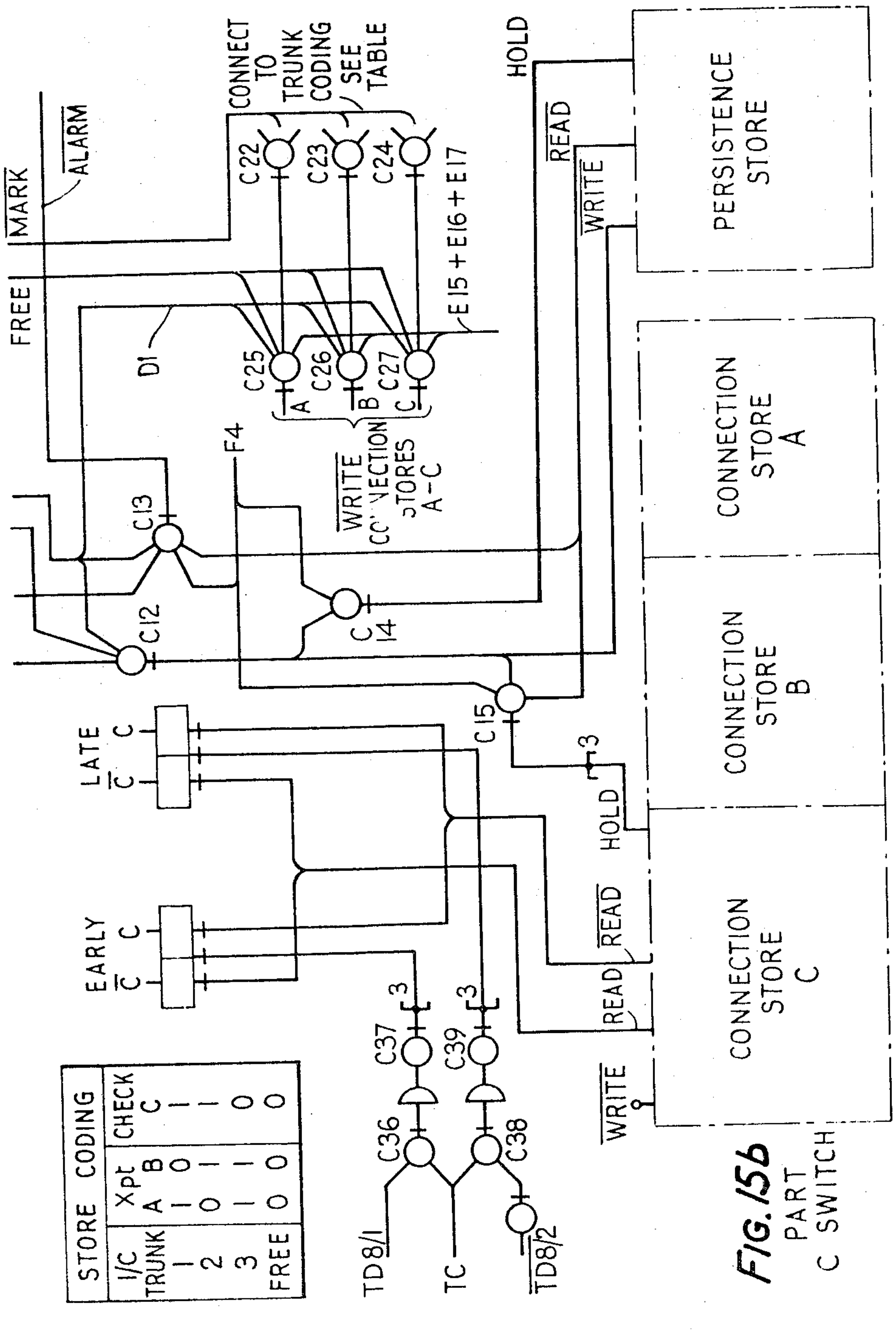
| STORE CODING | | | |
|---|---|---|---|
| I/C TRUNK | Xpt A | B | CHECK C |
| 1 | 1 | 0 | 1 |
| 2 | 0 | 1 | 1 |
| 3 | 1 | 1 | 0 |
| FREE | 0 | 0 | 0 |
FIG. 15b PART C SWITCH

PART O/G TRUNK UNIT

PART O/G TRUNK UNIT

PART O/G TRUNK UNIT

TELECOMMUNICATION SWITCHING SYSTEMS

This invention relates to time division multiplex (T.D.M.) telecommunication systems in which pulse code modulation P.C.M. is used. In particular the invention relates to automatic T.D.M. telephone exchange systems employing P.C.M. for the purposes of selecting circuits, switching the connections between circuits and for transmitting speech, and will be described in relation thereto.

The main object of the invention is the provision of an integrated pulse transmission and switching network in which switching takes place between P.C.M. systems, and in which P.C.M. pulses are directed to a required destination by a switching operation working directly with the pulses and not requiring a demodulation-switch-remodulation sequence.

SUMMARY OF THE INVENTION

In a T.D.M. switching system according to the invention, communication between a first P.C.M. channel and a second P.C.M. channel is established by indicating to said first P.C.M. channel all available routes over which a connection could be made, comparing the time position of said first P.C.M. channel with the time positions of the free P.C.M. channels in said available routes, selecting one time position channel in one of said available routes, and means for connecting said first P.C.M. channel with said selected channel, said means providing none or the required time delay between the time positions of said two channels.

According to a further feature of the invention, said means for providing none or the required time delay between the time positions of said two channels between which communication is to be established, comprises a number of different means, some providing no-delay, some providing fixed delay, and some providing variable delay, and in which in the selection for a channel, preference is given to said no-delay means before said fixed delay means, and if the no-delay means are not available, to the fixed delay means before the variable delay means.

If more than one second P.C.M. system is available to a wanted route, one of the available second P.C.M. systems is selected prior to the selection of the one time position channel.

DESCRIPTION OF THE PREFERRED EMBODIMENT

Figure 1:
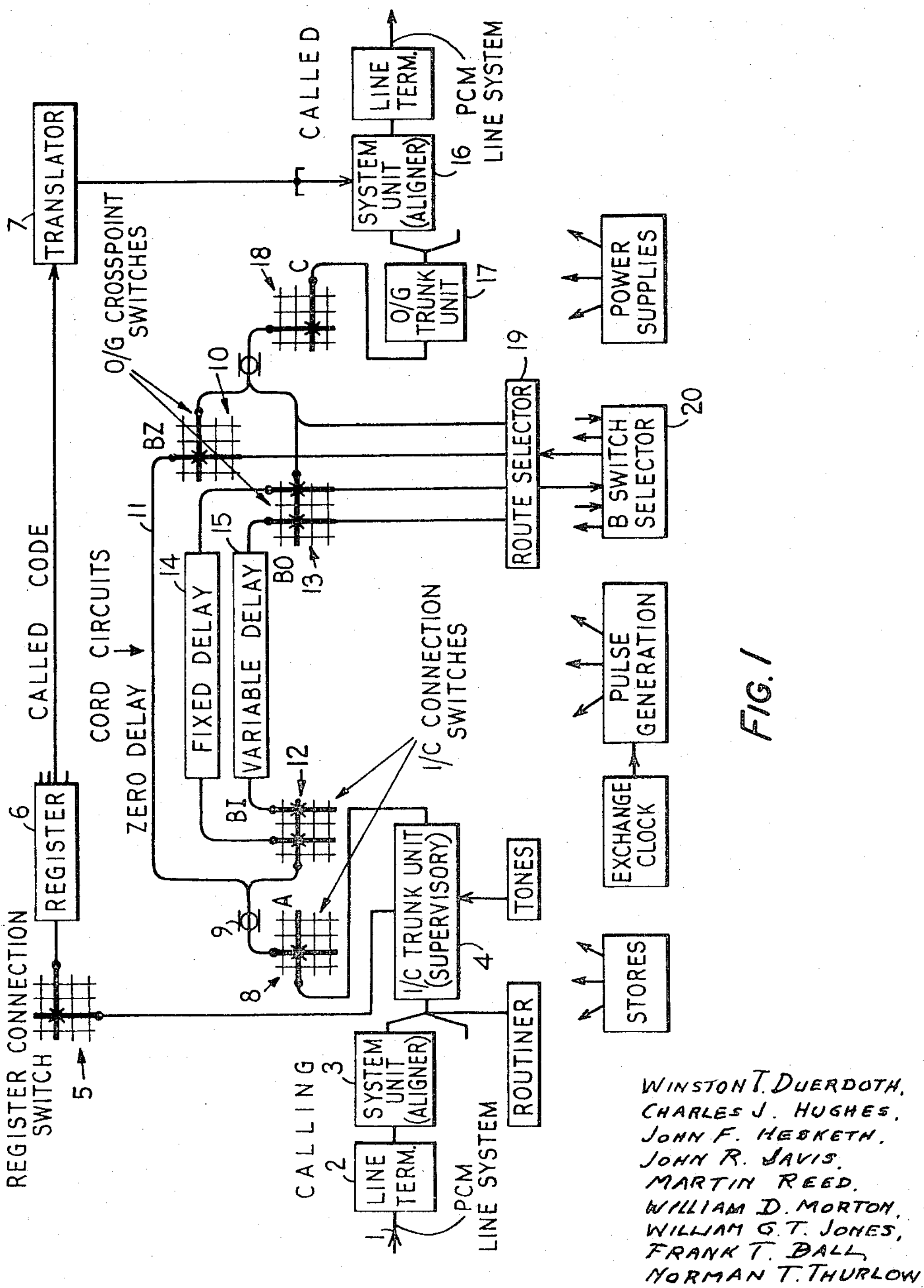
FIG. 1 Shows in block schematic form a P.C.M. Tandem Exchange embodying the invention, and FIGS. 2 *a–d*, 3 *a–h*, 4 *a–f*, 5 *a–d*, 6 *a–d*, 7 *a–d*, 8 *a–h*, 9, 10, 11 *a–b*, 13 *a–d*, 14, 15 *a–b*, 16 *a–d*, when assembled as shown in FIG. 17, show the exchange of FIG. 1 in greater detail.
Figure 2A:
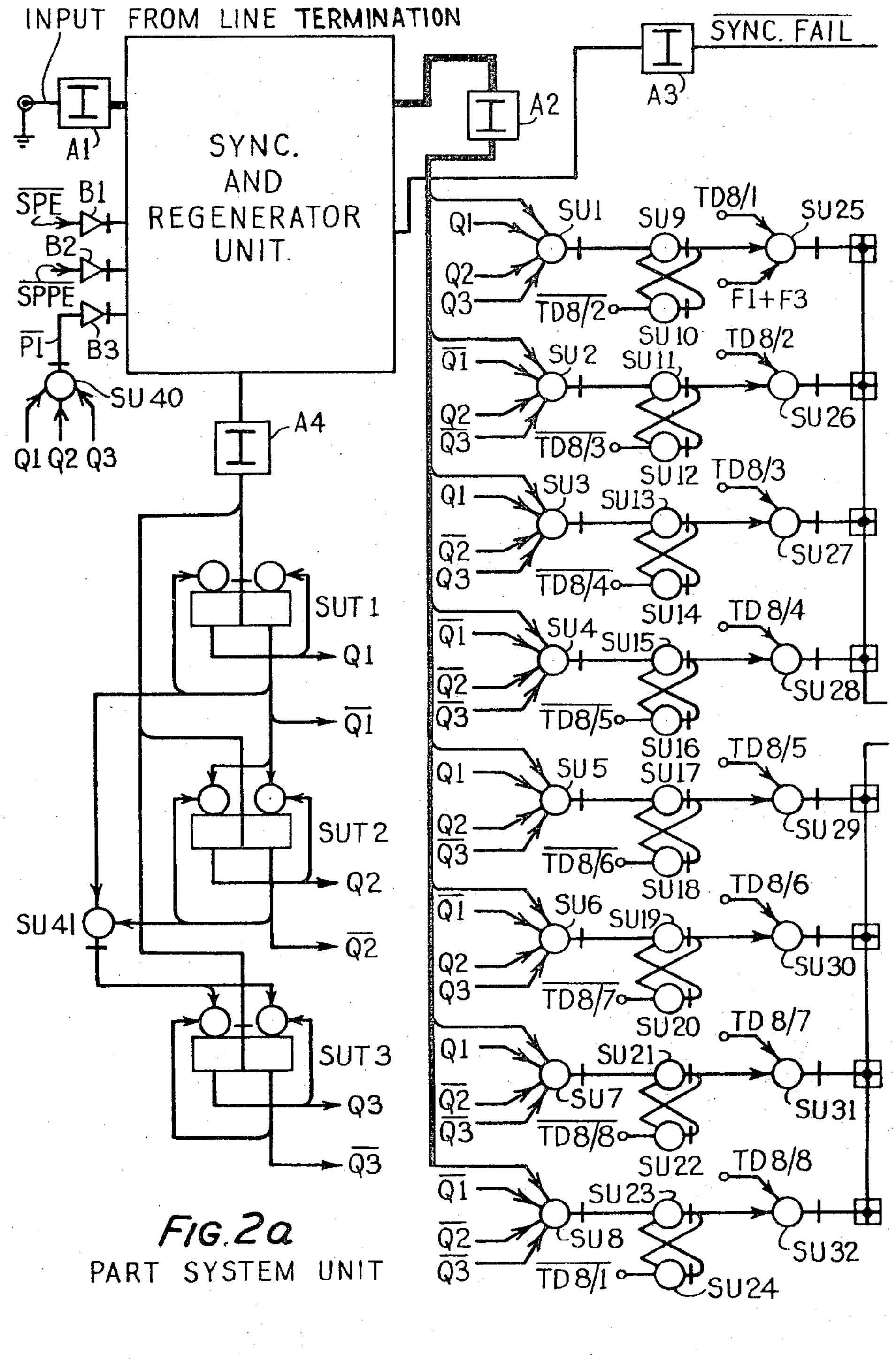
Figure 2B:
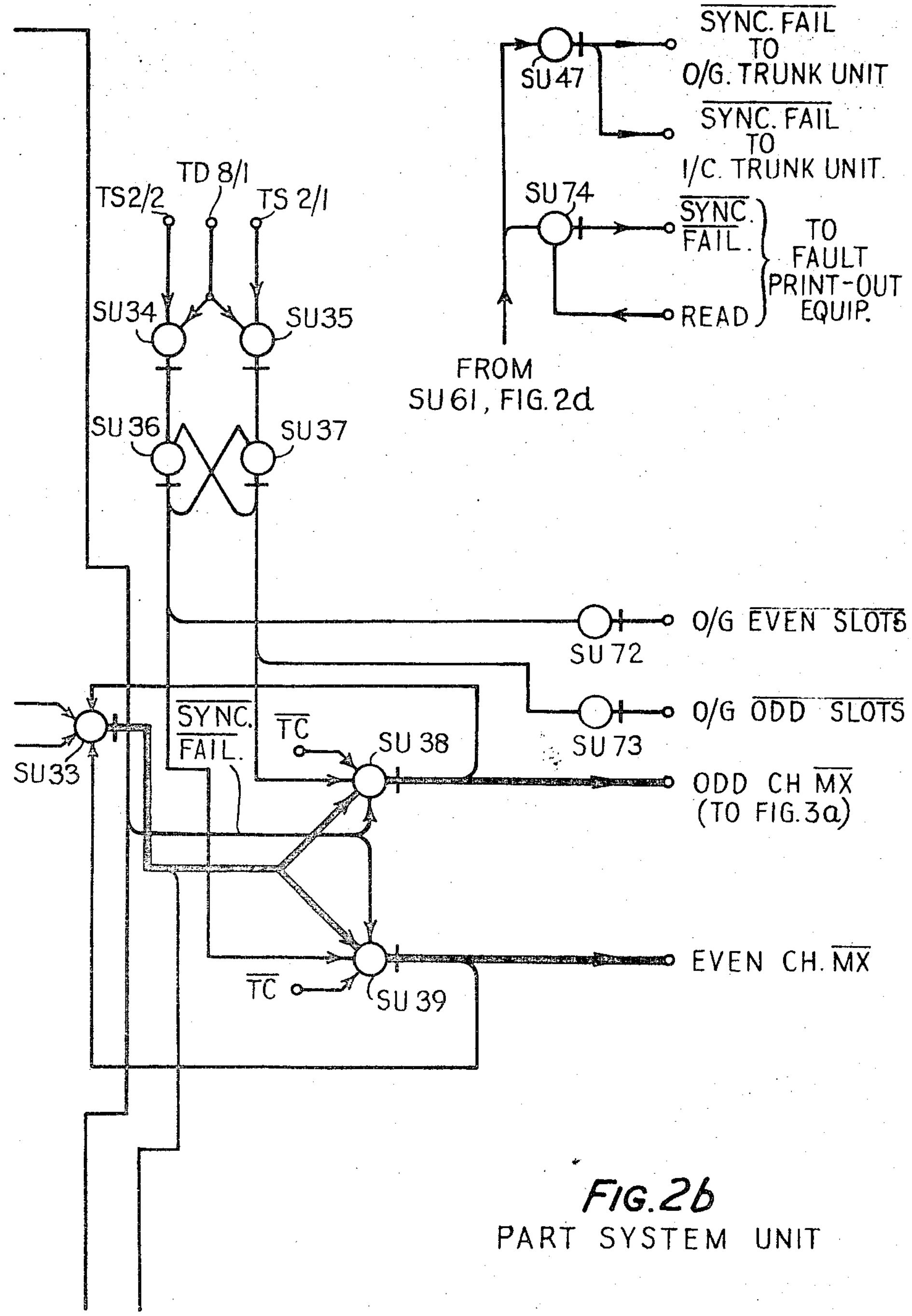
Figure 2C:
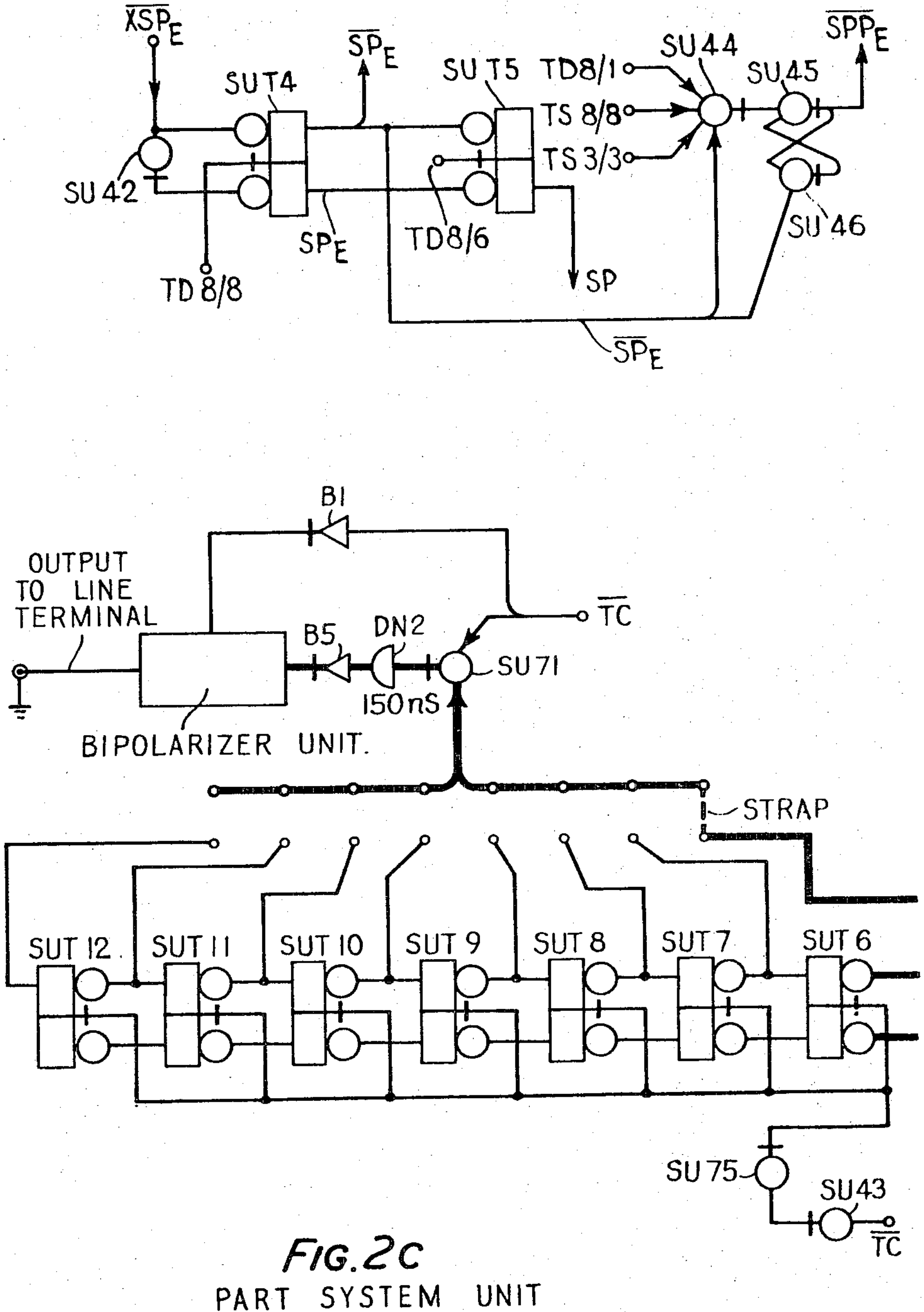
Figure 2D:
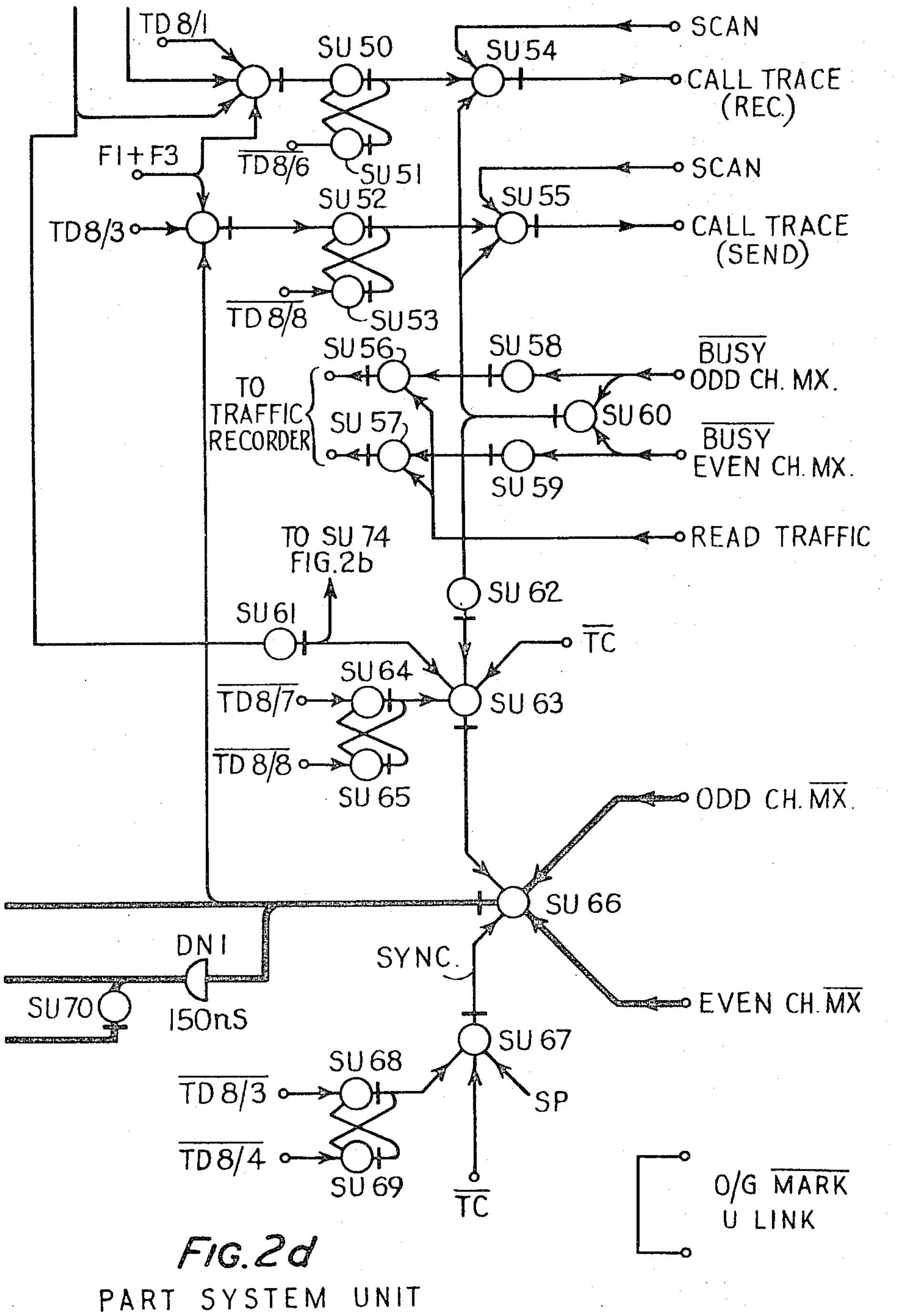
Figure 3B:
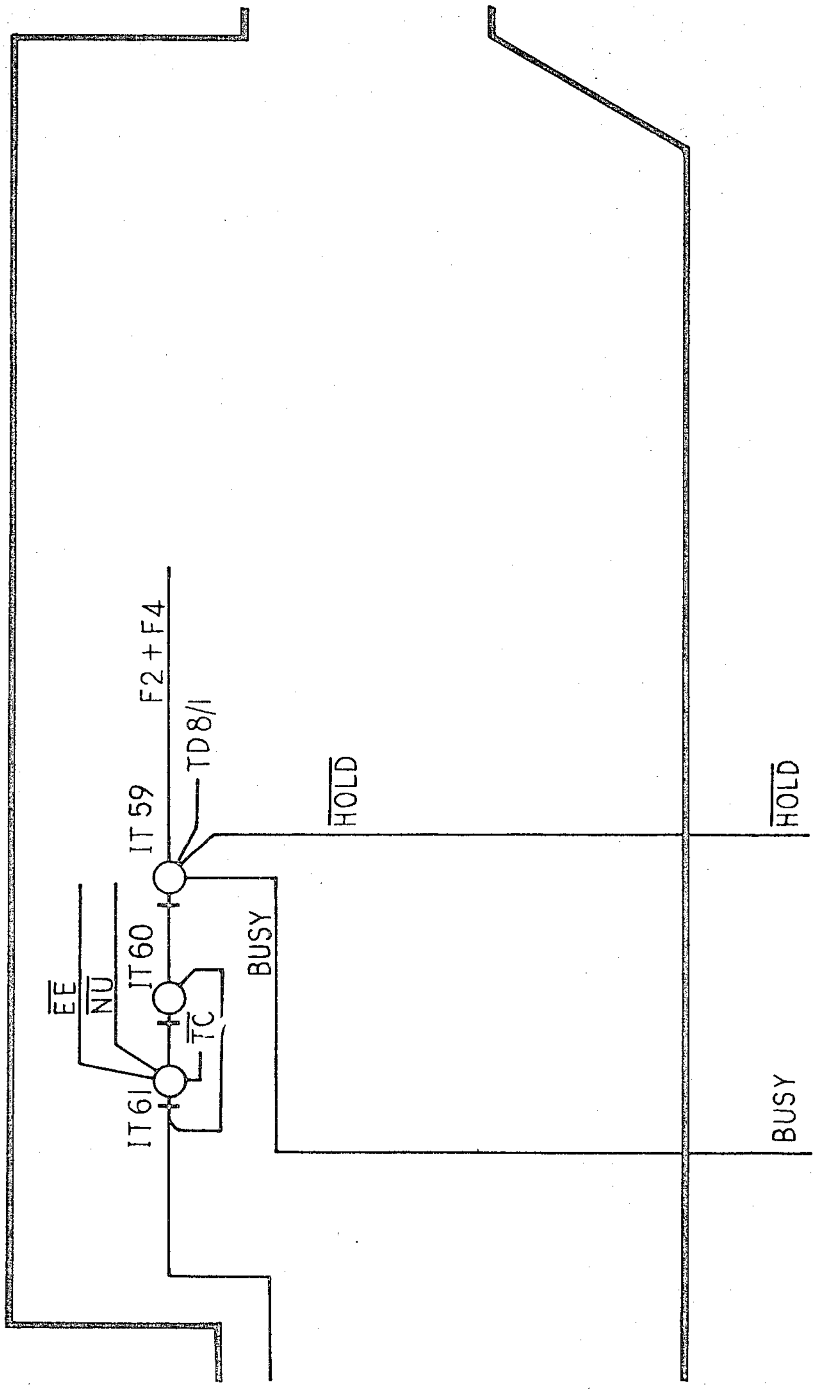
Figure 3C:
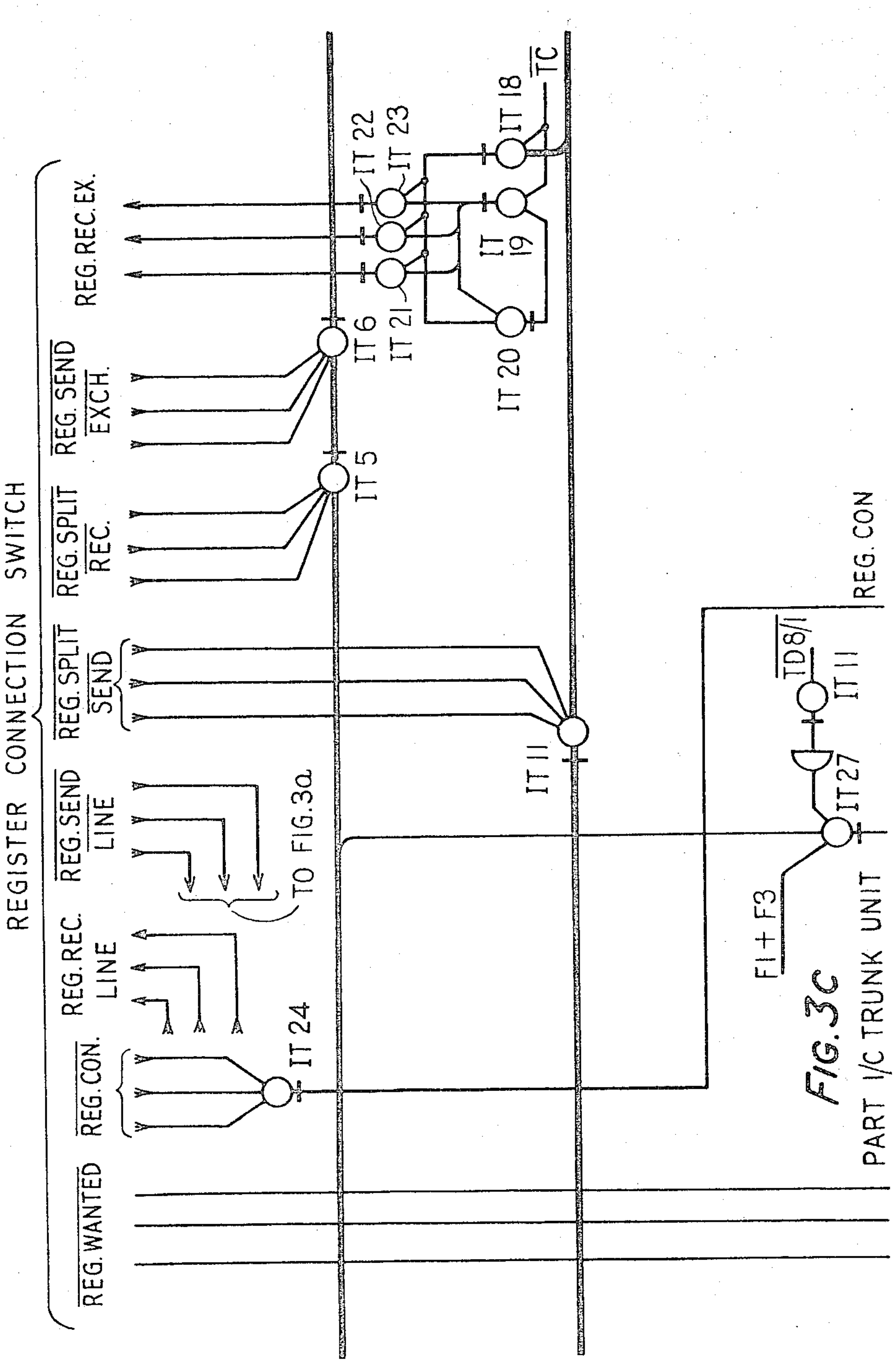
Figure 3E:
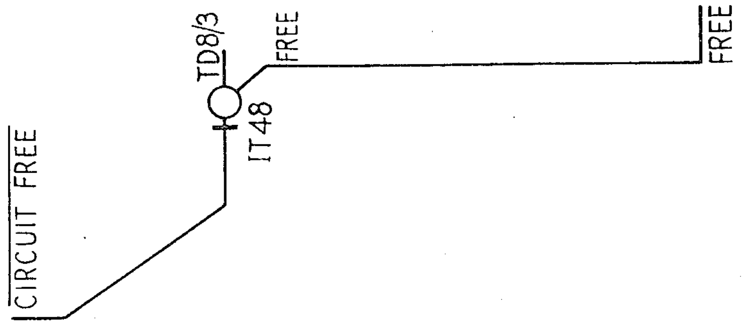
Figure 18:
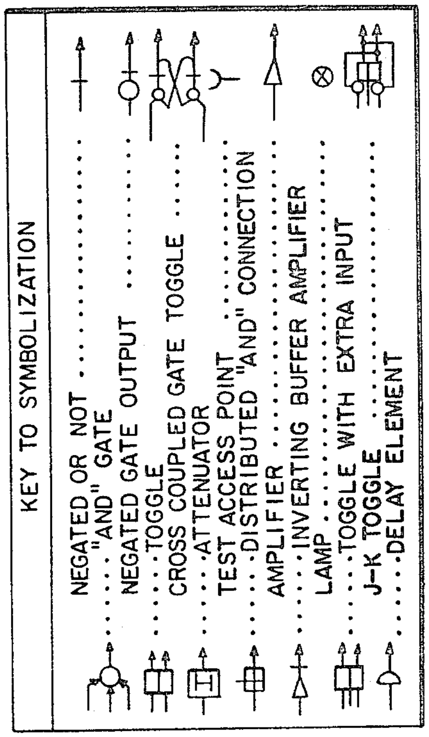
Figure 3D:
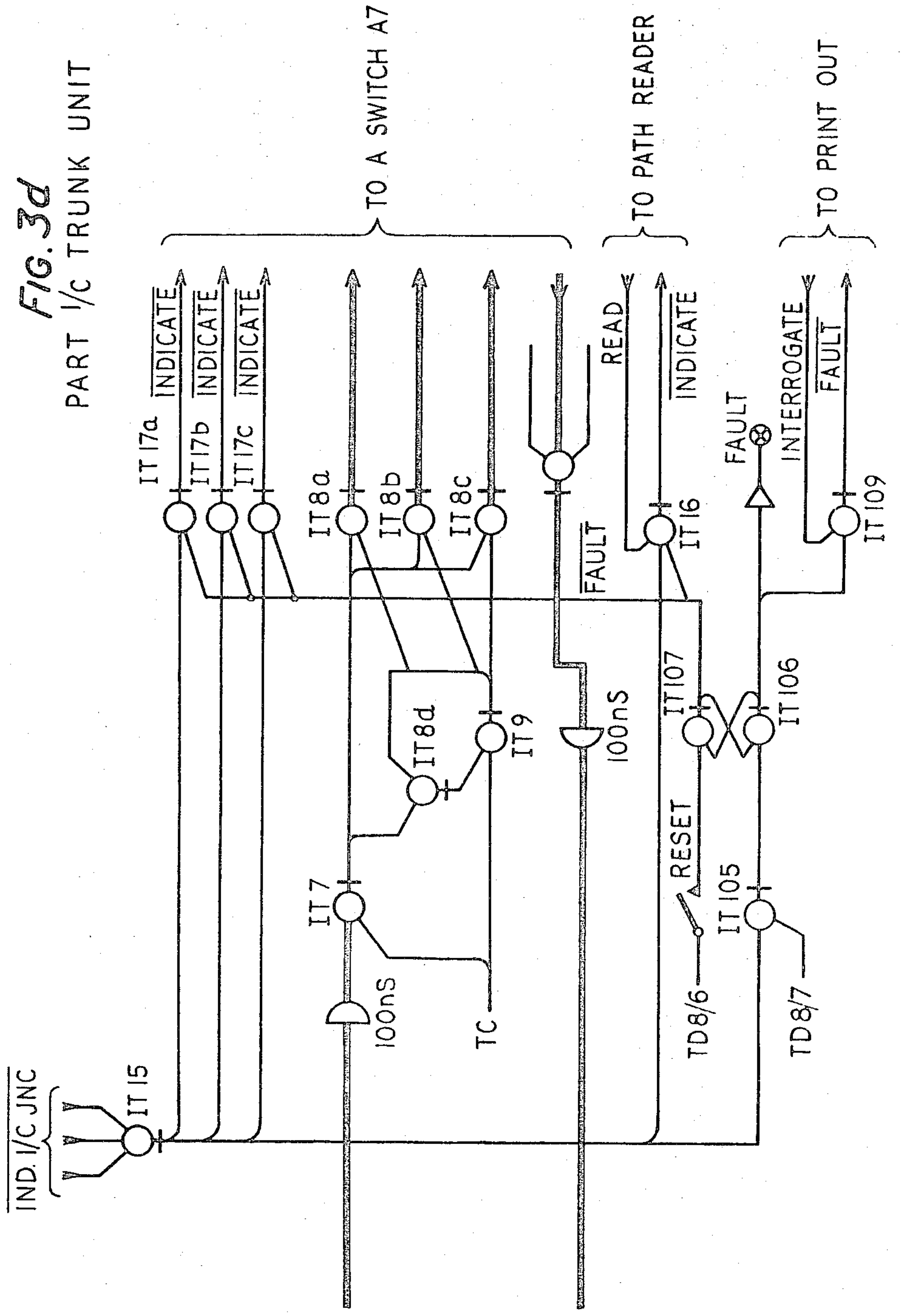
Figure 3F:
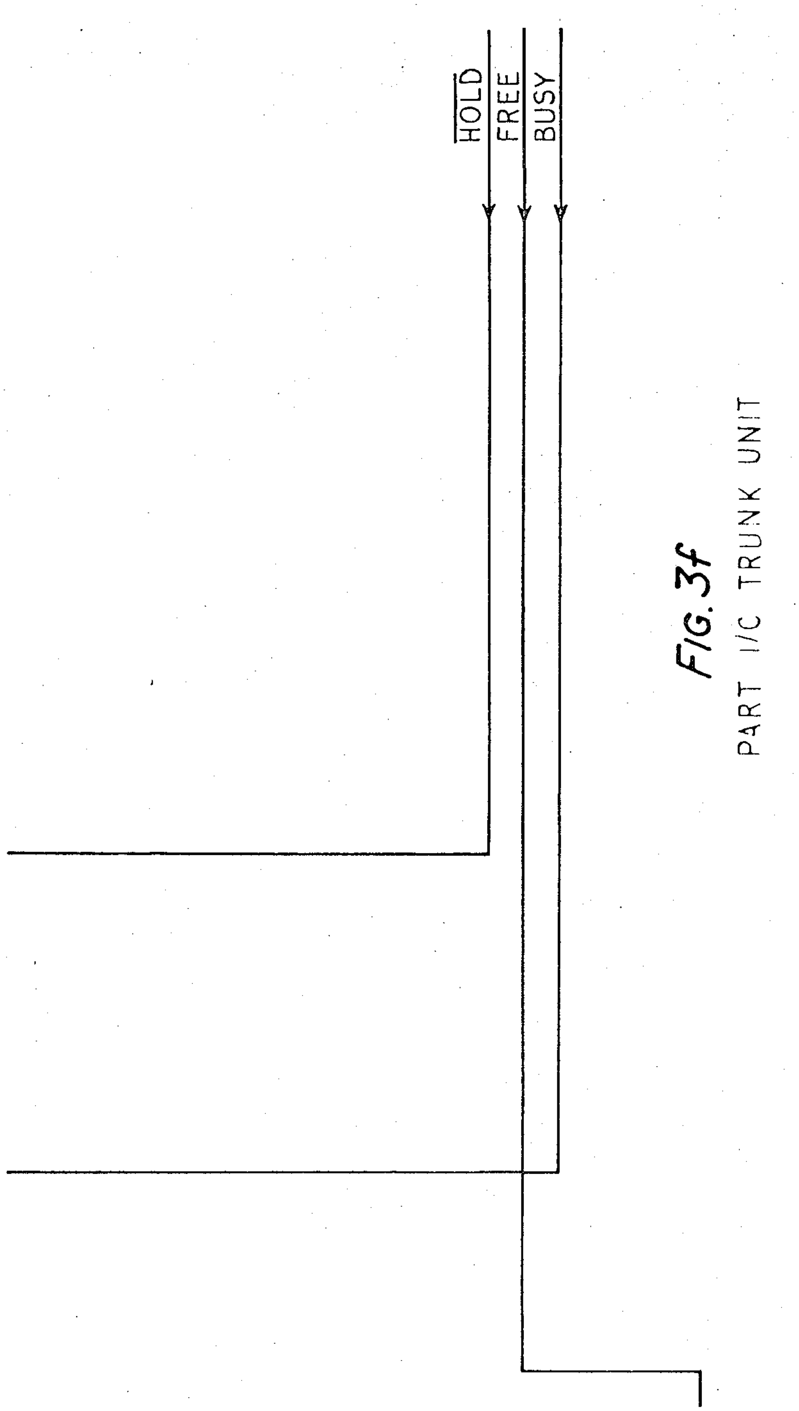
Figure 4A:
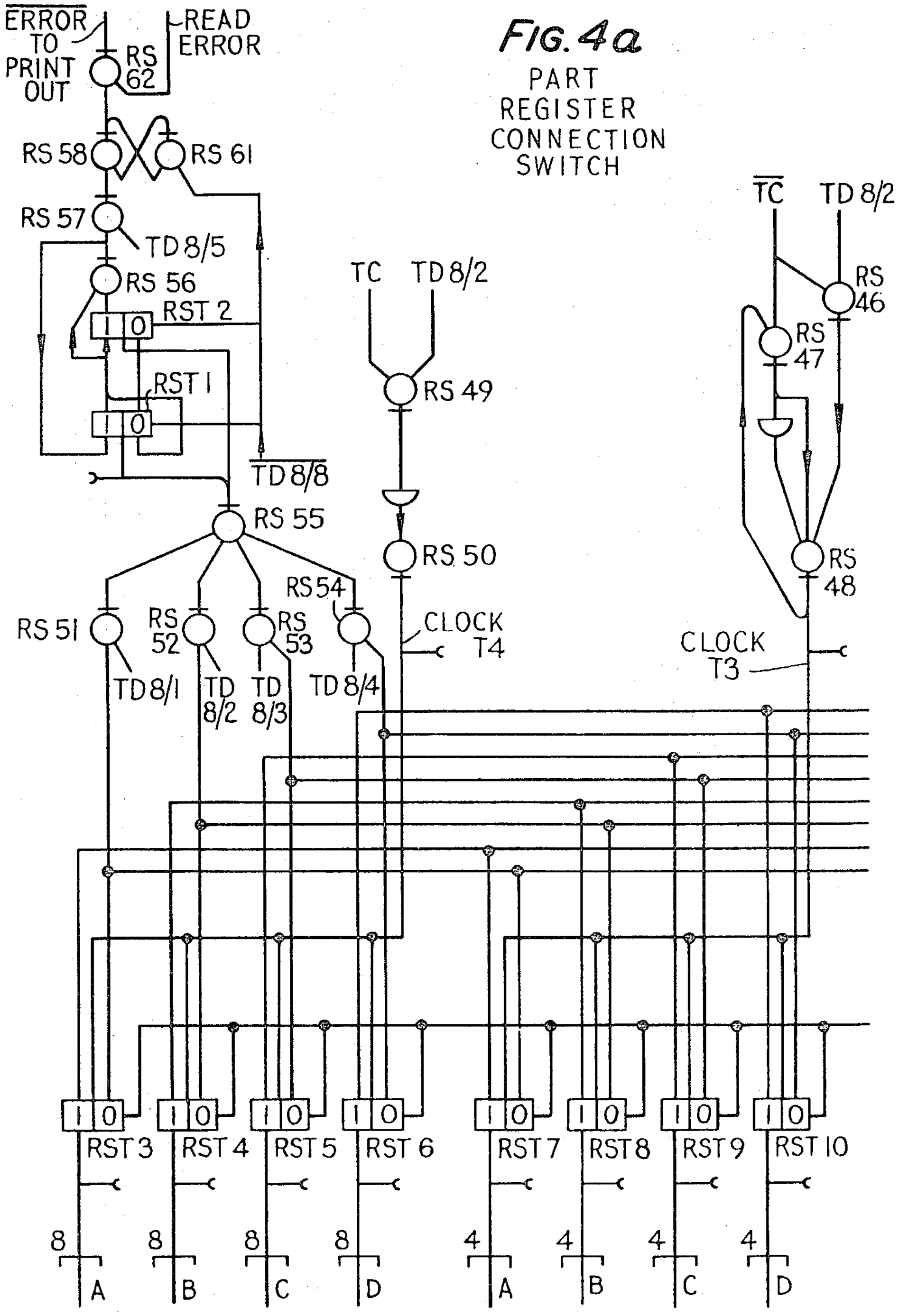
Figure 4B:
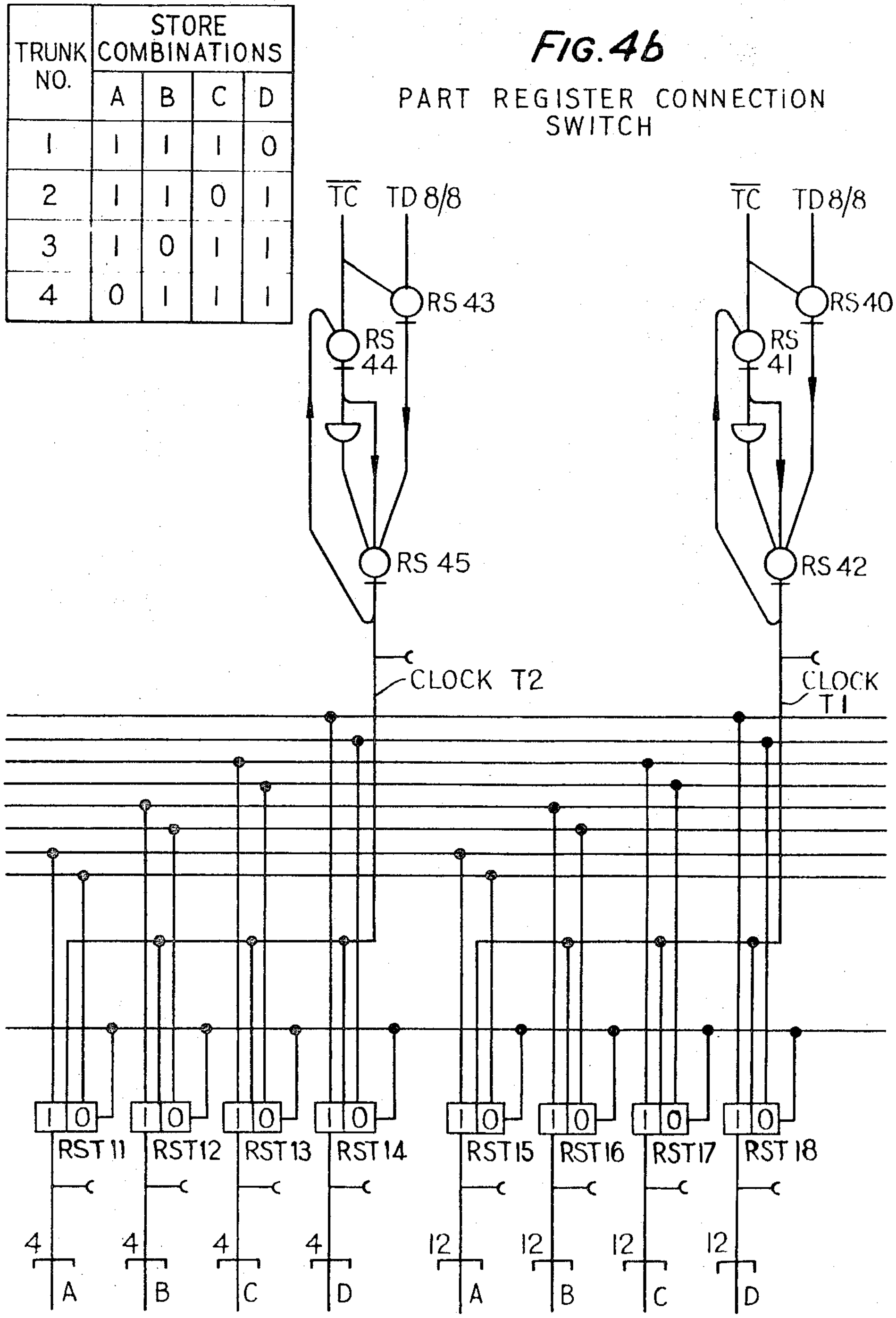
Figure 4C:
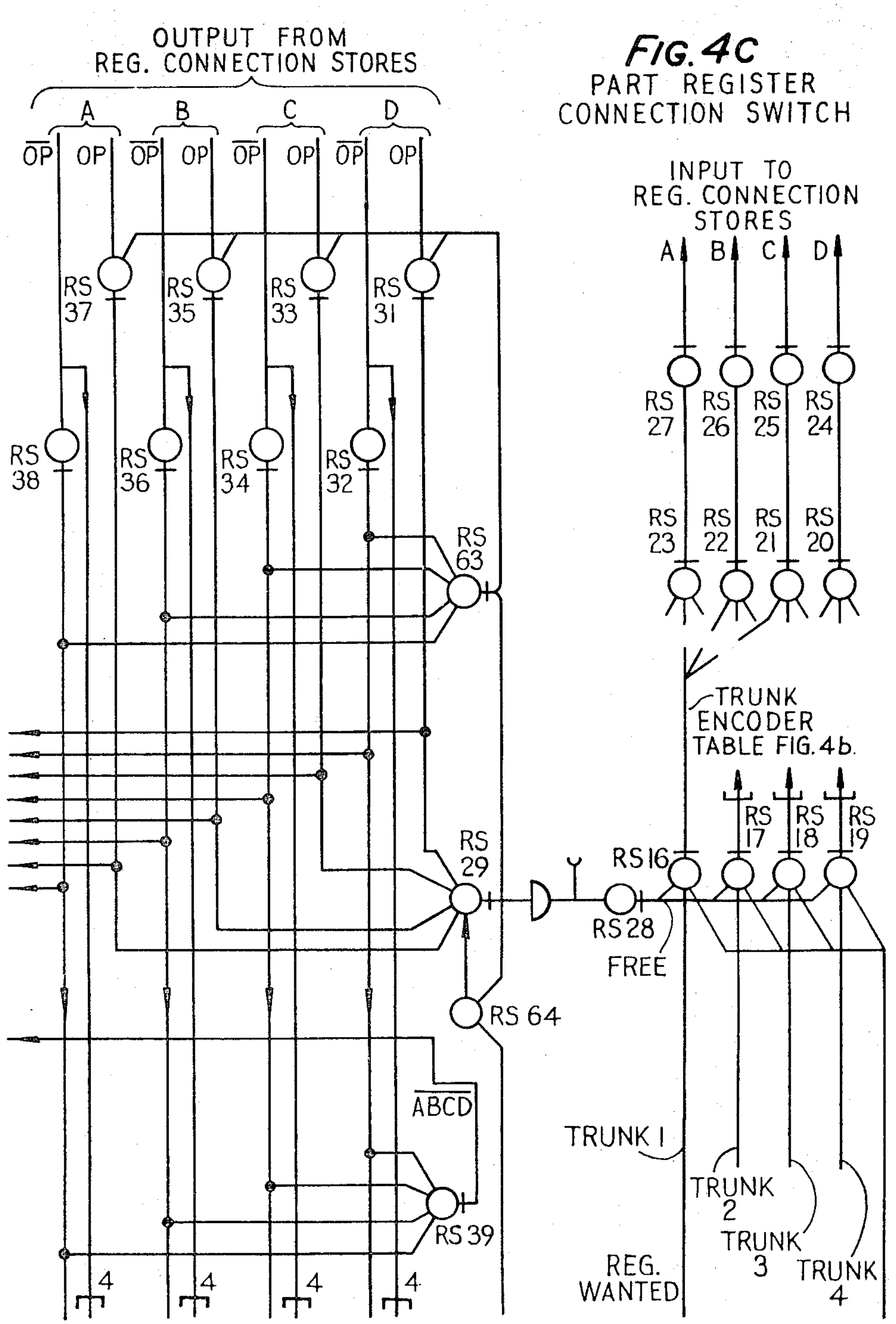
Figure 4D:
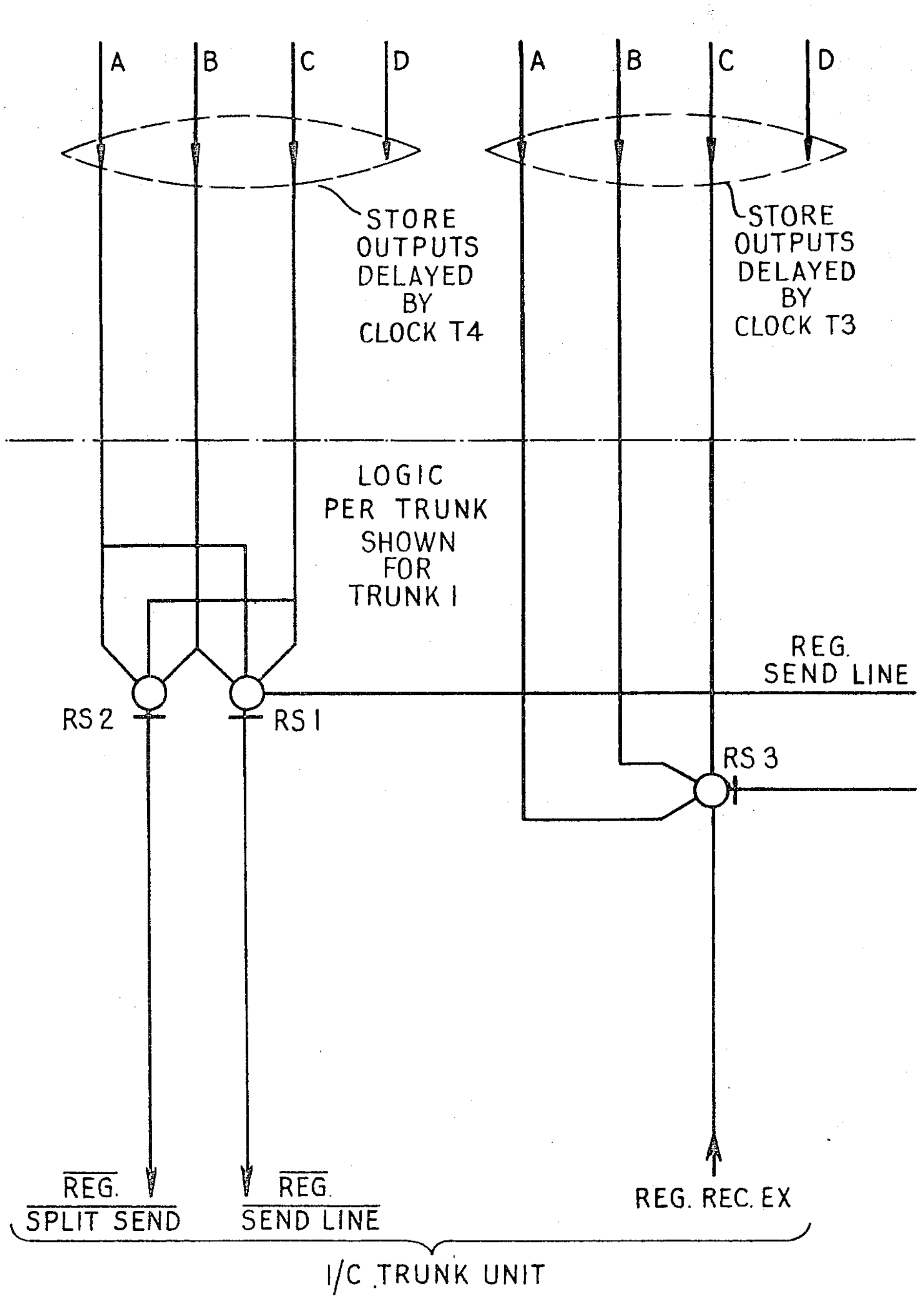
Figure 4E:
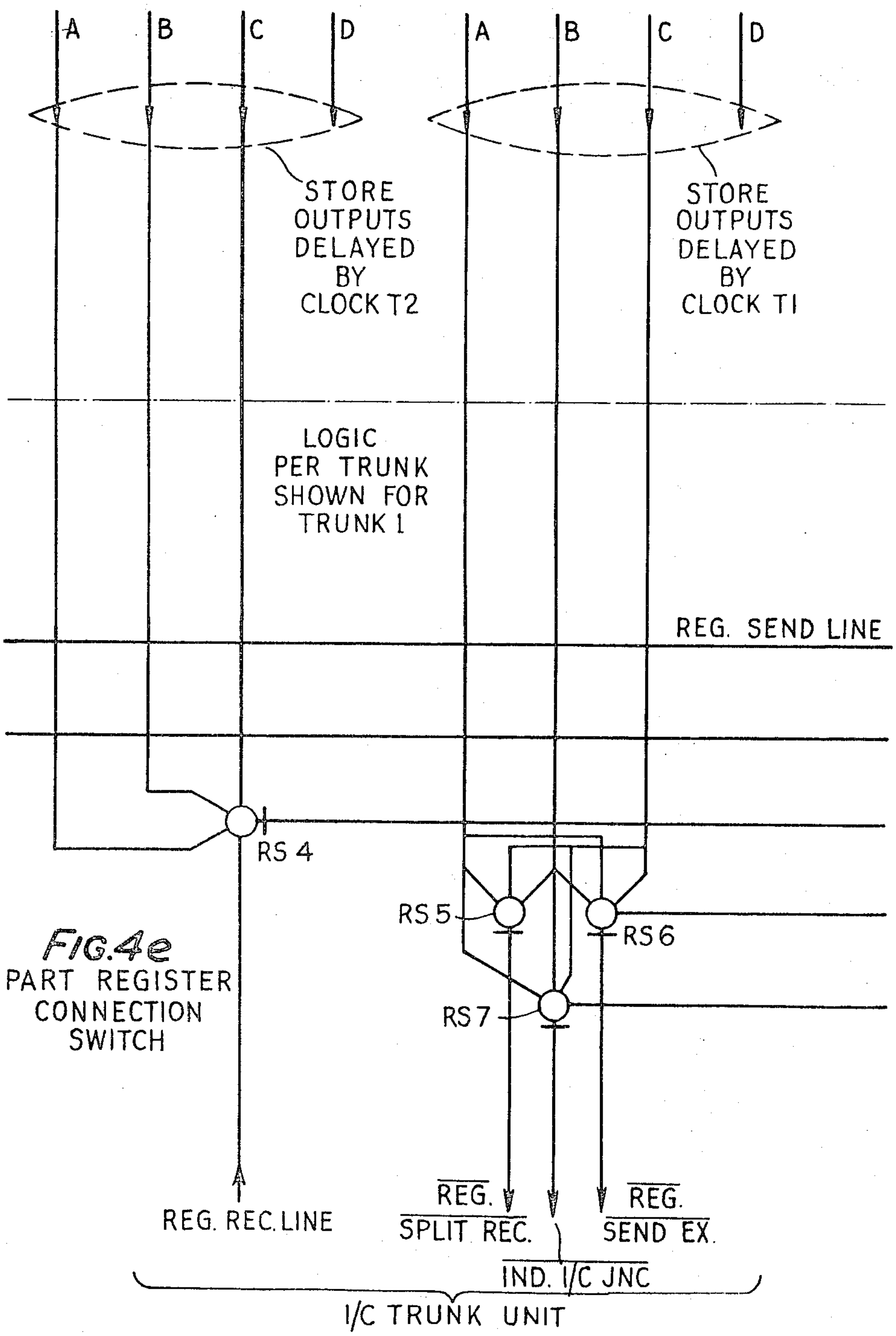
Figure 4F:
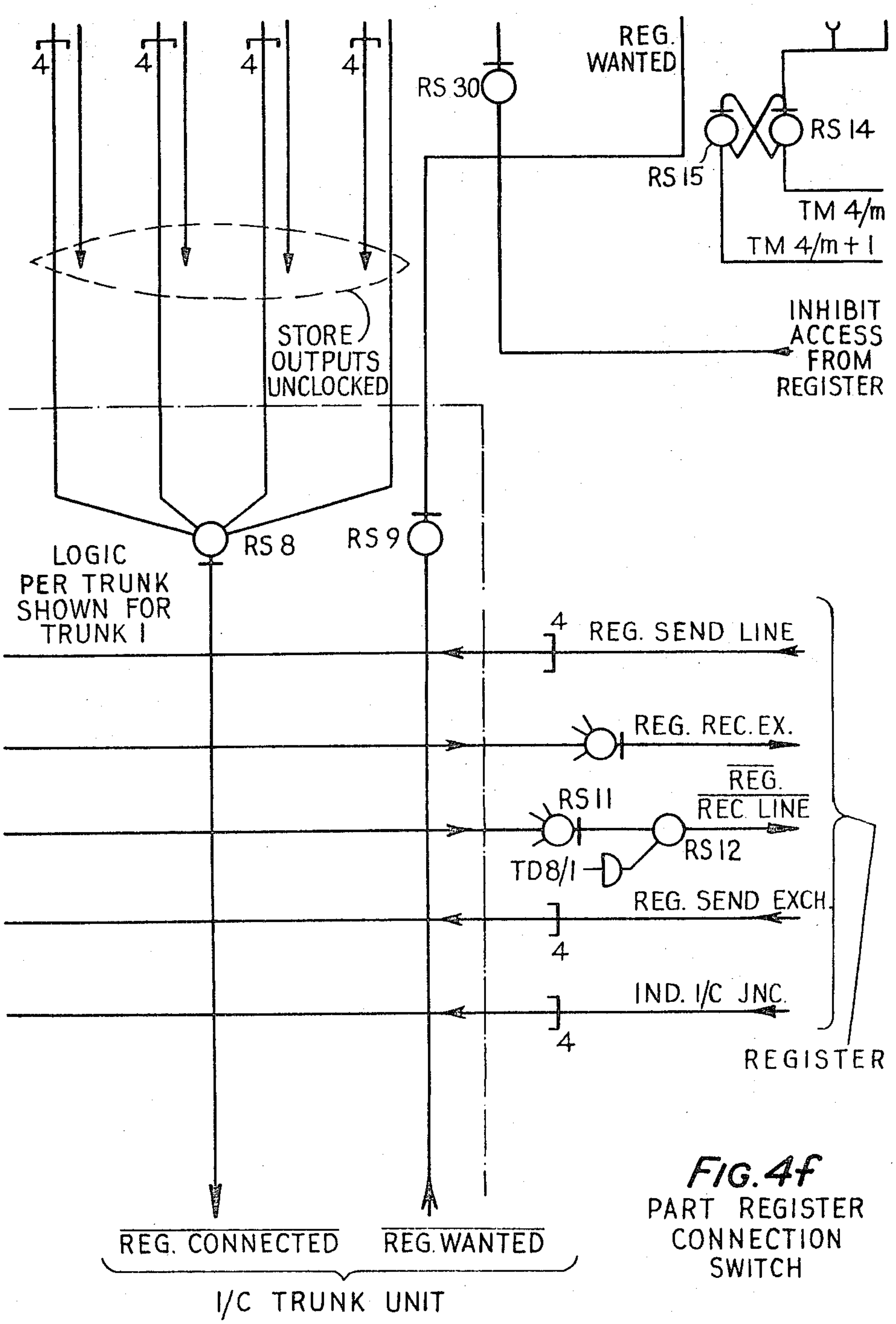

It is convenient at this stage to explain what is to be understood by a P.C.M. LINE System. A System is, typically, made up of 24 channels each channel formed by a time SLOT. If the sampling rate is 8 kHz. the the 24 SLOTS occupy a time of 125$\mu$s and this period is called a FRAME (F). Each SLOT is therefore 5.2$\mu$s long. Each SLOT contains 8 DIGITS, each DIGIT (D) being 0.325$\mu$s "mark" or 0.325$\mu$s "space." Four FRAMES (F1–4) constitute a MULTIFRAME (M). In FIG. 1 a P.C.M. Line System 1 on the CALLING side of the Exchange, is terminated via LINE TERMINATION 2 on the SYSTEM UNIT 3.

SYSTEM UNIT

Performs the functions of retiming and synchronization. Also splits the SYSTEM into ODD and EVEN channels and accordingly diverts an incoming call to a particular *i/c* (incoming) TRUNK UNIT 4. For security reasons, the ODD and EVEN channels of a system are routed to different *i/c* TRUNK UNITS each TRUNK UNIT serving the ODD channels of one system and the EVEN channels of a different system.

*i/c* TRUNK UNIT

Indicates free channels to the originating end of the P.C.M. System. Detects new calls and clearances. During a connection it stores a "HOLD" condition which is passed forward.

When a new call is detected (time slot allocated at the originating end of P.C.M. System) the forward path is open-circuited and access is given via REGISTER CONNECTION SWITCH 5 to one of a number of REGISTERS 6.

REGISTER

Receives and counts dialled pulses and passes them to TRANSLATOR 7.

TRANSLATOR

Output signifies a particular wanted *o/g* (outgoing) route on the CALLED side of the network. A "MARK" signal is applied to all free channels in the wanted *o/g* SYSTEM UNIT or UNITS 16.

The TRANSLATOR is not essential as the REGISTER could MARK direct without the TRANSLATOR.

Simultaneously the *i/c* TRUNK UNIT applies an "INDICATE" signal to its associated A SWITCH 8.

A SWITCH

Passes the "INDICATE" signal forward on all free LINKS 9 to B switches.

B SWITCH

Each comprises a number of means termed CORD CIRCUITS for providing a time delay between incoming and outgoing sides of the network. Two different kinds of B SWITCHES are provided:

i. BZ SWITCH 10 connected by zero delay cord circuits 11 to A SWITCH, ii. BI SWITCH 12 and a BO SWITCH 13 interconnected by cord circuits some providing a fixed delay 14 and the remainder a variable delay 15.

The "MARK" signal from the TRANSLATOR (or direct from REGISTER) signifying the wanted *o/g* SYSTEM or SYSTEMS, is passed backward via the SYSTEM UNIT 16 to the associated *o/g* TRUNK UNIT 17 to MARK the associated C SWITCH 18.

C SWITCH

Passes the backward "MARK" to all of the BZ10 and BO13 portions of the B SWITCHES. If more than one *o/g* Route SYSTEM is marked then more than one C SWITCH receives the "MARK" signal and the ROUTE SELECTOR 19 selects one of the C SWITCHES.

As each C SWITCH passes the "MARK" signal to each of the B SWITCHES, the B SWITCH ELECTOR 20 selects one of the B SWITCHES in the preferential order of first, zero delay BZ switch, second, fixed delay BO SWITCH and finally variable delay BO SWITCH.

SLOT CHANGING CORD CIRCUIT

In an integrated P.C.M. transmission and switching network it is necessary to be able to change the time slot of a P.C.M. message in its passage through an exchange so that the probability of blocking a call may be made sufficiently low. Such slot changes may be made by delaying the P.C.M. digits for appropriate times. These delays are required in complementary pairs. For example, in a 24-channel P.C.M. system a delay of three slots in the incoming to outgoing direction, is accompanied by a 2/-slot delay in the outgoing to incoming direction.

The fixed delay cords are arranged in such complementary pairs.

The variable cord is a fully flexible slot changing cord allowing any slot change for any channel, providing the channels involved are available.

When the path selection has been made, a STORE in each of the A, B and C SWITCHES is written with the appropriate connection code at channel slot time in order to maintain the cross-point connections at those times, and in the *i/c* TRUNK UNIT the connection to the REGISTER is broken, and a connection to the A SWITCH is made.

ERROR CHECKING

Writing of the stores employs a binary coding and this can be used to check whether or not the correct cross-point of the switch has been operated. If an error is detected further setup of the connection is inhibited and an alarm given.

Detection is carried out after the signal has passed through the cross-point.

In the exchange system described in the embodiment, binary coding is used in order to characterise and operate each cross-point and a parity or check digit, or digits, coordinated with the cross-point code, controls the operation of the error detector. The P.C.M. signals appearing on the output of a cross-point gate, are also teed off to a gate in the error detector. Each of these gates has another input or inputs, to which is applied the check digit or digits, coordinated with the code digits of the particular cross-point gate.

Provided a given set of code digits has produced an output on the appointed cross point gate, the output to the error detector is inhibited by the check digit or digits, so that no error will be detected.

If, however, an incorrect cross-point gate is operated by a given set of code digits, then the check digit or digits, corresponding to the correct gate will not cause, in the error detector, inhibition of the output of the operated gate, and an error indication will be given.

A fault discrimination circuit is provided to distinguish between faults internal and external of each REGISTER and only when faults can be assumed to be internal is the REGISTER busied-out.

Before commencing a detailed description, an explanation of the symbols and terminology adapted will be given.

The operations of integrated logic circuits are normally described in terms of voltage levels, and it is a necessary feature of such circuits that they should have two stable states which can be used to represent the 0 and 1 conditions of binary logic. It is convenient to refer to the state which results in the more positive output voltage as the "HIGH" state and to represent this by a logical 1 and that which results in the more negative output voltage as the "LOW" state and to represent this by a logical O. Signal leads on the diagrams are labeled in accordance with this nomenclature. For example, if a hold condition on a lead arises as the result of a logical 1, the lead is labeled HOLD, whereas if the condition results from a logical 0, the lead is labeled $\overline{\text{HOLD}}$.

The diagrams represent integrated logic circuits, which unless otherwise stated are in the form of POSITIVE LOGIC NAND gates.

In the description the following terminology has been adopted:

| | |
|---|---|
| HIGHWAY | A general term to describe any multiplex path conveying energy in one direction. |
| TRUNKS | (*i/c* and *o/g*) Connects SYSTEMS to the switching network. |
| LINKS | Interconnect switching stages. |

Each TRUNK or LINK comprises at least a SEND highway and a RECEIVE highway.

In the consideration of ENERGY flow, the terms SEND and RECEIVE are used for the two directions, with a changeover The general principle adapted is that the generation equipment is triplicated and the three outputs of each individual waveform are majority decided to feed the distribution system. The system consists of three security sections each feeding part of the exchange via a star connected arrangement of buffer amplifiers. Failure of one out of three inputs to the waveform generation equipment leaves the exchange unaffected, as does failure of one out of three Waveform Generators. Failure of a buffer amplifier will affect only part of the exchange, reducing its traffic carrying capacity while the fault persists.

Each waveform is identified by a code consisting of two letters followed by two FIGS. separated by an oblique stroke. For all waveforms the first letter is T and the second indicates the function. The first FIG. indicates the number of phases of the waveform, and the FIG. following the stroke indicates the particular phase, e.g. TD 8/3 means digit waveform, phase 3 of a set of 8.

Table 1 shows the waveforms produced by each generator.

TABLE 1

| Waveform O/P | Divided clock supply | Periodic time | P.R.F. |
|---|---|---|---|
| TC | | 650 μs | 1.536 mc./s. |
| TD8/1–TD8/8 | 0.625 ns | 5.2 ns | 192 kHz. |
| TS8/1–TS8/8 | 5.21 μs | 41.6 μs | 24 kHz. |
| TS3/1–TS3/3 | 5.21 μs | 15.6 μs | 64 kHz. |
| TS2/1–TS2/2 | 5.21 μs | 10.4 μs | 96 kHz. |
| TF7/1–TF7/7 | 125 μs | 875 μs | 1.145 kHz. |
| TF4/1–TF4/4 | 125 μs | 500 μs | 2.0 kHz. |
| TF3/1–TF3/3 | 125 μs | 375 μs | 2.67 kHz. |
| TM7/1–TM7/7 | 0.5 ms | 3.5 ms | 286 c./s. |
| TM4/1–TM4/4 | 0.5 ms | 2.0 ms | 500 c./s. |
| TM3/1–TM3/3 | 0.5 ms | 1.5 ms | 667 c./s. |
| TH7/1–TH7/7 | 3.5 ms | 24.5 ms | 41.0 c./s. |
| TH4/1–TH4/4 | 3.5 ms | 14.0 ms | 71.5 c./s. |
| TZ5/1–TZ5/5 | 98 ms | 490 ms | 2.0 c./s. |
| TZ3/1–TZ3/3 | 98 ms | 296 ms | 3.4 c./s. |

Although each phase of a waveform occupies its own time slot, the pulse does not occupy the whole of the slot. The nominal widths of the pulses distributed are:

TC 0.325 μs.
TD 0.4 μs.
TS, TF, TM, TH, TZ 4.8 μs.

Both phases of each waveform are available, e.g., TD8/1 and $\overline{\text{TD8/1}}$. Other waveforms are derived on a vernier basis as shown in table 2.

TABLE 2

| Waveform | Number of phases | Periodic time | P.R.F. | Waveform gated from— |
|---|---|---|---|---|
| Slot F | 24 | 125 μs | 8 kHz | TS8/ and TS/3. |
| Set-up control E | 28 | 3.5 ms | 286 c./s | TF7/ and TF4/. |
| Initial set-up scan | 28 | 14 ms | 71.5 c./s | TM7/ and TM4/. |
| Line sampling (register) | 1 | 6 ms | 167 c./s | TM4/1 and TM3/1, |

at the centerpoint of the CORDS. In the consideration of TRAFFIC flow, the terms INCOMING, OUTGOING, FORWARD and BACKWARD are used, with a changeover at the centerpoint of the CORDS.

WAVEFORM GENERATION AND DISTRIBUTION

All the timing and switching functions in the exchange are dependent ultimately on a stable exchange clock, and the waveform generation and distribution system is driven by majority decided outputs from a triplicated oscillator source.

Seven basic waveforms, each having a number of phases have to be generated and distributed and, because they constitute a central service, stability of supply is important.

Figure 17:
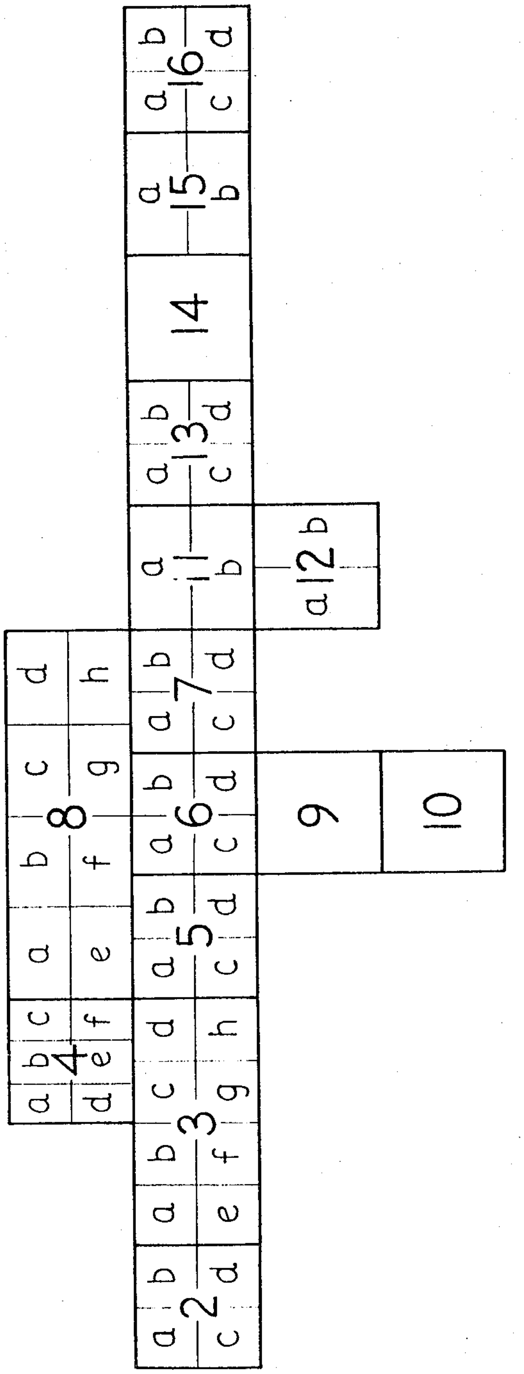

A detailed circuit operation will now be described with reference to FIGS. 2 *a–d*, 3 *a–4 a–f*, 5 *a–d*, 6 *a–d*, 7 *a–d*, 8 *a–h*, 9, 10, 11 *a–b*, 12 *a–b*, 13 *a–d*, 14, 15 *a–b*, *a–d*, assembled as shown in FIG. 17.

In a P.C.M. System incoming at the Exchange, digit D1 is used as a signalling digit in ODD frames. When a channel is in the idle condition, digit D1 is 0 in the ODD frames (i.e., F1, F3).

INITIAL SETUP

When a call originates in a channel, it is recognized at the Exchange by the receipt of the signalling condition in digit D1 changing to a logical 1 in alternate ODD frames starting in either F1 or F3. This signalling condition is received via a SYSTEM UNIT to the associated INCOMING TRUNK UNIT and is read from the Incoming TRUNK RECEIVE highway of that unit at gate IT4, on lead RECEIVE to gate IT27, is stretched by latched gate pair IT28 and 29 to produce output RD1 (RECEIVE DIGIT 1) from IT28. Output RD1 is scanned by a pair of multiframe (M) (equals four frames i.e., F1–4) waveforms M1 and M2, M1 at gate IT26 and M2 at gate IT39. The M1 waveform occurs six multiframes after M2, i.e., 3 ms.

SYSTEM UNIT FIG. 2

RECEIVE

Bipolar signals received from the line are connected via ATTENUATOR A1 to a SYNC. and REGENERATOR UNIT, which converts the bipolar signals to binary, and compares the sync. pattern received from line with the exchange generated reference pattern SPE.

Also a clock pulse is regenerated. The period over which a comparison is made is defined by SPPE and line digit P11, i.e., exchange digit D1.

A digit counter consists of toggles SUT1–3, and the eight states are decoded to provide the digit pulses where required. For example, digit position 1 is obtained from gate SU40 which provides P1 via amplifier b0 to the SYNC. and REGENERATOR UNIT. All eight digit pulses are produced by gates SU1–8 which distribute the regenerated line signals to the eight toggles of the BUFFER STORE SU9 and 10 to SU23 and 24. The first toggle SU9 and 10, stores digit 1 and the last toggle SU23 and 24, stores digit 8.

Each toggle is reset by an exchange digit pulse which is one digit later than the digit stored by the toggle. For example, toggle SU9 and 10, which stores digit 1 is reset by $\overline{TS8/2}$ and the others follow this pattern.

The state of each toggle is read in turn by gates SU25–32 operated by the appropriate TD8/*n*. This point is defined as reference time, i.e., message digit 1 occurs during the period defined by TD8/1.

Digit 1 is treated differently from the other digits because it carries information in frames F2 and 4 not required by the exchange. This is removed in gate SU25 which is operated only in frames F1 and 3.

The buffer store output is available at combining gate SU33, the output of which is distributed to the ODD and EVEN channel multiplex by gates SU38 and 39 respectively. These gates are clocked with $\overline{TC}$ and coupled back to gate SU33 to form a retimer. In addition, $\overline{\text{SYNC. FAIL}}$ is infected so that the receive multiplex signals to the trunk units are cut when a SYNC. FAIL condition exists. The distribution gates SU38 and 39 are operated in alternative slots by pulses generated by toggle SU36–37.

SEND

The ODD and EVEN channel multiplex systems are combined in gate SU66, to which gate is added a SYNC. signal from gate SU67, being SP pulses clocked by $\overline{TC}$ in digit 1. At this point digit 1 is late relative to the buffer store SU9–24, and is defined by toggles SU68 and 69 set by $\overline{TD8/3}$ and reset by $\overline{TD8/4}$.

A 7-stage shift register SUT6–12 is included so that the loop delay of the junction may be adjusted in steps of 1 digit to set the receive signal within the range of the buffer store.

The delayed SEND signal is clocked by $\overline{TC}$ in gate SU71 and fed, via BIPOLARIZER UNIT which is also clocked, to line.

CALL TRACE RECEIVE

Digit 1 of the message from the buffer store SU9–24, is selected during frames F1 and 3, when the equipment is in synchronization and pulse lengthened by toggle SU50 and 51. Gate SU54 makes the CALL TRACE signal available during the busy slots when the scan input is energized.

CALL TRACE SEND

This follows the same pattern as the CALL TRACE RECEIVE, except that the digit 1 SEND occurs during TD8/3 and is extracted from the output of gate SU66, which combines the ODD and EVEN channel multiplex signals.

SYNC. FAIL

The presence of SYNC. FAIL condition on the output of SYNC. and REGENERATOR UNIT via attenuator A3 initiates the following conditions:

a. Buffer SU47 sends $\overline{\text{SYNC. FAIL}}$ to the *i/c* and *o/g* TRUNK UNITS, where it is used to cut the signalling digit during conditions of sync. failure.
b. $\overline{\text{SYNC. FAIL}}$ is applied to gates SU38 and 39 to cut all receive signals during conditions of sync. failure.

BUSY AND TRAFFIC RECORDING

Busy signals for ODD and EVEN channels are combined in gate SU60 for call trace purposes.

The ODD and EVEN channel traffic is made available at gates SU56 and 57, giving access to the TRAFFIC RECORDER.

When the calling channel is free, the SUPERVISORY STORES are in the states $\bar{A}$, $\bar{B}$ and $\bar{C}$.

The channel is detected as calling by gate IT39 whose output sets the SUPERVISORY STORE to the state $\bar{A}$, $\bar{B}$ C="-Call Suspected."

If at the next M1 (3 ms after M2), the calling condition still persists, gate IT26 produces an output $\overline{\text{REGISTER WANTED}}$.

This sequence of operation of scanning by M1 and M2 is repeated until either a REGISTER connected or the calling condition is removed.

CONNECTION TO A REGISTER

This is brought about by writing the $\overline{\text{REGISTER WANTED}}$ signal into a REGISTER CONNECTION STORE (not shown) in which the calling channel is free. The $\overline{\text{REGISTER WANTED}}$ output of gate IT26 is passed to the REGISTER CONNECTION SWITCH to gate RS9 where it is inverted to REGISTER WANTED input to gate RS16. In gate RS16 the REGISTER WANTED leads are scanned by a multiframe waveform from TM4/*m*supply via latched pair gates RS14 and 15. Each REGISTER is allocated a different value of *m*. The TM4 waveforms, in conjunction with the TM7 waveform used in the INCOMING TRUNK UNIT, allow up to 4 REGISTERS to scan up to 28 INCOMING TRUNK UNITS.

In gate RS16, the coincidence of REGISTER WANTED and REGISTER FREE from GATE RS28, together with the TM4 waveforms, allows the calling channel to be written into the REGISTER CONNECTION STORES in a3 out of 4 code identifying the calling INCOMING TRUNK UNIT, i.e., 3 out of 4 store connections A, B, C and D. For example, INCOMING TRUNK UNIT 1 is coded as 1110.

The REGISTER CONNECTION STORES require a "hold" condition during initial writing and this is provided by the REGISTER injecting from RA5 a holding signal for all channels into the HOLD leading during frames $F1+F2+F3=\overline{F4}$.

The REGISTER CONNECTION STORE gives an immediate output after being written, and this is decoded by gate RS8, there being one such gate for each REGISTER CONNECTION-SWITCH CROSS-POINT. Gate RS8 returns the calling channel over the lead $\overline{\text{REGISTER CONNECTED}}$ to the INCOMING TRUNK UNIT at gate IT24 without any significant delay. Output lead REGISTER CONNECTED of gate IT24 is connected as input to gate IT25, where:

REGISTER CONNECTED .M1C.FREE = WRITE B. ERASE C. This sets the SUPERVISORY STORE to $\bar{A}$, B, $\bar{C}$ (i.e., 0.10.).

Writing ' The SUPERVISORY STORE B produces the BUSY signal =*A+B from gate IT35. The BUSY signal is applied to gate IT59 where D1.* (*F2+F4*) =EXCHANGE HOLD applied via IT60 and 61 where it is timed by the $\overline{TC}$ waveform, to gates IT1–4. The BUSY signal from gate IT35 is also inverted by gate IT36 to FREE signal to inhibit in gate IT48 the $\overline{\text{CIRCUIT FREE}}$ signal to gate IT12. This is equivalent to "-Backward Busying." The output of say gate IT3 on "REGISTER RECEIVE (LINE)" is applied to the REGISTER CONNECTION SWITCH gate RS4 and via gates RS11 and 12 on $\overline{\text{REG.REC.(LINE)}}$ via gate RA1 in REGISTER, to gate RA2 to prime the HOLD PERSISTENCE STORE to produce a "hold" pulse for each busy channel in every frame until the internal EXCHANGE HOLD D1 has been zero in two consecutive F4 frames.

REGISTER SEIZED

As soon as the REGISTER CONNECTION SWITCH cross-points are activated, gate RS1 allows TD8/3 timed with $\overline{TC}$ from gate RD86 in the REGISTER, via gates RD 84, 88 and 89 to the REGISTER SEND LINE to be injected into the SEND highway at gate IT12 in the INCOMING TRUNK UNIT. This simulates a backward signal from the REGISTER to the originating end of the *i/c* P.C.M. System.

The REGISTER monitors the calling channel on the REG.REC(LINE) from gate RS4 in the REGISTER CONNECTION SWITCH. It detects and times the "breaks" and "-makes" in the received dialled pulse trains and registers each "bread" in a cumulative counter called the DIALLED DIGIT COUNTER and STORE and the "makes" in a MAKE COUNTER. When a "make" exceeds 96 ms in duration it is recognized as an Inter-Digit Pause Period (I.D.P.). The appropriate I.K.P. indicates that the score in the DIALLED-DIGIT COUNTER STORE identifies the "wanted outgoing route."

READY TO SETUP

The output 96 ms MAKE of the MAKE COUNTER together with lead '1 or MORE DIGITS DIALLED' applied as inputs to gate RA54.

The output of gate RA54 writes the READY TO SETUP STORE.

More than one call can be in this state at the same time and these are applied to the ONE ONLY SELECTOR.

The REGISTER ISis now in state to attempt a FINAL SETUP, which must be completed during the first half of the Inter-Digit Pause Period.

FINAL SETUP

Each REGISTER is scanned in turn for a period of RSn derived from the TH/4–TH7/– pulse supplies so that 28 values of '*n*', RS1–28 are available. Each of these periods can be assigned to a register and any not used for this purpose can be employed for other purposes. In the described embodiment – Periods RS1, RS2 and RS3 are used for the 3 REGISTERS in service.

Period RS28 is used for Routiner II.

Periods RS4–27 are used for checking functions. Each REGISTER SCAN PERIOD (RS1 etc.) comprises seven multiframes giving 28 frames synchronized with frames F1–4. These 28 frames are designated E1 to E28. When the appropriate RS*n* appears at the REGISTER having a SELECTED CHANNEL STORED, gate RD12 gives out the calling channel pulse during each of the periods E1–28, and gate RC26 gives out the same channel pulse during E2–8.

A more detailed description of the operation of the REGISTER now follows.

HOLD REGISTER CONNECTION

The REGISTER is seized the held by the presence of a LOW signal in D1.F4 of the calling channel on the $\overline{\text{REG.REC(LINE)}}$ input to gate RA1. The incoming signals are delayed by one-half digit and hence arrive at a time determined by $\overline{TC}$.TD8/1. All digits except D1 are inhibited in the REGISTER CONNECTION SWITCH. Any signals in frame F4 operate the toggle of the HOLD PERSISTENCE (*a*) STORE via gate RA2 (the $\overline{\text{SETUP SUCCESSFUL}}$ input to gate RA2 will normally be HIGH), and a HOLD is provided in the same frame to the REGISTER and the REGISTER CONNECTION SWITCH via gates RA3–5. The output from RA5 is HIGH every F1, F2 and F3 frames and provides a priming signal to the REGISTER CONNECTION SWITCH. The PERSISTENCE (*b*) STORE is written via gate RA7 and the channel is recirculated in both stores in F1 and F2 frames. The (*a*) STORE is not recirculated in F3 frame and if F4 is not present at the input, the STORE is not rewritten, but its output rewrites the (*b*) STORE and the HOLD is maintained until the next F3 frame. If there is still no input in F4 the (*b*) STORE will not be rewritten. The HOLD signal in both the REGISTER and the REGISTER CONNECTION SWITCH is thus provided immediately a signal is received in F4 frame on the $\overline{\text{REG. REC.(LINE)}}$, and it is not removed unless there are two successive absences of a signal in F4 at the input.

The $\overline{\text{SETUP SUCCESSFUL}}$ input to gate RA2 provides the means of dropping the REGISTER and the REGISTER CONNECTION SWITCH after the setup is completed. The lead comes from RD55 and will be LOW from E16 to E20 after a successful setup, thus overriding the HOLD persistence.

TIME OUT on REGISTER HOLD

If the HOLD persists for more than 3 secs. the call is to be timed out and number unobtainable tone-N.U.T.- returned. This time out is provided by using a train of pulses having a with of one frame, aligned with F1 and a period of approximately 1.5 seconds. The first 1.5 second pulse which occurs after the commencement of the HOLD will cause the TIME OUT HOLD (*a*) STORE to be written. If the HOLD is still present at the time of the next 1.5 sec. pulse the TIME OUT HOLD (*b*) STORE is written. The (*a*) STORE is also written, but this is of no consequence and during the next and subsequent frames the channels in both STORES are recirculated. If the HOLD is still present at the time of the third 1.5 sec. pulse a LOW output is obtained and this is used to indicate on $\overline{\text{FAULT}}$ lead, and to release the REGISTER. This will occur from 3–4.5 sec. after seizure of the REGISTER.

SIGNAL DETECTION

The signalling information is present at the $\overline{\text{REG.REC.(LINE)}}$ input in either D1.F1 or D1.F3 and is delayed by one-half digit. It is selected by gate RA8 and written directly into the SIGNAL DIGIT STORE causing the output toggle of the STORE to change state. The STORE output is recirculated in all frames except F1, thus whether the signal was in F1 or F3 the SIGNAL DIGIT STORE output will be HIGH in F1. The output of the SIGNAL DIGIT STORE is sampled for one frame F1 at 6 ms intervals and if a signal is present the MAKE PERSISTENCE (*a*) STORE is written. The channel is recirculated in this STORE in the absence of the 6 ms sampling pulse. The MAKE PERSISTENCE (*b*) STORE is written in the frame after the (*a*) STORE and the channel is recirculated in the absence of the 6 ms sampling pulse. The presence of a valid Strowger MAKE pulse is determined by the presence of a signal in any two out of three consecutive 6 ms samples. The first appearance of a signal is written into the MAKE PERSISTENCE STORES as described above, and if a signal is also present at the time of the second sample an output on $\overline{\text{GENUINE MAKE}}$ lead is received. If a signal is not present at the time of the second sample the (*a*) STORE is not rewritten, but the (*b*) STORE is rewritten during the 6 ms sample time and in subsequent frames the channel recirculated as before. If a signal is again absent at the time of the third six ms sample, the (*b*) STORE is not rewritten and both of the MAKE PERSISTENCE STORES are empty. If however a signal is present at the time of the third sample an output is obtained on $\overline{\text{GENUINE MAKE}}$ lead and both MAKE PERSISTENCE STORES are rewritten. The $\overline{\text{GENUINE MAKE}}$ output is therefore obtained if the input signal on successive six ms samples is either LOW-LOW or LOW-HIGH-LOW.

ABSENCE OF SIGNAL

During a Strowger BREAK period the HOLD will be present, but the $\overline{\text{REG.REC.(LINE)}}$ input will be HIGH in both frames F1 and F3, and the output from the SIGNAL DIGIT STORE will be low during frame F1. This output is inverted and sampled at the 6 ms scan time. The first 6 ms sample during which the input signal is absent does not produce an output since the MAKE PERSISTENCE (*b*) STORE will not have been cleared, but subsequent absences result in a LOW signal at the output, indicating that the REGISTER should start checking for a BREAK period.

RECOGNITION OF STROWGER PULSES

GENERAL

The REGISTER has to detect valid Strowger MAKE and BREAK pulses and then has to recognize the interdigit pause period (I.S.P.) before attempting to set up a connection.

It is convenient to use a time of about 100 ms, i.e., more than twice the maximum MAKE period, to recognize the I.D.P., and this is done in the MAKE COUNTER, which counts up the number of 6 ms intervals for which a $\overline{\text{GENUINE MAKE}}$ is recognized. If a GENUINE BREAK is detected, the counter is reset to zero so that it starts checking for the I.D.P. at the end of the BREAK.

The condition for recognition of a GENUINE BREAK is nominally a count of five successive 6 ms samples in which the signal is absent. The first absence of signal is not counted, and the next four are counted in the BREAK PERSISTENCE STORE. If a GENUINE MAKE is recognized the BREAK PERSISTENCE STORE is reset to zero.

A Strowger pulse is recognized by the receipt of a BREAK followed by a MAKE and is then counted in the DIALLED DIGIT COUNTER.

The minimum time taken to recognize a BREAK is 24 ms and the maximum without resetting the COUNTER is 66 ms. After a BREAK has been detected the BREAK PERSISTENCE STORE will continue to count further absences of signal starting at zero again.

Release of the REGISTER is provided for if it is seized and no signal is received in the first 6–12 ms, or if no GENUINE MAKE 6–received within the first 6–12 ms. As soon as the BREAK DETECTED STORE is written the MAKE COUNTER STORE is cleared.

RECOGNITION of valid STROWGER PULSE

The detection of a GENUINE BREAD indicates that a Strowger pulse has been received, and the DIALLED DIGIT COUNTER should be written. To guard against this COUNTER being written more than once for each BREAK received, it is not written until a GENUINE MAKE is received following the GENUINE BREAK. A ADD signal is then produced at the output of gate RB24 and this goes to the DIALLED DIGIT COUNTER. This signal will occur in frame F1, ans since the GENUINE MAKE output also inhibits the HOLD to the BREAK DETECTED STORE, the ADD signal appears in frame F1 once only for each Strowger digit detected.

MAKE COUNTER

The complete MAKE COUNTER =of eight stages of binary counters, similar to those of the BREAK PERSISTENCE STORE. The HOLD signal to the STORE is inhibit when a GENUINE BREAK is detected, thus resetting it. The GENUINE MAKE output of gate RA14 is applied as the input to the MAKE COUNTER, which thus counts the GENUINE MAKE signals at 6 ms intervals. The output from the fourth to the fifth stage occurs after 16×6=96 ms, and provides a suitable time for the recognition of I.D.P. (total time = 102–108 ms).

Gate RA54 gives a LOW output at this time provided a digit has been received and this writes the READY to SETUP STORE. Gate RA64 provides for the release of the REGISTER if a GENUINE BREAK is received after recognition of the I.D.P..

The call has to be set up during the I.S.P. and the time which can be allowed for this, after recognition of the I.D.P. is about 400 ms i.e., a total time of 500 ms since the last BREAK. If the channel has not been selected before the MAKE COUNTER has reached a count of 384 ms, i.e., a total time of 390–396 ms, it is unlikely that the connection will be set up in time, and a LOW output from gate RA55 indicates that the REGISTER is congested, and BUSY TONE should be returned. Similarly if the channel is selected, the setup should be completed within a count of 480 ms, i.e., a total time of 486–492 ms, and a LOW output from gate RA56 also indicates a congested REGISTER. Gates RA54, 55 and 56 are only required to operate after a digit has been received and an input 1 OR MORE DIGITS DIALLED is applied to all three gates to prevent them operating during the initial period before any digits have been received. The last two stages of the MAKE COUNTER provide a 1.5 second timeout which releases the REGISTER in the event of no digits being received.

ONE-ONLY CHANNEL SELECTOR

The operation of the REGISTER is on a T.D.M. basis up to the READY TO SETUP STORE, and this STORE contains all channels for which a complete digit has been received. Only one connection can be set up at a time and each REGISTER is scanned for 3.5 ms every 98 ms, during which time it can attempt to set up one of the channels in the READY TO SETUP STORE. The ONE ONLY CHANNEL SELECTOR selects one of these channels in the interval between the REGISTER scan periods.

For the purposes of this explanation RSn, where $n = 1–28$, is the scan time during which the REGISTER has to set up a connection.

SETUP CONNECTION

The connection is setup during the REGISTER scan period according to a fixed program controlled by the 28 waveforms E1–28.

The setting up sequence is briefly that the REGISTER sends a forward marking signal to INDICATE the calling channel and a backward marking signal to MARK the route required. Checks are made to ensure (*a*) that no signals are received from the exchange before the connection is setup and (*b*) that the CIRCUIT FREE signal is received after the setup is completed.

The marking signals are then removed, a test signal is set to the terminating end, and a further check is made to see that the CIRCUIT FREE signal is removed. If it is, the REGISTER releases.

In the event of any of the checks not being satisfactory a second attempt is made.

REGISTER SEND EXCHANGE HOLD

A channel is selected before the start of the REGISTER scan period, and the REGISTER immediately starts to send an EXCHANGE HOLD signal on the REG.SEND.(EXCHANGE) lead in all EVEN FRAMES. The signals are delayed by one-half digit, i.e., they are set out at TD 8/1.$\overline{TC}$. Gate RD 31 provides a LOW output at TD 8/1.$\overline{TC}$.SC.$F2+F4$) to set the latched gate pair Rd 33–34, which is reset by $\overline{TC}$. This signal is sent during the whole time a channel is selected, except for the period E2–8 of RSn, when it is inhibited in order to release a B-SWITCH which may be held from a first attempt. In this specification, the period symbol "." is used to indicate the logic "AND" whilst the symbol "+" is used to indicate the logic "OR."

INDICATE *i/c* JUNCTION

The forward INDICATE signal is sent out in the selected channel at the start of RSn and is repeated every frame until the CIRCUIT FREE signal is received back from the exchange indicating the the setup has been completed. The INDICATE signal is a HIGH signal delayed by one-half digit and stretched to be beginning of TD8/6.

At the start of RSn the CIRCUIT AVAILABLE latched gate pair RD28–29 will be reset and the output of gate RD29 will be high. The indicate signal is then generated by setting the latched gate pair RD37–38 at $\overline{TC}$.TD8/1 via gate RD36, resetting it at TD8/6, and gating the output with RSn.SC in gate RD39.

The signal is inverted before being sent out to the REGISTER CONNECTION SWITCH, and a check is made by gate RD41 to ensure that a permanent INDICATE is not being sent out.

SELECTION at B-SWITCH

If a selection is possible a LOW signal $\overline{\text{SELECTION MADE}}$ will be received on the three leads from the B-SWITCH SELECTOR. A majority decision is made in the gates RD64–67, and if a selection is not possible the output of gate RD67 will be HIGH during E–25. Under this condition the REGISTER should return BUSY i.e., a HIGH signal on the REG.SEND.(LINE) in frame F4.

Gate RD68 gives a LOW output at SC.E12.RS$n$ which is inverted by gate RD61 and via $\overline{TC}$.TD 8/2 at gate RD83 sets latched gate pair RD84–85.

Latched gate pair RD84–85 is reset at $\overline{TC}$.TD 8/4 and its output is gated with TC at gate RD88. The output of gate RD88 will this be a double pulse corresponding to TC.TD 8/3 and TC.TD 8/4. The former is the pulse required, and the latter corresponds to the ACTIVITY signal which is to be sent whenever a call is connected to a REGISTER. This signal is normally generated by setting the latched gate pair RD 84–85 by $\overline{TC}$.TD 8/3 via gate RD86. The signal will be present at all times, but will be blocked by the REGISTER CONNECTION SWITCH when the REGISTER is not connected. The LOW output from gate RD88 us thus delayed by two digits and is further delayed by 100 ns before being inverted by the output buffer gate RD89. Gate RD90 provides a fault indication if the output signal is HIGH in TD 8/1.

Two fault indications are provided on the SELECTION MADE inputs from the B-SWITCH SELECTOR. With majority decision gates one output can go faulty and remain permanently in one condition without any indications, and the gates RD72–74 are provided to give an indication if any one of the three leads is HIGH at SC.E22.RSn when the connection has been setup. By E27 all inputs should be HIGH and gates RD69 and 70 provide a FAULT if any input is still LOW. If the output of gate RD67 is LOW at E27 a fault indication is produced by gates RD75 and 76.

The two CONGESTED REGISTER indications from gates RA55 and 56 are also taken to gate RD61 and result in a BUSY signal being sent to REG.SEND.(LINE).

REGISTER CHECKS

The REGISTER checks in E13 and E15 of RSn that there are no signals being received from LINE, checks for CIRCUIT FREE signal being received in E19 and E21 and then, after sending a test signal to the terminating end, checks for the removal of CIRCUIT FREE in RS($n$+3). Failure of any of these checks should result in a second attempt.

Signals on the REG.REC.(EXCHANGE) input are HIGH signals 2½ digits late. Gates RD1–3 generated a timing wave form corresponding to TC.TD 8/3 which is used to gate in signals on REG.REC.(EXCHANGE) at gate RD4.

Any HIGH signals present at this time will result in latched gate pair RD5–6 being set, and the output stretched to TD 8/6. The output from gate RD5 is sampled at E13 and E15 of RS$n$ and if the latched gate pair RD5–6 is set, the second attempt latched gate pair RD15–16 is set via gate RD7.

A similar check is made at gate RD10 in E19 and E21 and if the latched gate pair RD5–6 is not set at these times, the second attempt latched gate pair RD15–16 is set. TD 8/5 is used on gate RD10 since the latched gate pair RD5–6 is not set until late in TD 8/3. The final check for absence of CIRCUIT FREE is also carried out by gate RD7 in E13 and E15 of RS($n$+3) and if HIGH signals are still present on REG.REC.(EXCHANGE), the second attempt latched gate pair RD15–16 is set.

REGISTER SEND SEIZURE

The REGISTER sends a single SEIZURE signal in D1.E15 in order to write the C-SWITCH, and if the two initial checks in RS$n$ are satisfactory it sends a test signal in D1.F1 from E25 onwards. The signal in E15 is generated by gate RD32 and the latched gate pair RD33–34 will be set at TC.TD 8/1.SC.E15.RS$n$ thus sending a single HIGH pulse delayed by ½ digit on REG.SEND.(EXCHANGE).

If the second attempt latched gate pair RD15–16 has not been set before E22 the CIRCUIT FREE signal is being received, and the circuit available latched gate pair RD28–29 is then set at SC.E22.RS$n$ via gate RD27. HOLD is also applied to gate RD27 to avoid an indeterminate output from the latched gate pair RD28–29 if the HOLD disappears before E22 in RS$n$. While the circuit available latched gate pair RD28–29 is set a SEIZURE signal in TC.TD 8/1.SC.F1 is sent via gate RD30 and the latched gate pair RD33–34. This signal starts in E25 and will continue until the latched gate pair RD28–29 is reset. This can occur either when the HOLD disappears via gates RD21 and 22, or in E26 of RS($n$+3) via gate RD23, and on a successful setup the former will normally occur in E20 of RS($n$+3).

Gate RD35 on the REG.SEND.(EXCHANGE) lead provides a fault indication if there is a permanent HIGH output from the latched gate pair RD 33.34.

SETUP SUCCESSFUL

If the REGISTER checks described are successful, the second attempt latched gate pair RD15–16 will still be reset at E16.RS($n$+$b$3), and the output of gate RD16 will thus be HIGH.

The circuit available latched gate pair RD28–29 will have been set and the output of gate RD28 will also be HIGH. Under these conditions the latched gate pair RD53–54 is set via gate RD52. Once latched gate pair RD53–54 has been set in E16.RS($n$+3) the output is gated with the selected channel at gate RD55, and provides the SETUP SUCCESSFUL signal which is applied to gate RA2 to inhibit the HOLD to the REGISTER and the REGISTER CONNECTION SWITCH. Because of the persistence on the disappearance of the HOLD, the signal has to present for two appearance of frame F4 before the REGISTER is released, and the REGISTER split removed by the REGISTER CONNECTION SWITCH.

The latched gate pair RD53–54 is reset in E26, thus allowing the SETUP SUCCESSFUL signal to be present for three appearances of frame F4. Since the incoming signal REG.REC.(LINE) is delayed by ½ digit, the REGISTER should release in E20.

SECOND ATTEMPT

If the REGISTER checks described are not successful the second attempt latched gate pair RD15–16 is set. The checks are completed by E15.RS($n$+3) and at E19 the output of the latched gate pair RD15–16 is sampled at gate RD17 and if a second attempt is required the latched gate pair RD18–19 is set. The output is gated with TH4/$n$ and TH7/$n$+4 to provide a single 5 $\mu$Ypulse at the beginning of RS($n$+ 4) which provides the SECOND ATTEMPT output for recording purposes. RS$n$ The second attempt is made in the next RS$n$ period following the first attempt, and the setup procedure is exactly as described for that attempt. If one of the REGISTER checks is faulty the second attempt latched gate pair RD15–16 is again set, but now that the latched gate pair RD18–19 is set a LOW output is obtained from gate RD20 at SC.E16.RS($n$+) indicating that the second attempt is unsuccessful. This output causes the N.U. tone STORE to be written and this will result in the removal of the EXCHANGE HOLD signal from the REG.REC.(LINE).

The latched gate pair RD18–19 is reset from gate RD21 via gate RD22 when the REGISTER HOLD disappears, and from the output of gate RD55 if the second attempt is successful.

REGISTER RELEASE

If the setup is unsatisfactory for any reason a signal is sent from the REGISTER to write the N.U. tone STORE. This is a HIGH signal in D1.F2 on the REG.SEND.(LINE). All those REGISTER fault indications that occur at channel time are included in three of the inputs to gate RD81 and the fourth input is from gate RA64. The high output from gate RD81 in the event of a fault is gated with the SHORT HOLD at gate RD82 and used to write the REGISTER RELEASE STORE. A CALLS LOST output is provided from gate RD82 to the TRAFFIC RECORDER.

The output of the REGISTER RELEASE STORE is gated with F2 at gate RD60 and applied to gate RD61, from which it is sent to REG.SEND.(LINE) lead.

FAULT INDICATIONS

Two separate PRINT OUT indications are given by the REGISTER:

i. when fault may be in the REGISTER or may be external to the REGISTER, or ii. when the fault is actually in the REGISTER.

Any faults which render a REGISTER unusable are counted as they occur and as soon as a total of seven such faults is reached on any REGISTER, the REGISTER is busied out. Faults which are due to factors outside of the REGISTER are expected to be randomly distributed between the REGISTERS, and the fault COUNTER in any REGISTER is reset to zero if a fault is detected in another REGISTER before a count of seven is reached.

The outputs of gates RF2 and RF4 write the REGISTER RELEASE STORE via gate RD81. PRINT 1 can be inhibited at gate RF8 by ROUTINER 1 when it is testing for fault indications.

All the fault indications from gates RF1, 3 and 5 are brought via gates RF2, 4 and 6 respectively to gate RF11 and any one of these via gates RF12 and RF88 will cause the FAULT COUNTER RF13–15 to count up one. When the fault COUNTER reaches a count of four the RED LAMP comes on from gate RF17, and when a count of seven is reached a LOW output from gate RF16 is sent to the ALARM PANEL. The input to the COUNTER is then inhibited at gate RF12, thus retaining the ALARM condition until the COUNTER is manually reset. A HIGH signal is also sent from gate RF18 to:

a. the REGISTER CONNECTION SWITCH to busy the REGISTER to further calls, and b. to the ROUTINER to indicate that the REGISTER is busied out.

The output of gate RF59 will be LOW when the COUNTER is reset and HIGH for all other counts. The output of gate RF19 will thus go LOW as soon as a fault is counted and this provides a FAULT COUNTER indication to the other REGISTER FAULT COUNTERS. Similar inputs from the other REGISTERS are combined at gate RF61, and if either of these is LOW when from 1–6 faults have been counted, the counter is reset via toggle RF65–66 via gate RF60. The reset is inhibited at gate RF67 if seven faults have been counted. A manual reset provides the means of resetting the FAULT COUNTER after a register has been busied out.

END MARKING

CALLING SIDE

The calling channel from REGISTER gate RD12 via gates RD13, 39 and 40 and lead INDICATE *i/c* JUNCTION passes through the primed cross-point RS7 in REGISTER CONNECTION SWITCH to gate IT15 in the INCOMING TRUNK UNIT, the output of which fans out to three driver gates IT17*a*, *b* and *c*. Each of these gates serves independently a different security level.

The output of gate IT15 is also applied to gate IT16 which gives access to PATH READER, enabling the identity of the calling trunk and channel to be staticized and printed out if the INDICATE signal is not removed by the REGISTER at gate RD39 before the E23 period.

The common point between gates IT15 and IT17 *a*, *b* and *c* is checked during every channel slot (at TD 8/7 on gate IT105) and if a continuous $\overline{\text{INDICATE}}$ is detected, gate IT17 *a*, *b* and *c* is inhibited by the output lead $\overline{\text{FAULT}}$ of gate IT107. The output $\overline{\text{INDICATE}}$ of gate IT17 *a*, *b* and *c* during periods E1–21 is applied to the incoming side of the A SWITCH, with the calling channel, identified by the channel pulse on an individual lead $\overline{\text{INDICATE CALLING CHANNEL}}$ identifying the calling trunk.

CALLED SIDE

In the REGISTER, the output of gate RC26 via gate RC27 is applied to the gates RC30–38 which may be termed a MARKER to which are also applied the outputs of the CUMULATIVE DIALLED DIGIT COUNTER and STORE so that a gate when activated marks a lead individual to a particular outgoing route.

For example gate RC36 marks lead SU7 This lead passes to the appropriate SYSTEM UNIT, to a U-LINK marked *o/g* MARK and to one of the gates OT25 or OT26 in the associated OUTGOING TRUNK UNIT.

The SYSTEM UNIT also extends from gates SU72 or 73 a waveform indicating which channels, ODD or EVEN are outgoing in that SYSTEM UNIT, to gates OT23 or 24 and so to gates OT35 or 36 respectively. In gates OT35 and 36 the $\overline{\text{MARK}}$ output of gates OT25 and 26 is gated to gate OT37 the output MARK of which is fanned out to three driver gates OT38*a*, *b* and *c*.

WITHIN THE OUTGOING TRUNK UNIT

The outgoing RECEIVE highway is monitored and the CIRCUIT FREE condition is indicated by the presence of the signalling digit D1 as 1 in all ODD frames detected at gate OT13 and lengthened by gates OT14 and 15.

A "busy" condition is deduced from the presence of the HOLD signal, digit D1 as 1 in all EVEN frames on the SEND highway from the C SWITCH.

The common point between gates OT37 and OT38 *a*, *b* and *c* is checked during E27 and if a MARK condition is found the gates OT38 *a*, *b* and *c* are inhibited.

$\overline{\text{BUSY}}$ channels from the BUSY CHANNEL STORE are applied to the gates OT38 *a*, *b* and *c*, so that the free channels appear at the outputs of gates OT38 *a*, *b* and *c* as pulses and these are indicated on signalling leads $\overline{\text{MARK}}$ (FREE *o/g* CHANNELS) to the associated C SWITCH.

RESUME OF END MARKING

CALLING SIDE

The outputs of gates IT17 *a*, *b* and *c* in INCOMING TRUNK UNIT are each connected by an individual lead $\overline{\text{INDICATE CALLING CHANNEL}}$ to its associated A SWITCH, so that when a new call is detected the incoming side of the A SWITCH is made aware of it by a single pulse per frame identifying the calling channel, on an individual lead $\overline{\text{INDICATE CALLING CHANNEL}}$ identifying the calling INCOMING TRUNK UNIT, i.e., calling side is "INDICATED."

CALLED SIDE

The outputs of gates OT38 *a*, *b* and *c* in OUTGOING TRUNK UNIT contain the pulses of channels available to make connection to the wanted outgoing route, and these appear on leads $\overline{\text{MARK}}$ (FREE *o/g* JUNCTIONS) connected to the associated C SWITCHES, i.e., called side is "MARKED."

If there is more than one P.C.M. System serving an outgoing route, then each System having channels available, will MARK a different C SWITCH.

CALLING SIDE

INCOMING TRUNK UNIT—A SWITCH

Outputs $\overline{\text{INDICATE}}$ (CALLING CHANNEL) of gates IT17 *a*, *b* and *c* are each connected by an individual lead to gate A7, together with similar outputs from other INCOMING TRUNK UNITS. Each $\overline{\text{INDICATE}}$ lead is also connected to ENCODER gates A9–11 to give the code of the TRUNK UNIT, so that via gates A15–17 the A SWITCH CONNECTION is primed with the code of the TRUNK UNIT at the time of the calling channel. The free channels in the CONNECTION STORE are detected by gate A42, the output of which, via gate A53, gates the output of gate A7 through gate A8 to output lead $\overline{\text{INDICATE}}$ connected to gate AB8 in the A–B LINK/BZ SWITCH.

The CONNECTION STORES are associated with the LINKS, so that if a channel is free in the STORE, it is free in the LINK.

CALLED SIDE

OUTGOING TRUNK UNIT—C SWITCH

The outputs $\overline{\text{MARK}}$ (FREE *o/g* CHANNELS) of gates OT38 *a*, *b* and *c* are connected to gate C7 together with similar outputs from other OUTGOING TRUNK UNITS. Each $\overline{\text{MARK}}$ lead is also connected to ENCODER gates C22–24 to give the code of the TRUNK UNIT, so that via gates C25–27 the C SWITCH CONNECTION STORE is primed with the code of the TRUNK UNIT. The free outgoing channels in the CONNECTION STORE are detected by gate C41, the output of which via gate C19, gates the output of gate C7 through gate C8 to lead $\overline{\text{MARK}}$ (*o/g* JUNCTIONS FREE IN LINK) connected to gate BC8 in B–C LINK UNIT.

Thus, the conditions are:

CALLING SIDE

Calling channel on $\overline{\text{INDICATE}}$ lead as input to gate AB8 of A–B LINK/BZ SWITCH.

CALLED SIDE

All available channels for making connection to wanted routes on $\overline{\text{MARK}}$ lead as input to gate BC8 of B–C LINK.

It is now necessary to select a CORD CIRCUIT in order to complete a connection between the CALLING and CALLED sides.

SELECTION OF CORD CIRCUIT

The output of gate AB8 in A–B LINK/BZ SWITCH is applied to:

i. latched gate pair BZ27–28 for access to ZERO delay CORDS, ii. gate AB9 for access to FIXED and VARIABLE delay CORDS.

CORDS are selected in a preferred sequence of ZERO first, then FIXED, and finally VARIABLE, by inspection at different frame times.

SELECTION OF ZERO DELAY CORD (during E3 frame)

A ZERO delay CORD, is a no-delay connection between A and BZ SWITCHES, made up of an A–B LINK and a B–C LINK, formed by the BZ SWITCH.

A BZ SWITCH CONNECTION STORE is associated with each A–B LINK.

The output MARK (*o/g* CHANNELS FREE IN LINK) of gate BC8 in B–C LINK is connected via one of the gates BC10 each marked by a different TD 8/*n* to lead $\overline{\text{MARK}}$, to the BZ SWITCH, where it is connected to ENCODER gates BZ44–46, and in common with similar leads from other B–C LINKS to gate BZ 32. The output of gate BZ32 contains all the free outgoing channels available for making a connection to the wanted route, and in looking for a ZERO delay connection, coincidence between the calling channel and one of those must be found.

The calling channel from gate AB8 in A–B LINK/BZ SWITCH via gates BZ 27–30 occupies the period from TD8/2.$\overline{\text{TC}}$ to TD 8/7.$\overline{\text{TC}}$ and is applied on lead INDICATE (RETIMED) to gate BZ 31. If coincidence is found at gate BZ 31 during E3 frame, with a MARK from B–C LINK via gate BZ32, the output of gate BZ31 sets the latched gate pair BZ33–34 to prime the ONE-ONLY SELECTOR gate BZ35 and extend from gate BZ34 the $\overline{\text{CAN DO}}$ output to indicate that the BZ SWITCH is capable of taking the connection.

A number of BZ SWITCHES may be in this condition.

SELECTION of BZ SWITCH (during E3–E4 frames)

Each BZ SWITCH has a COMMON UNIT. The COMMON UNITS are controlled by a B SWITCH SELECTOR UNIT, which is a ring counter (triplicated for security) with an output to each B SWITCH. The counter is driven at channel slot rate, and preferably the number of counter outputs is prime to the waveform rate, so that a degree of randomness is obtained. The counter is driven by TD 8/7 via gates SS7 and SS8. In stepping over the stages, the outputs indicate in turn on lead O/P SELECTOR to gate M17 in B SWITCH COMMON UNIT

B SWITCH COMMON UNIT

Gate M9 is receiving $\overline{\text{CAN DO}}$ signal from BZ SWITCH. The outputs of gates M9 and M17 open gate M14.

The output of gate M14 $\overline{\text{STOP SELECTOR}}$ is returned to gate SS2 in B SWITCH SELECTOR and via gate SS3 causes latched gate pair SS5–6 to inhibit the counter drive at gate SS7.

The counting arrangement is triplicated. All three counters should stop thus maintaining the input to gate M17 and the output from gate M14. This causes gate M11 to give a sustained HIGH output, and if at least two out of the three B SWITCH SELECTORS have stopped on the same step, the three inputs to gate M10 remain HIGH.

The output of gate M10 is checked during E27 frame via gates M5 and 6 and in the absence of a FAULT the output $\overline{\text{DO}}$ of gate M10 via operated relay contact A1 is extended to gate BZ58 in the particular BZ switch selected.

Relay A is initially operated through latched pair gates M7 and 8 to a manually operated key FAULT TOGGLE RESET. If a FAULT is encountered the latched gate pair M7 and 8 change over to release the relay, thus opening contact A1 to prevent the $\overline{\text{DO}}$ signal being passed to the B SWITCH.

WRITING THE BZ SWITCH (during E9 frame)

In the absence of a fault the input $\overline{\text{DO}}$ to gate BZ58 results in the WRITE gates BZ47–49 being primed, these gates already receiving a coded input via gates BZ44–46 from the $\overline{\text{MARK}}$ lead of the B–C LINK to which connection is to be made. ONE-ONLY SELECTOR gate BZ35 is already primed by the output of gate BZ33, with the calling channel on INDICATE lead from gate BZ29 and with the $\overline{\text{MARK}}$ from B–C LINK via BZ32, so that at E9 frame time a selection is made at the calling channel time, and the output of gate BZ35 via gate BZ39 opens the WRITE gates BZ47–49 to allow the code of the B–C LINK to be written into the BZ SWITCH STORE in the calling channel time-slot.

ONE-ONLY SELECTOR

When a one-only selection has been made in gate BZ35, it is necessary to inhibit the gate to further input pulses. This is done by the output of gate BZ35 setting the latched gate pair BZ36 and 37 and inhibiting gate BZ38 to which the output of gate BZ36 is also applied as an input. At the end of the pulse on output of gate BZ35, the inhibition on gate BZ38 is removed, and the output of gate BZ36 via gate BZ38, is used to inhibit gate BZ35. Thus only one pulse is allowed to pass through gate BZ35 for each selection.

This causes the BZ SWITCH cross-points BZ1 and 2 connecting the A–B LINK to the B–C LINK to conduct at calling channel slot time one frame later i.e., during E10, and in all subsequent frames until the connection is released. Writing the BZ SWITCH STORE produces an output at the channel time on the BUSY lead input to gate BZ3. This allows the internal control digit (TD 8/2.F2+F4) to be injected via retiming gates BZ41–42 as input to gate AB1 and via gate AB2 on to the SEND highway of the calling A–B LINK, to the A SWITCH.

WRITING THE A SWITCH (during E10 frame)

In the A SWITCH the signal on the SEND highway is retimed by gates A4–5 and then via gates A6 and A21 is stretched by latched gate pair A22–23 to cover TD 8/6 to produce SEND DIGIT 1 (D1) to gate A28. In the absence of ERROR at gate A28, lead D1 via gate A33 applies a HOLD condition to the A SWITCH STORE. Coincidence in gates A15–17 of D1 lead with FREE Lead from gate A53, causes the code of the calling INCOMING TRUNK UNIT to be written into the A SWITCH STORE.

Writing the A SWITCH STORE causes the $\overline{\text{FREE}}$ output of gate A42 via gate A53 to inhibit gate A8 to prevent further appearances of the calling channel on output lead $\overline{\text{INDICATE}}$. WRITING THE C SWITCH (during E15 or E17 frames)

The C SWITCH is written in a manner similar to the A SWITCH, by means of the signalling digit received through the A SWITCH cross-point A1 and gate A3, the RECEIVE highway to A–B LINK/BZ SWITCH, gates AB3 and AB4, BZ SWITCh cross-point BZ1, RECEIVE highway to ZERO CORD, IN center of which change to SEND highway to B–C LINK at gate BC1 and via gate BC2 to SEND highway to C SWITCH, where via gates C4, C5, C6 and C9, on lead $\overline{\text{D1}}$ to latched gate pair C10 and 11, on output lead D1 to WRITE gates C25–27. Writing is held back however by applying waveforms E15+16+17 to WRITE gates C25–27 in order to allow a period E11 to E15 during which the A and BZ SWITCH cross-points are conducting and the REGISTER can test for faulty gates or double connection by the receipt of nothing on the REGISTER RECEIVE (EXCHANGE) lead from REC. in C SWITCH in both E13 and E15 frames.

The C SWITCH cannot be written during an EVEN frame by the HOLD signal D1.(F2+F4) from the REGISTER, because the i *o/g* MARK depends on the receipt of CIRCUIT FREE signal, i.e., a "1" from the distant end during ODD frames. The REGISTER therefore injects D1 during E15 frame to write the C SWITCH via IT6 in *i/c* TRUNK UNIT to REC. highway.

In the case of a ZERO delay connection via a BZ SWITCH this pulse will be received during E15 frame and the C SWITCH cross-point will first conduct during E16 frame.

If however the connection had been set up via a delay CORD the writing signal may be delayed by two frames in which case the C SWITCH STORE is not written until E17 frame and the cross-points will first conduct during E18 frame.

The C SWITCH cross-points conducting allows the CIRCUIT FREE signal on REC. HIGHWAY to pass through to the CORD and then via SEND HIGHWAY, and REG.REC.EXCHANGE to the REGISTER until the equipment is seized at the distant end of the outgoing route. The REGISTER checks that the signalling digit is "1" during both E19 and E21 frames and if so, removes the INDICATE condition from gate RD39. The REGISTER can then proceed to seize the distant end equipment and check that seizure has occurred, without retaining connection to the marking paths.

SELECTION OF FIXED DELAY CORD (during E5 frame)

The $\overline{\text{INDICATE}}$ incoming to gate AB8 in A–B LINK as well as passing to the BZ SWITCH as already explained, is inverted in gate AB9 and fanned out to a number of BI SWITCH UNITS each of which is associated with a DELAY CORD. The INDICATE leads from all A–B LINKS are combined at gate B14, but each is taken individually to the ENCODER gates BI44–46 to prime gates BI47–49 inputs to the BI SWITCH CONNECTION STORE with the code of the indicated A–B LINK.

On the CALLED side of the CORD the MARK leads from all B–C LINKS BC9 gates are similarly fanned out in the B–C LINK UNIT to a number of BO SWITCH UNITS each of which is associated with a DELAY CORD.

The MARK leads are combined at gate B032, but each is taken individually to ENCODER gates B044–46 to prime gates BO47–49 inputs to the BO SWITCH CONNECTION STORE with the code of the marked B–C LINK.

The INDICATE output of gate BI4 in the BI SWITCH is gated with the FREE channels from the BI CONNECTION STORE in gate BI6.

If the calling channel is free in the BI STORE it is free in the CORD, and the output of gate BI14 is retimed by gates BI5–8 and the output $\overline{\text{INDICATE}}$ from gate B17 is injected into gate B13 for FIXED CORD and passes via RECEIVE highway to the CORD to gate CD27, toggle CDT1, gate CD1, toggle CDT4, SEND highway to gate BO6 in the BO SWITCH.

The INDICATE signal is thus subjected to the delay of the CORD and appears at gate B06 a fixed number of channel-slot times later dependent on the CORD. The output of gate B06 is gated at gate B07 with the FREE channels from gate BO5, and is applied to gates BO8 and 9 to produce output INDICATE to gate B033 where it is compared with the MARK FREE *o/g* channels in the B–C LINK from gate BO32 from BC9 in the B–C LINK. If coincidence is found the latched gate pair B034–35 is set so that gate BO35 gives an output $\overline{\text{CAN DO}}$ signal to the B SWITCH COMMON UNIT to indicate that the BO SWITCH is capable of accepting the connection.

SELECTION of BO SWITCH (during E5 frame)

Several BO SWITCHES may be in this condition and the output of each B035 gate, i.e., the $\overline{\text{CAN DO}}$ lead, is connected to the next forward switch as a reset, so that the earliest choice of the switch capable of accepting a connection, is chosen.

The choice of a BO SWITCH is made by the B SWITCH SELECTOR UNIT, as previously described in the selection of a BZ SWITCH, the only difference being that whereas a BZ SWITCH is selected during E3 frame time, a BO SWITCH is selected during E5 frame time, so that a preference is given to the BZ SWITCHES incorporating the zero DELAY CORDS.

WRITING BO AND BI SWITCHES (during E9 frame)

One-only selection of an outgoing channel and B–C LINK proceeds during E9 frame at gate B036 in the selected BO SWITCH. The output of gate B036 via gate BO41 and WRITE gates BO47–49, writes the code of the B–C LINK in the outgoing channel time-slot of the BO SWITCH CONNECTION STORE. The BI SWITCH STORE of the selected CORD is already primed with the code of the A–B LINK in the calling channel time-slot and the STORE is written by a signal from gate B060 covering E9 frame, which is strobed on the WRITE gates BI47–49 with TD 8/2.

WRITING THE A SWITCH (during E10 frame)

The BI SWITCH cross-points BI1 and B12 conduct during E10 frame and the BUSY condition injects the INTERNAL CONTROL SIGNAL (TD 8/2.(F2+F4)) via gates BI10–11 and 14 into gate BI9. This passes through cross-point BI2 to SEND highway and via gates AB1 and AB2 in A–B LINK to gate A4 in the A SWITCH to write the code of the calling INCOMING TRUNK UNIT in the A SWITCH STORE as already described in the selection of a ZERO DELAY CORD.

WRITING THE C SWITCH (during E15 frame)

The C SWITCH STORE IS written in a manner similar to that already described in the selection of a ZERO DELAY CORD. The signalling digit through the A SWITCH cross-point A1 and gate A3, RECEIVE highway to A–B LINK, to gate AB3, then instead of to gate AB4 as for ZERO DELAY CORD, to gate AB6 and RECEIVE highway to BI SWITCH, through cross-point BI1, gate BI3, RECEIVE highway into the FIXED DELAY CORD, out of CORD on SEND highway to the BO SWITCH, via gate B04, cross-point B02 to B–C LINK, via gates BC1 and 2 to C SWITCH, via gates C4, 5, 6 and 9 to write the C SWITCH STORE at WRITE gates G25–27:

SELECTION of VARIABLE DELAY CORD (during E7 frame)

A VARIABLE DELAY CORD is selected only if no ZERO or FIXED DELAY CORD has been selected.

The circuit operation in the BI and BO SWITCHES is the same as that already explained for the selection of a FIXED DELAY CORD, up to the point of the $\overline{\text{INDICATE}}$ signal from gate BI7 in the BI SWITCH.

The output of gate BI7 as well as being applied to gate BI3 for FIXED DELAY CORD, is connected to gate CD8 of VARIABLE DELAY CORD.

A VARIABLE DELAY CORD is capable of introducing any number of channel slot delays, but it is necessary to store the delay associated with each input slot.

Each variable cord comprises a control store of a matrix type of 8 columns and 24 rows. The columns correspond to the 8 digits in a channel, and the rows to the 24 channels in a frame.

Incoming receive signals are distributed in sequence to the 24 rows of the store such that the 8 digits of channel slot 1 are stored in row 1, and those of channel slot $x$ in row $x$, the active bit in the store being identified by coordinate marking of row and column.

A slot change from channel slot $x$ to channel slot $y$, is made by reading the contents of row $x$ at a time appropriate to channel slot $y$.

This operation uses the storage capacity of row $x$ for the time interval from channel slot $x$ to channel slot $y$, and it follows that the storage capacity of this row is available from channel slot $y$ round to channel slot $x$ in the next frame, and it is this interval that is used for the complementary delay required for the other direction of transmission.

Thus the complementary pair of delays required for a given slot change is accomplished in a single row of the store, and hence a single frames worth of storage provides fully flexible slot changing for both directions of transmission.

Figure 11B:
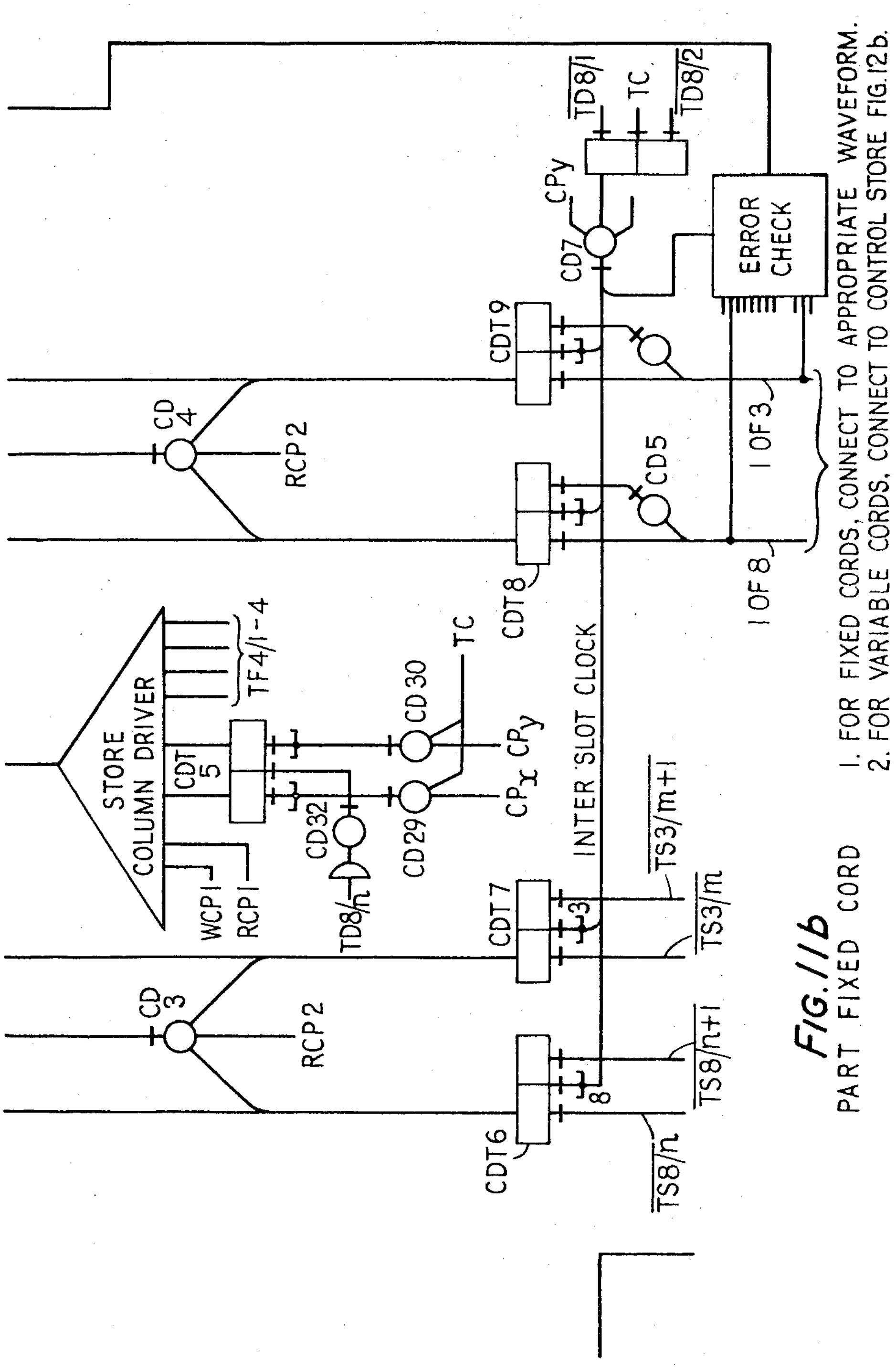
Figure 12A:
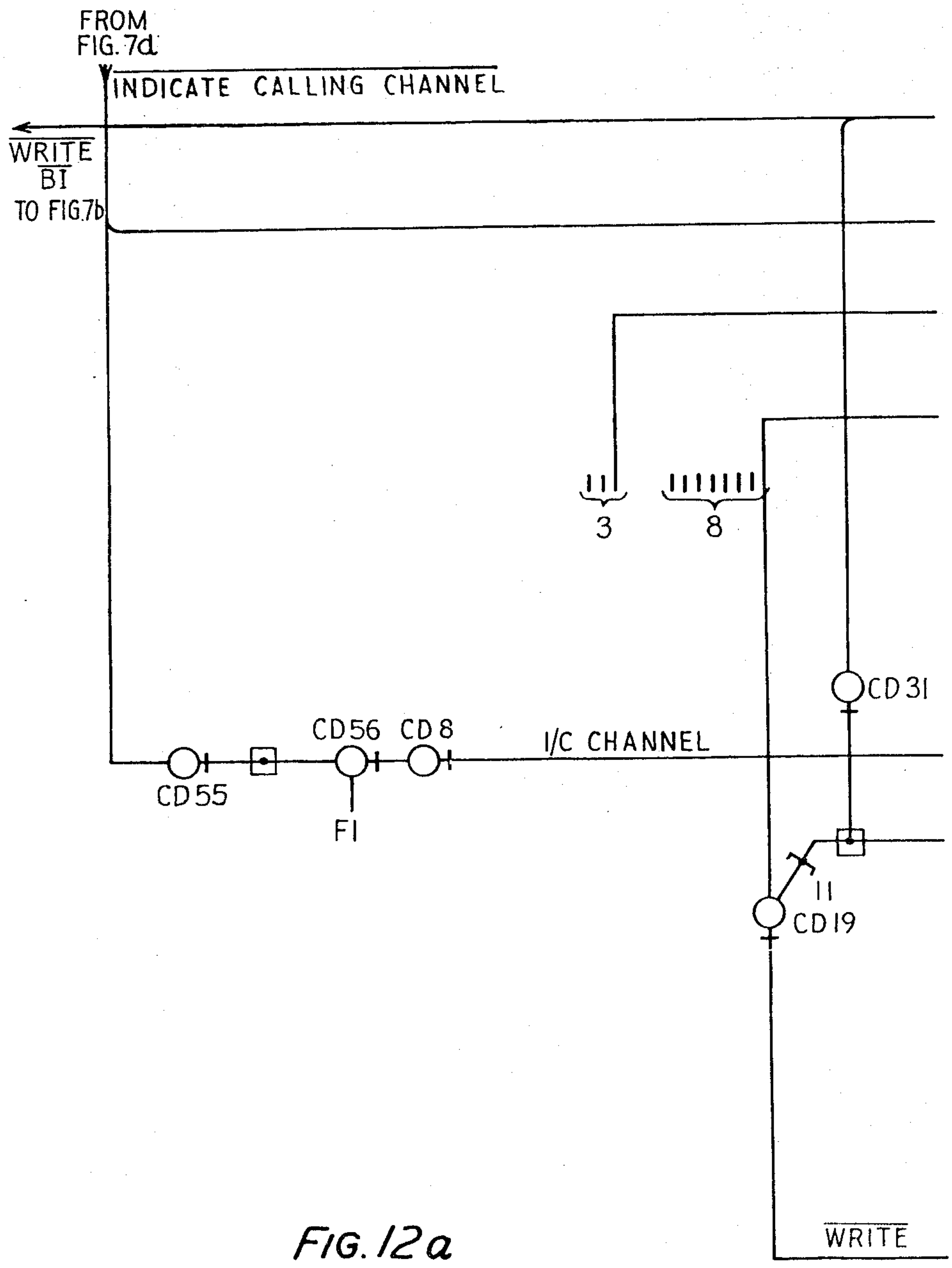
Figure 12B:
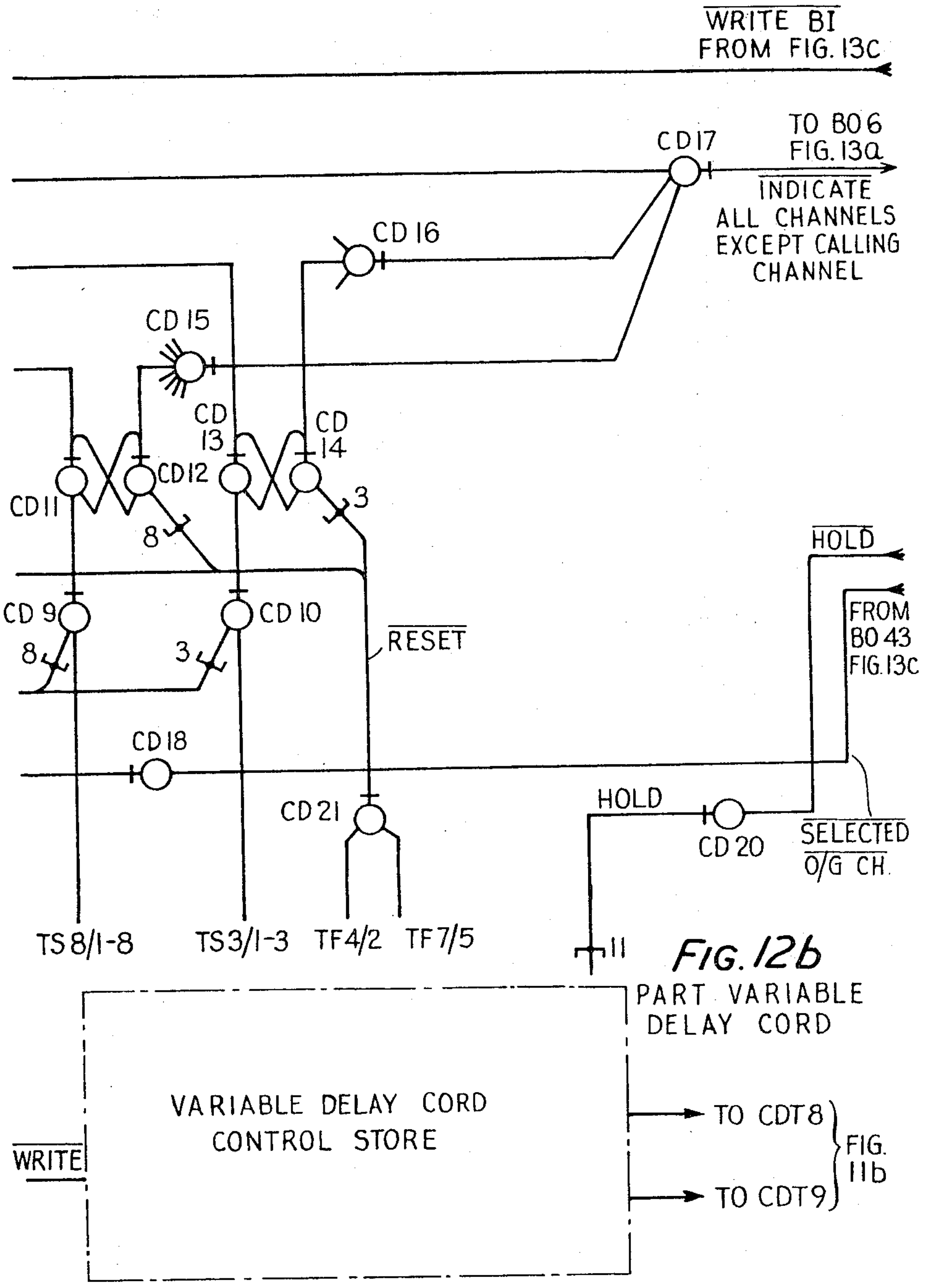
Figure 13A:
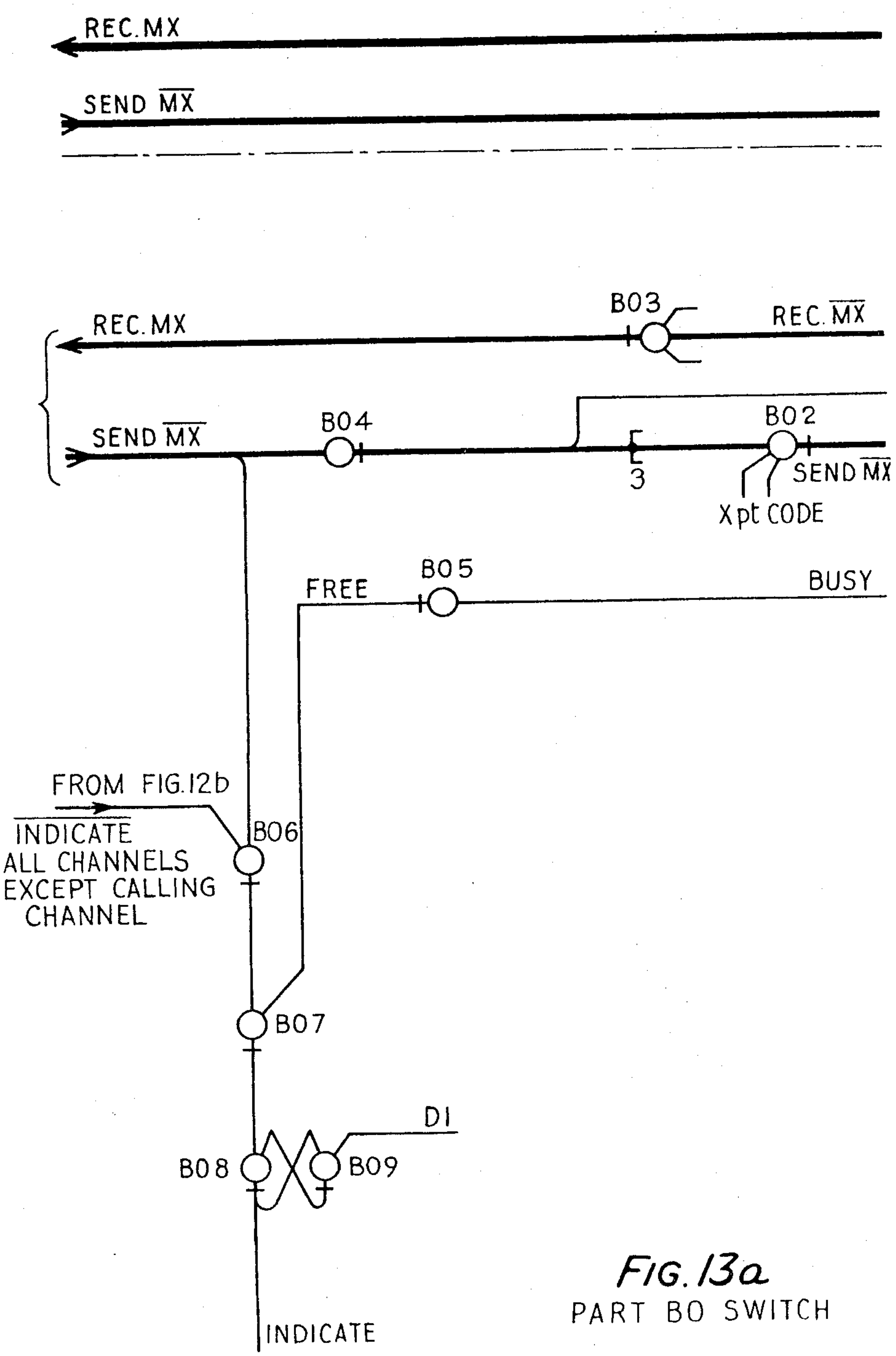
Figure 13B:
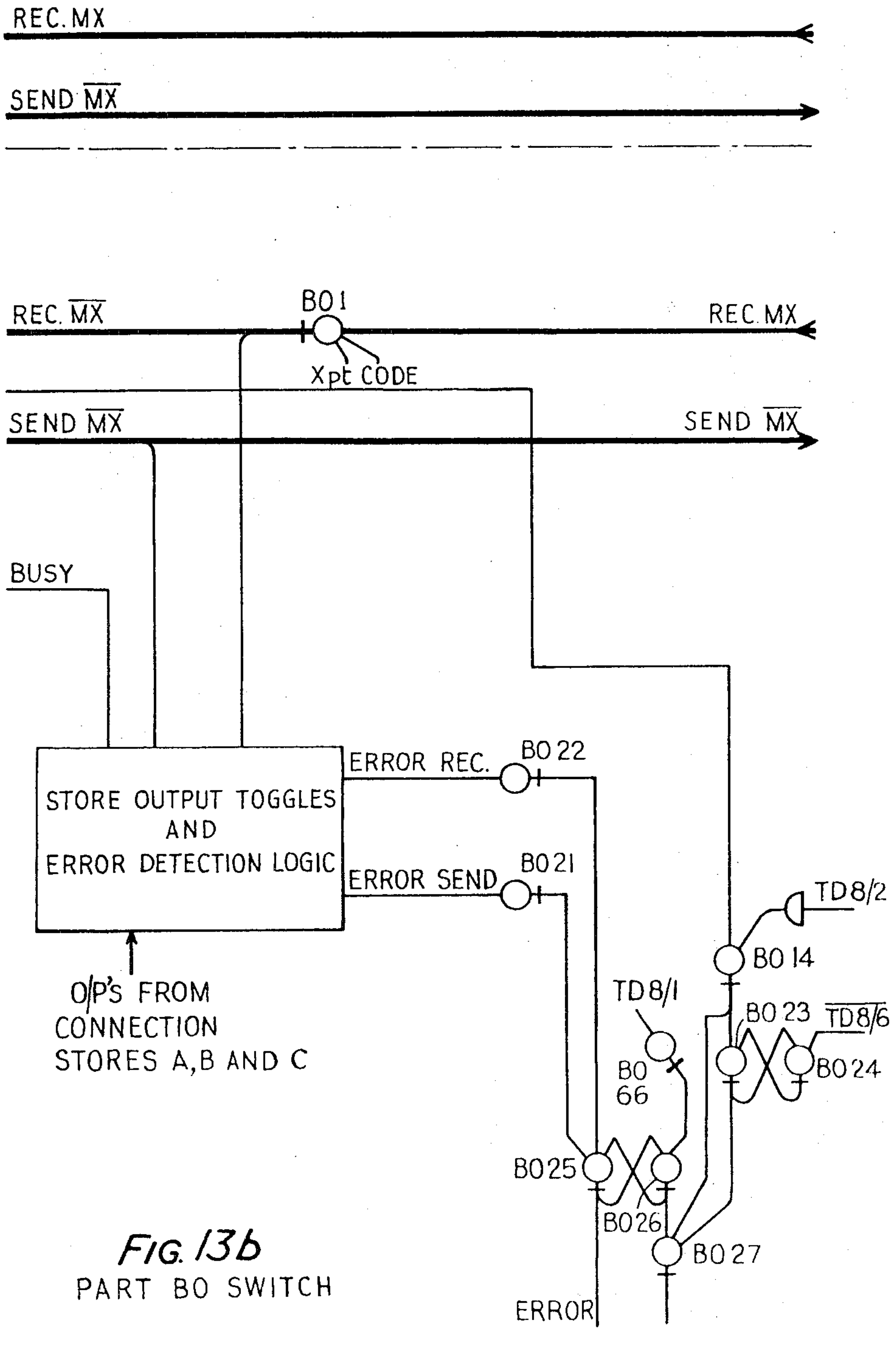
Figure 13C:
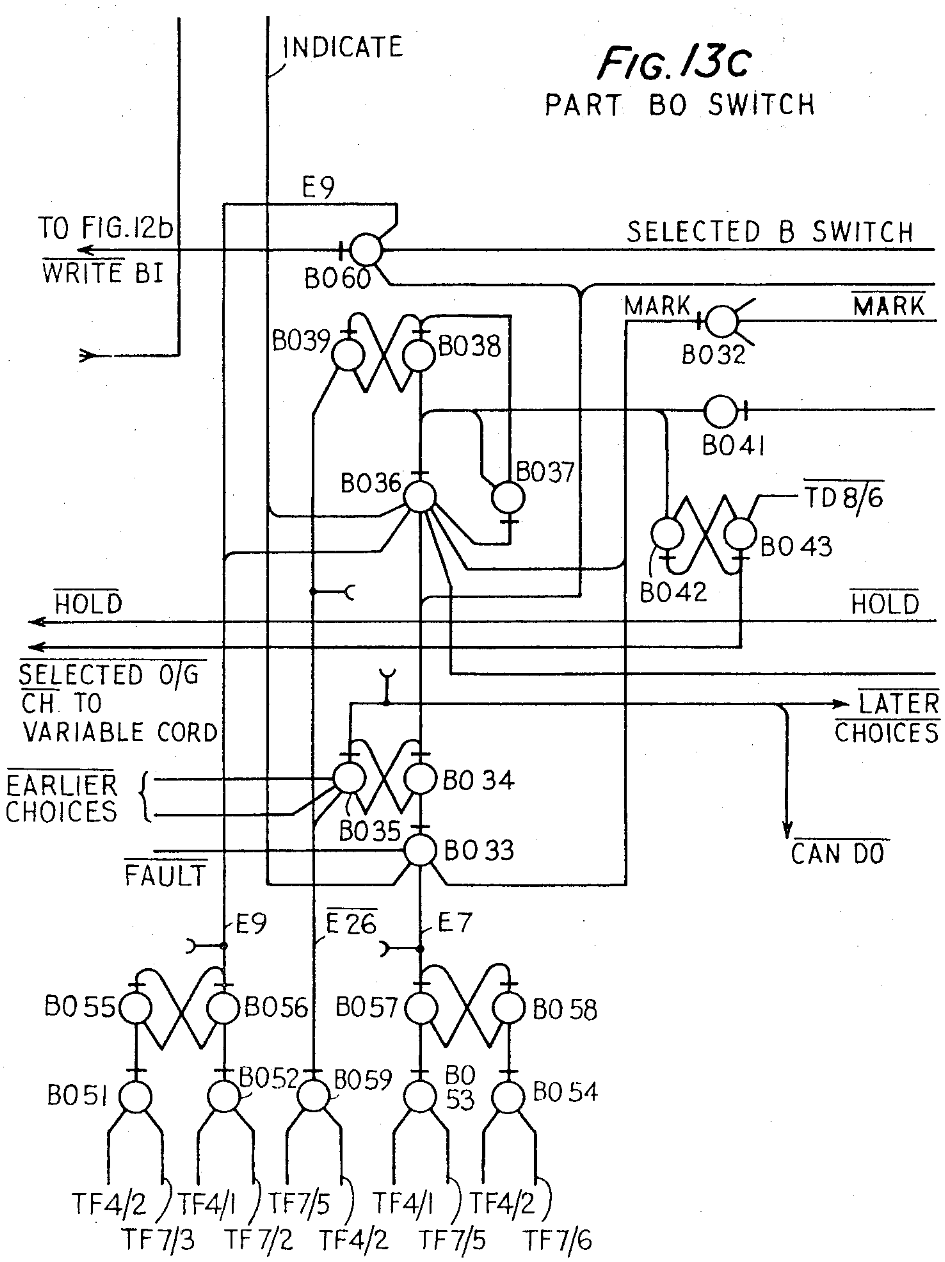
Figure 13D:
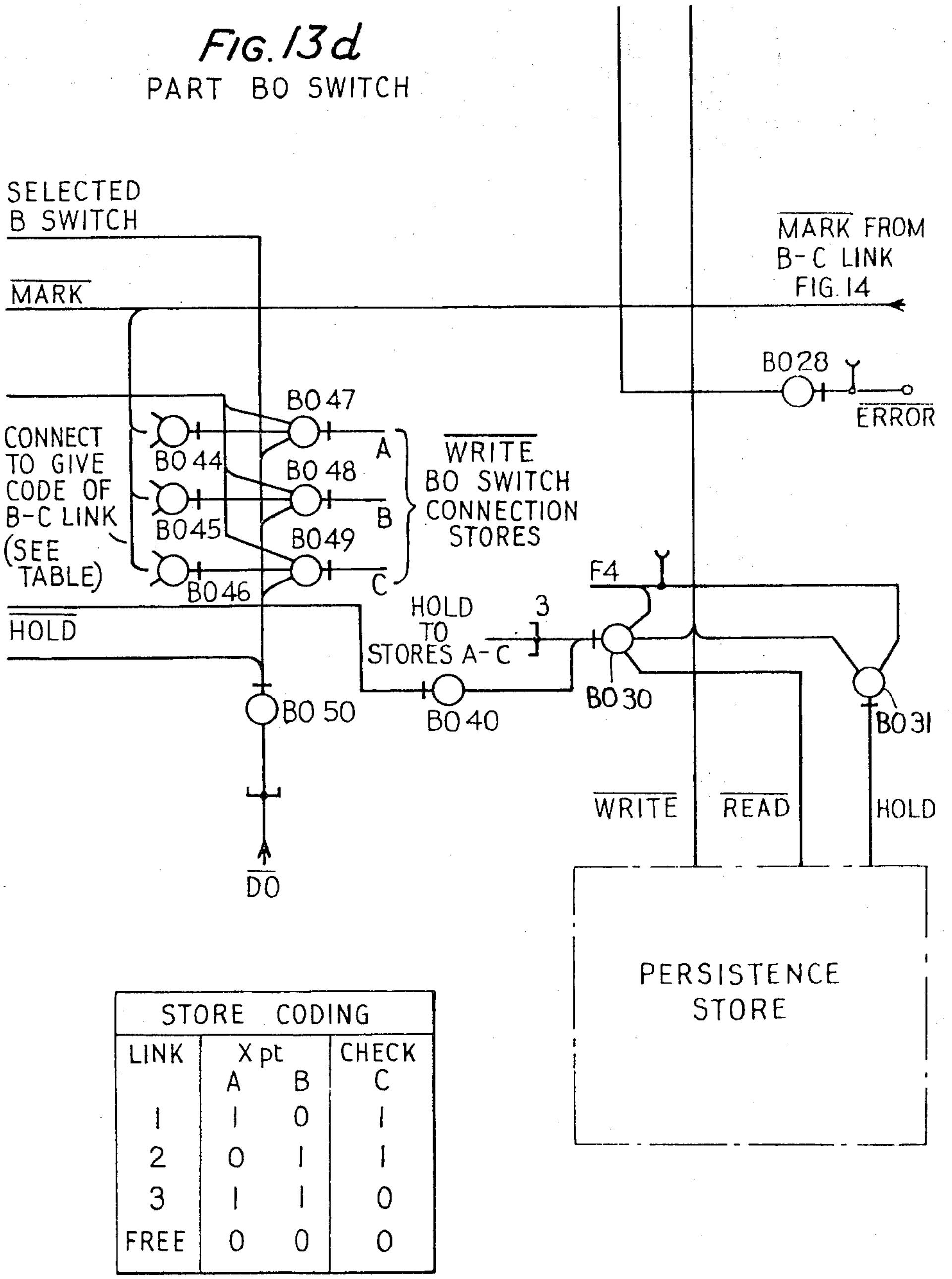
Figure 14:
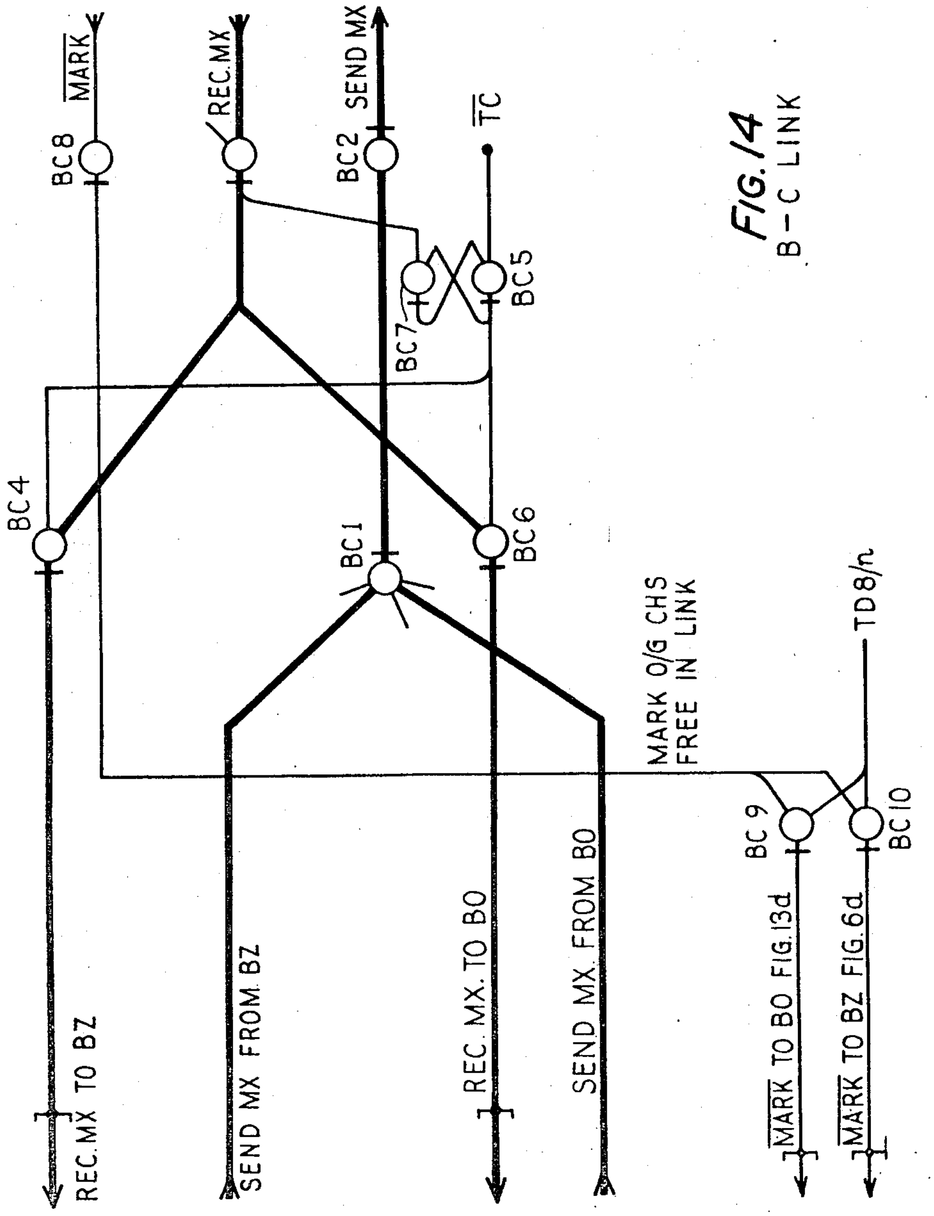
Figure 16A:
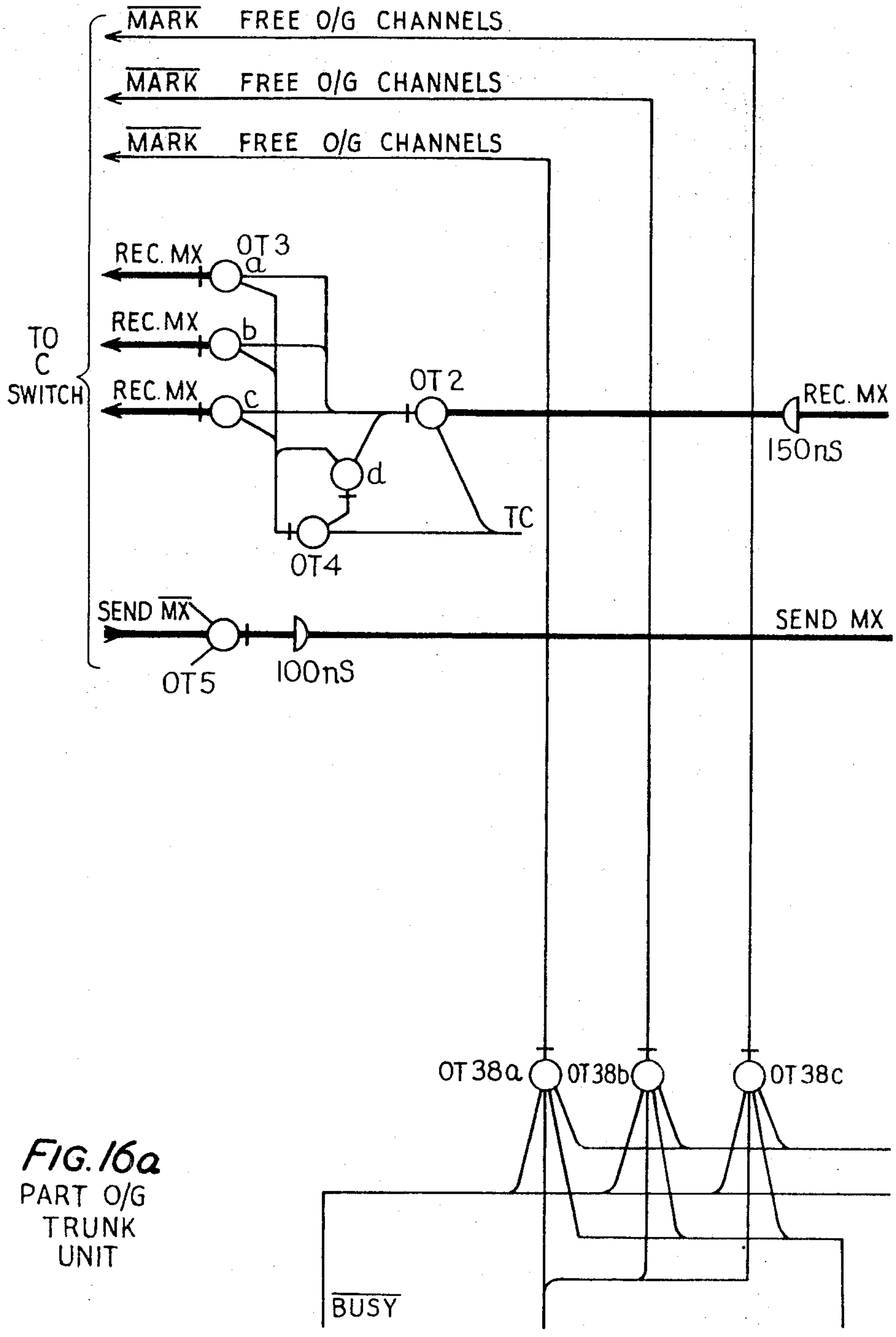
Figure 16B:
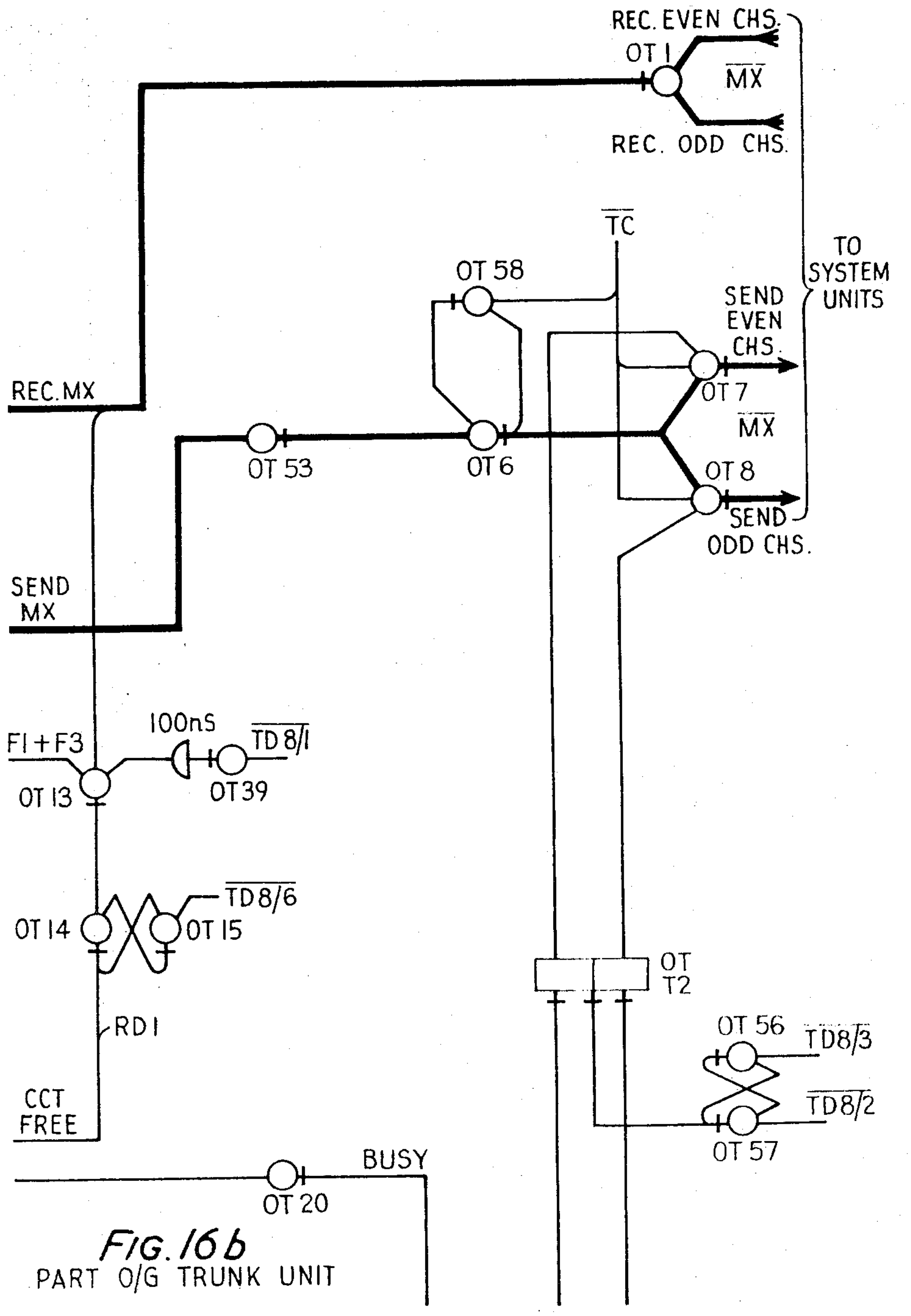
Figure 16C:
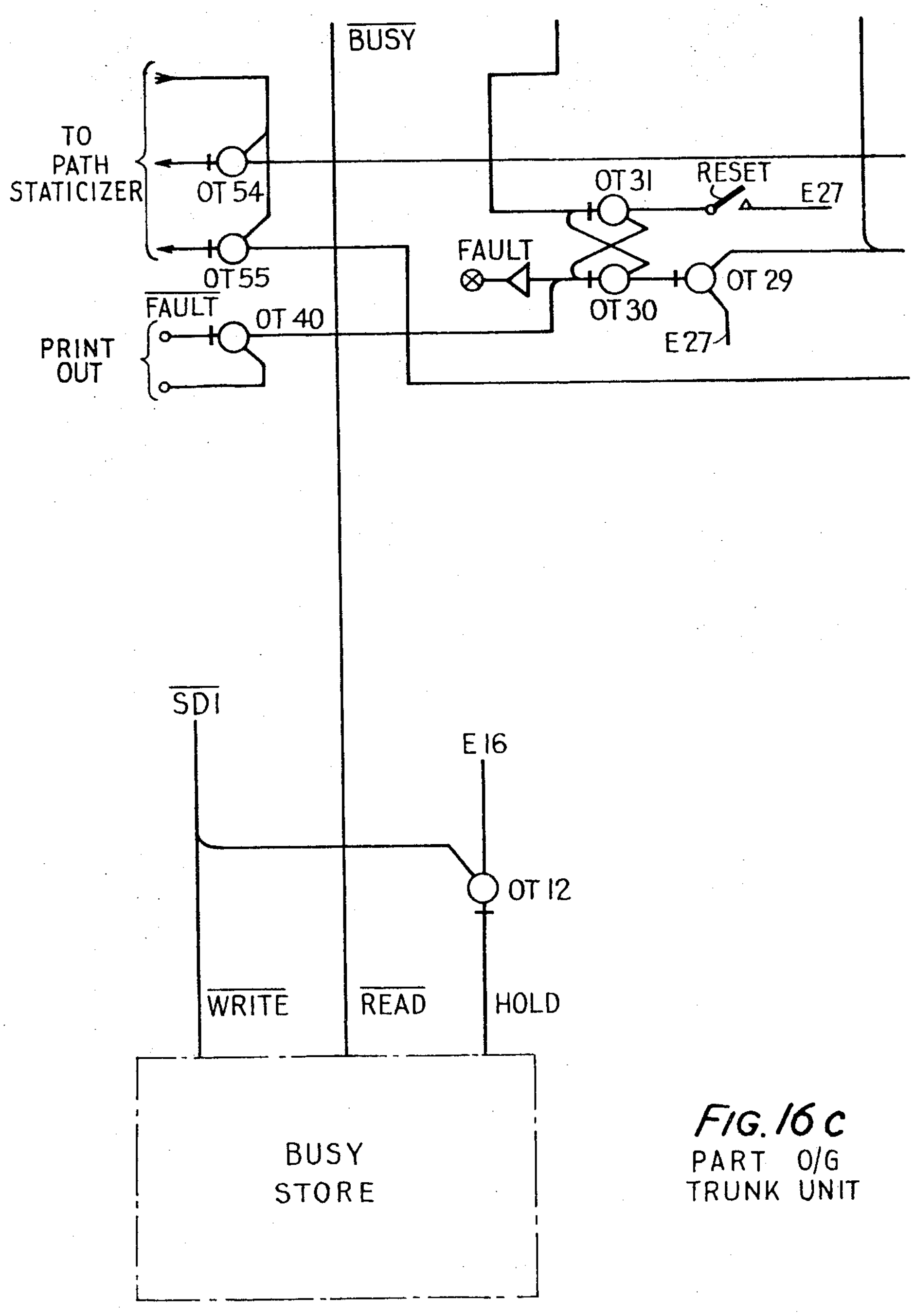
Figure 16D:
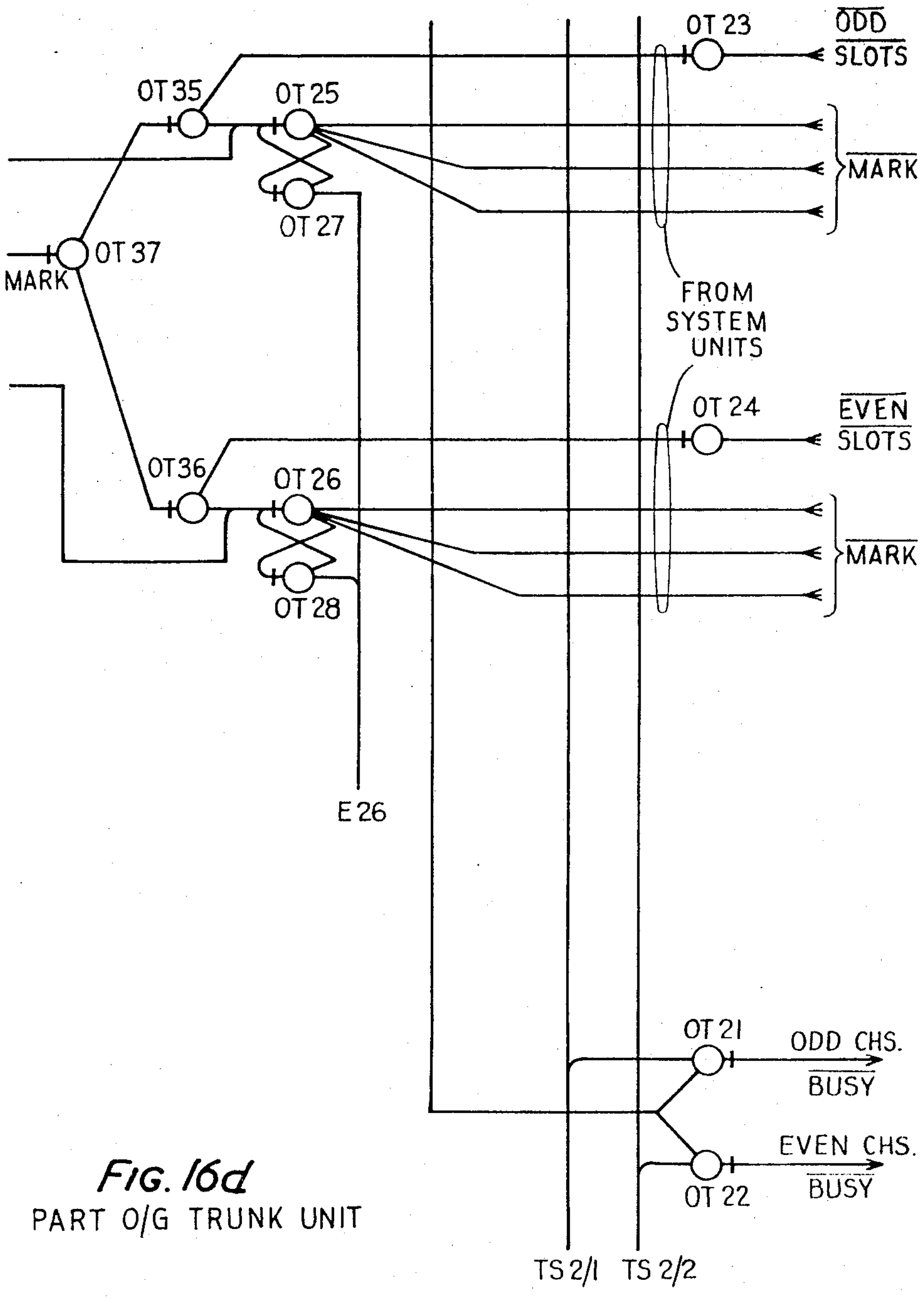

FIG. 11 shows one row of a cord. A message in slot $x$ on REC.MX is distributed to row $x$ of the matrix store by gate CD1, which is controlled by the appropriate coded signals from toggles CDT6 and 7. The output of these toggles are marked by slot length pulses arranged in a code so that a unique row of the store is addressed in each of the 24 time slots. Each logical '1' of the message on the incoming REC.MX in slot $x$ changes the capacitors of row $x$ of the store as each column is marked in turn. This change remains until the readout detector CD38 is operated by the appropriate coded signals from toggles CDT8 and 9. These coded signals serve to address row $x$ at the time of slot $y$. In the other direction of transmission, the message at slot $y$ time on the outgoing REC.MX, is directed to row $x$ of the store by gate CD2 controlled by the coded signal from toggles CDT8 and 9. The change on the capacitor in the store remains until the read out detector CD37 is operated by the coded signals from toggles CDT6 and 7 at slot $x$ time.

The incoming circuits are permanently associated with particular store locations and an additional DELAY CONTROL STORE is provided in which the slot time at which each location is to be read is stored. In effect this STORE contains the code of the calling channel (i.e., the store location) in the outgoing channel time-slot.

The output *i/c* CHANNEL of gate CD8 in VARIABLE CORD is applied to staticize the corresponding TS8/-and TS3/-waveforms in a 1 out of 8 and a 1 out of 3 code on eleven latched pairs typically CD11–CD12, and CD13–CD14.

The INDICATE lead from gate B17 is also applied to gate CD17 together with the outputs of the 1 out of 8 and 1 out of 3 latched pairs. The output of gate CD17 is $\overline{\text{INDICATE}}$ ALL CHANNELS EXCEPT THE CALLING CHANNEL, and is applied to the BO SWITCH at gate BO6, the output of which is applied to gate BO7. The operation in BO SWITCH is then as described for selection of FIXED CORD. In gate BO7 it is gated with the FREE channels, in the BO SWITCH STORE, and retimed by gates BO8 and 9 to produce a pulse for every free channel except the calling channel. The output of gate BO8 is applied to gate BO33 where it is compared with the MARK FREE *o/g* CHANNELS *in the B–C LINK from gate BO32. If coincidence is found the latched pair gates BO34–35 is set so that gate BO35 gives* $\overline{\textit{CAN DO}}$ *signal to indicate that the BO SWITCH is capable of receiving the connection.*

WRITING VARIABLE CORD (during E9 frame)

if no ZERO or FIXED DELAY CORD has been selected, the B SWITCH SELECTOR will be stopped by a VARIABLE DELAY CORD. This allows the ONE-ONLY SELECTOR gate BO36 to select in E9 frame an outgoing channel and to write the BO and BI SWITCH STORES as for a FIXED DELAY CORD.

The VARIABLE DELAY CORD STORE is also written at the outgoing channel-slot time. The selected channel from gate BO36 is retimed by gates BO42, 43 and buffered by gate CD18 in VARIABLE CORD, whose output gated by output of CD31 from BO60 is fanned out to eleven staticizer, CD19. Two of those gates are primed from the staticizer; so that the selected outgoing channel is written into the CONTROL STORE at the calling channel-slot time. The calling channel's store location is then "read" by the CONTROL STORE output at the outgoing channel slot-time.

HOLDING CONNECTION

The internal control signal D1./F2+F4) is used to hold all connections once they have been established. It is injected into the internal multiplex highways during EVEN frames in place of the distributed synchronizing signal. This HOLD signal is controlled in the forward direction by the SUPERVISORY UNIT associated with each INCOMING TRUNK UNIT and by the REGISTER during the setting up period. This FORWARD HOLD signal is used to cause the content of the BZ, BI, BO and C SWITCH STORES and VARIABLE DELAY CONTROL STORE, to circulate. The A SWITCH STORE is dependent on a BZ or BI SWITCH STORE which when active inject BACKWARD HOLD signal from gates BZ3 or BI14.

The SWITCH CONNECTION STORES require the HOLD signal to be present during TD 8/5 of the channel slot and to appear at the time of initial writing and in all subsequent frames. The HOLD signal received at the SWITCHES must therefore be inserted during the through signalling frames (F1+F3) and it is convenient to override it by an inverted F4 (i.e., F1+F2+F3) as, for example, at gates A33 and C15. As a result of this, normal clearance must occur in an F4 period.

To avoid false clearance resulting from failure to receive a single appearance of D1.F4, a persistence test is incorporated in each CONNECTION STORE. The persistence test is written by any appearance of D1=1 and is held by F4+D1.F4). The output overrides the internal control, at for example, gates A33 and C15 and a period of D1=0 embracing two consecutive appearances of F4 is required in order to release the connection.

CROSS-POINT ERROR DETECTOR

Figure 5A:
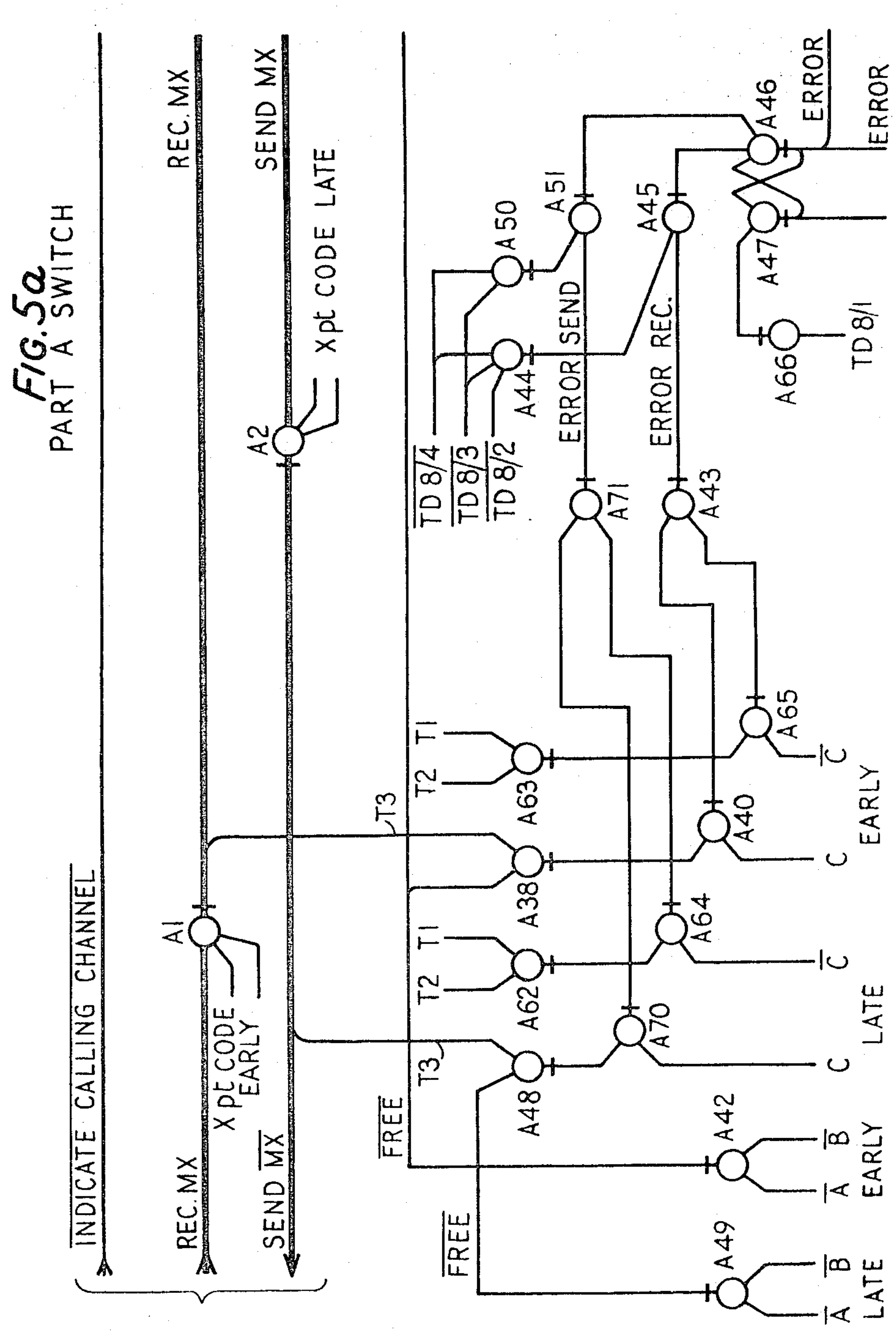
Figure 5B:
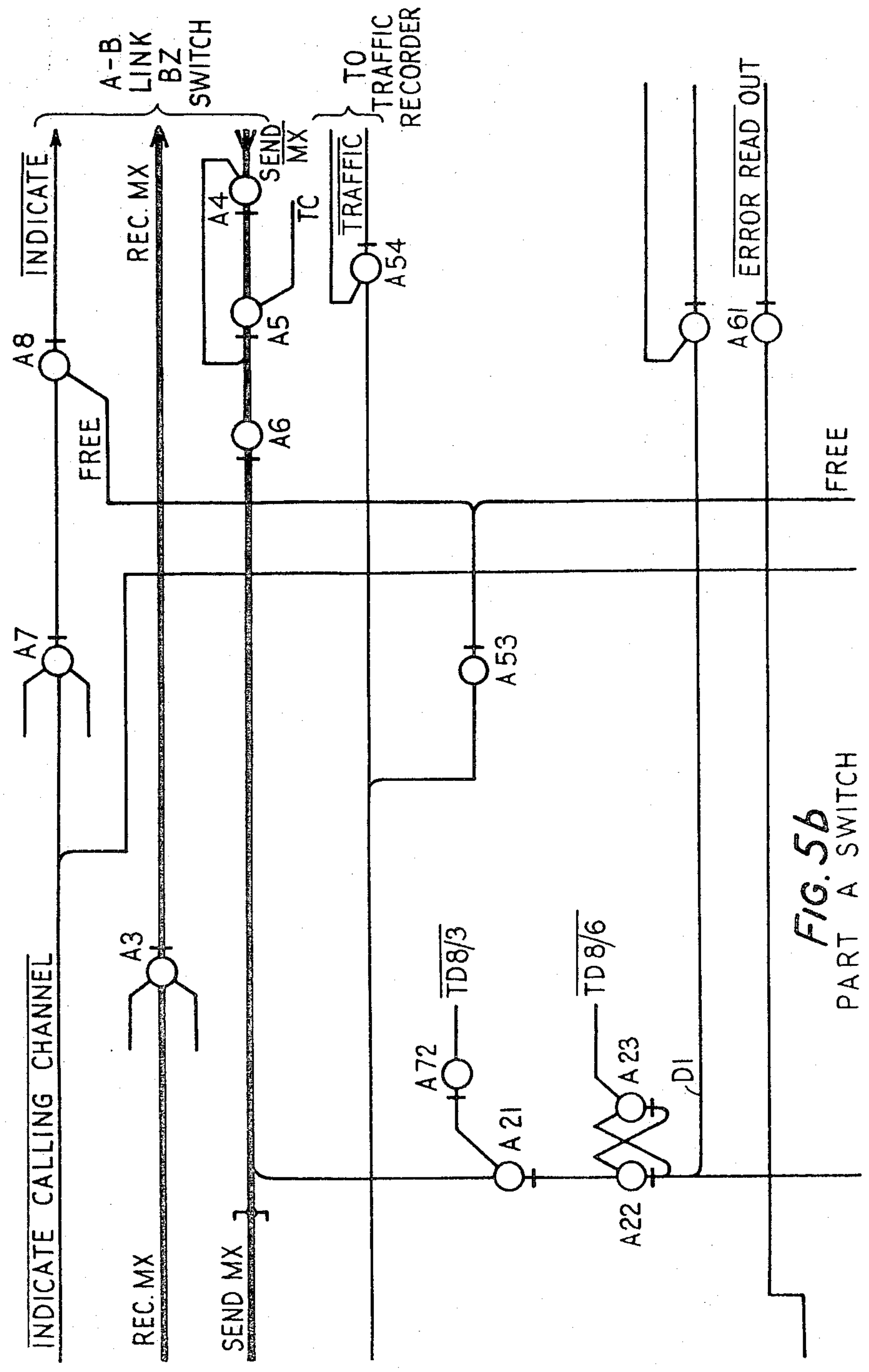
Figure 5C:
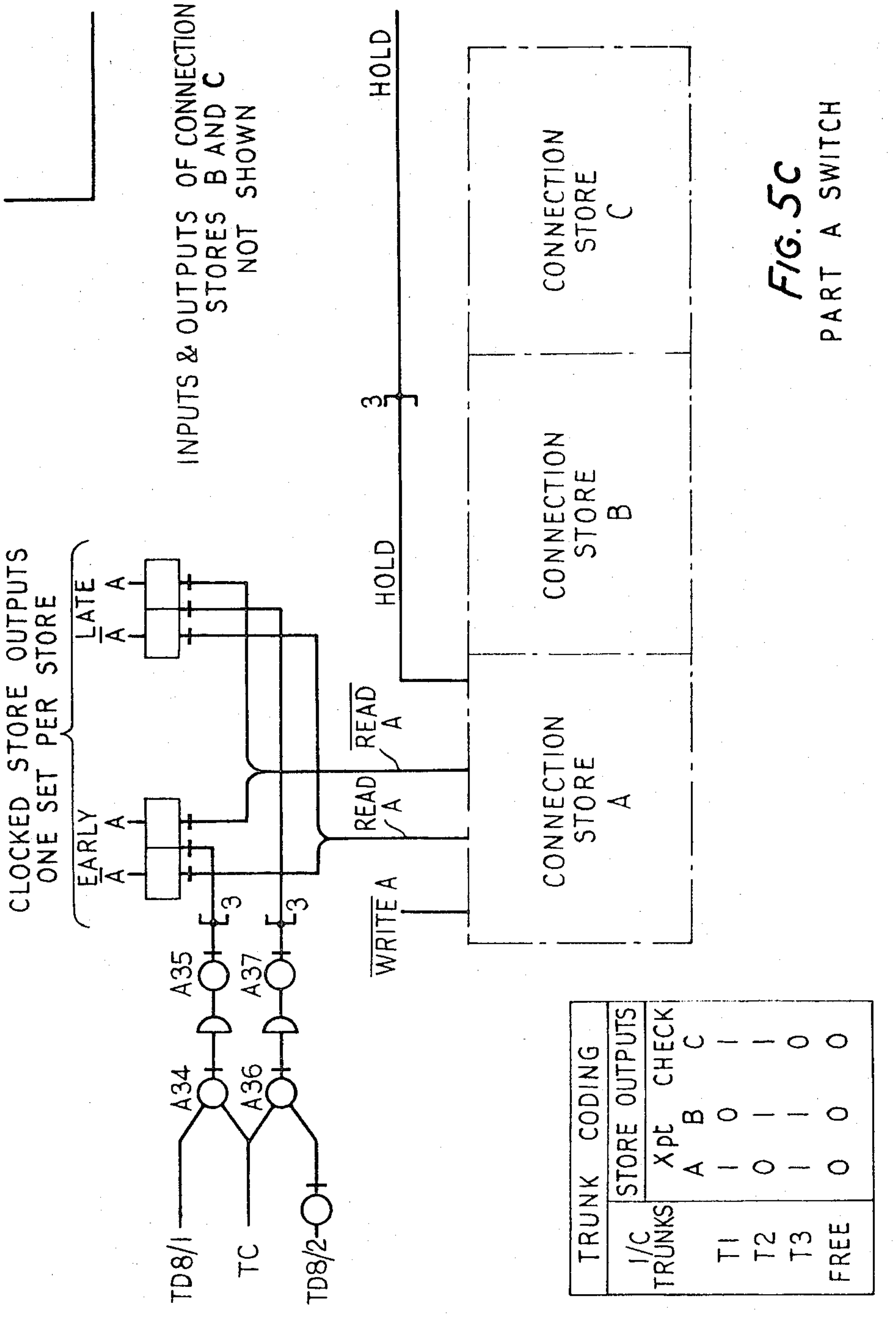
Figure 5D:
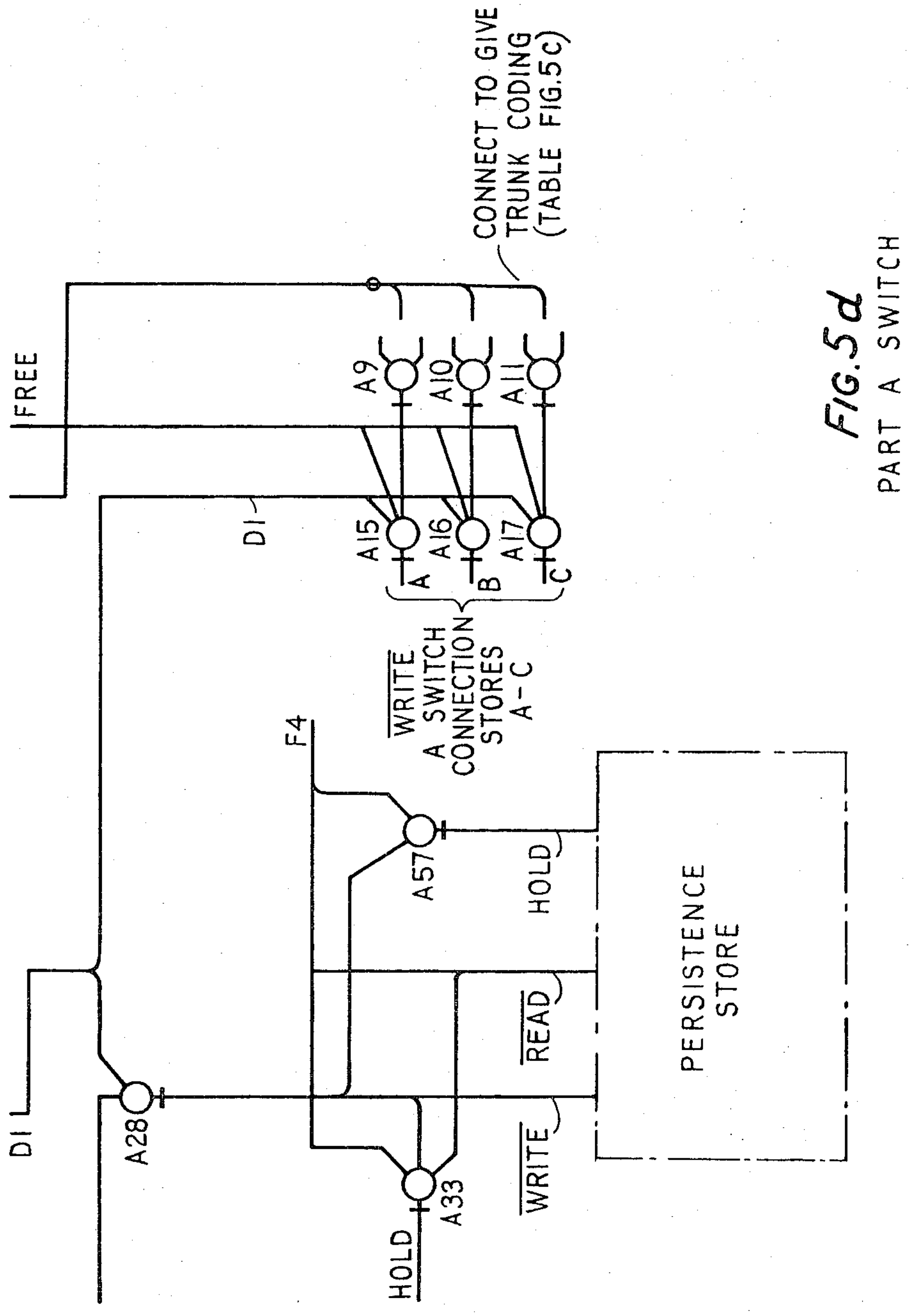
Figure 6A:
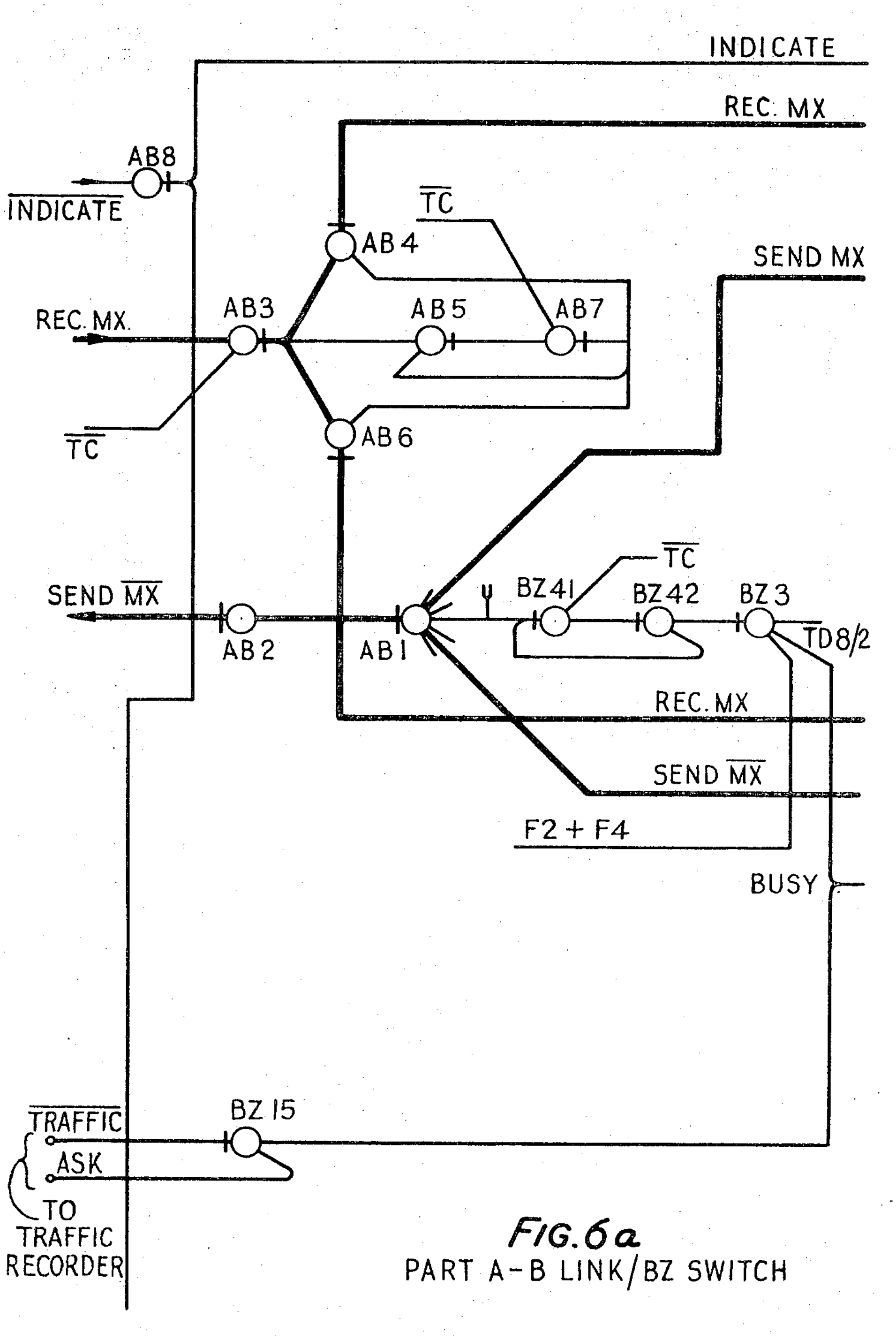
Figure 6B:
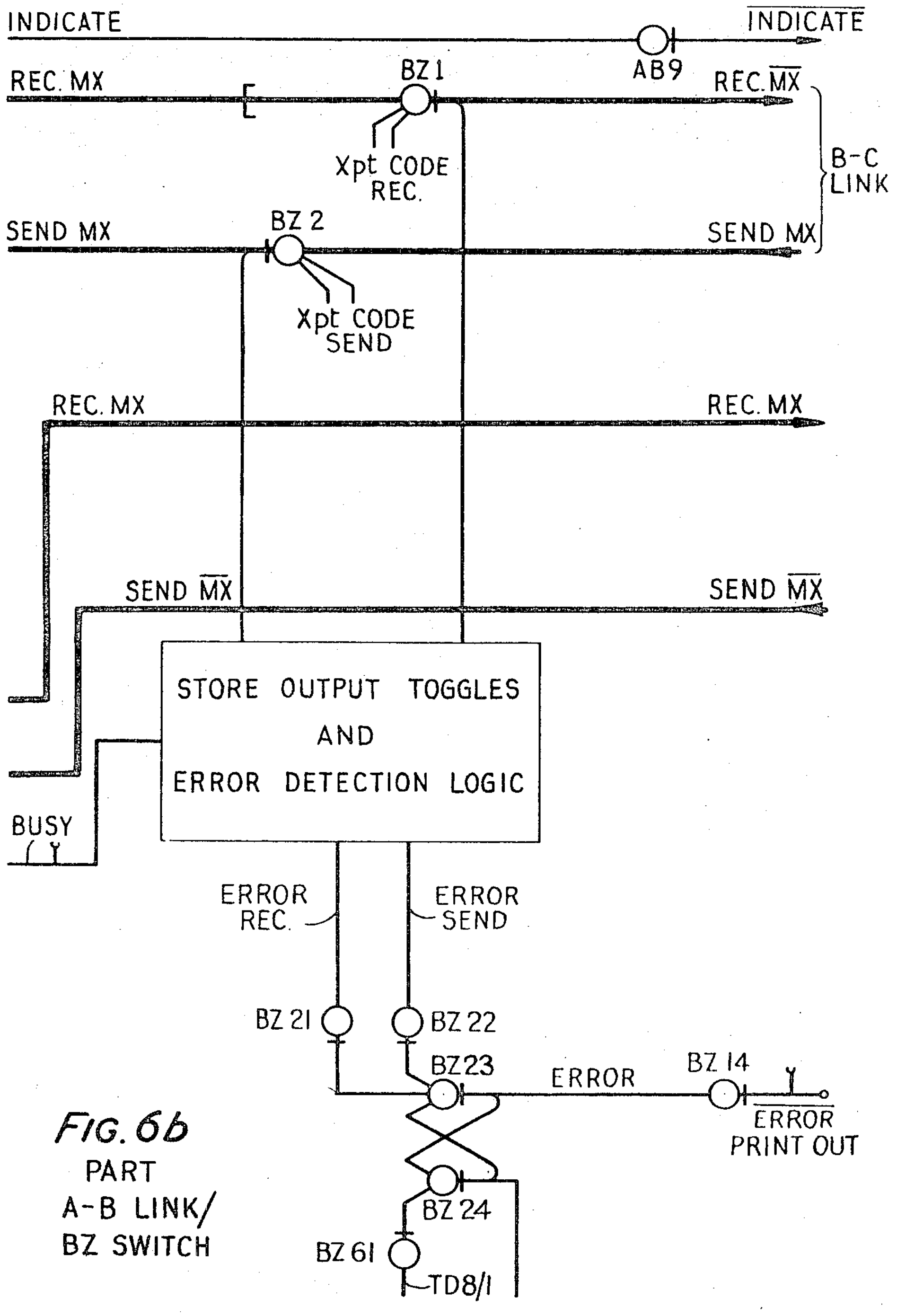
Figure 6C:
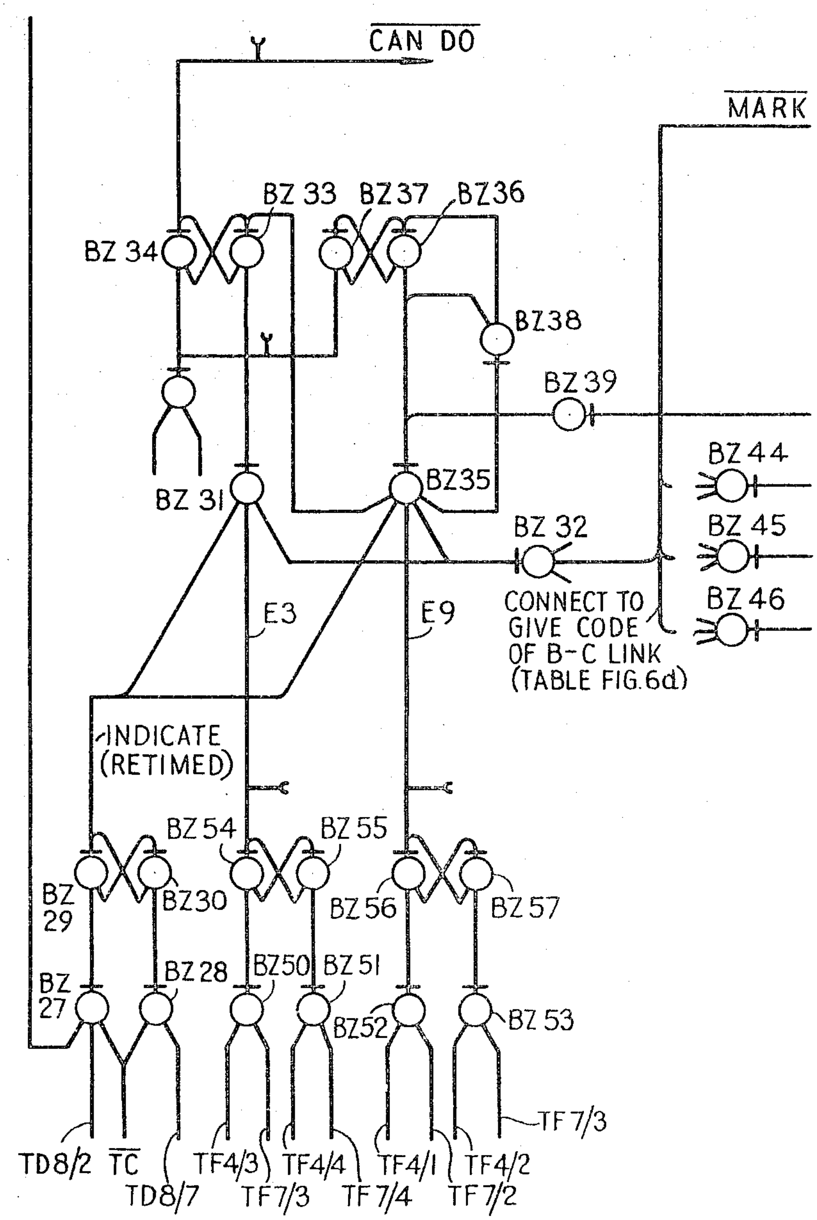
Figure 6D:
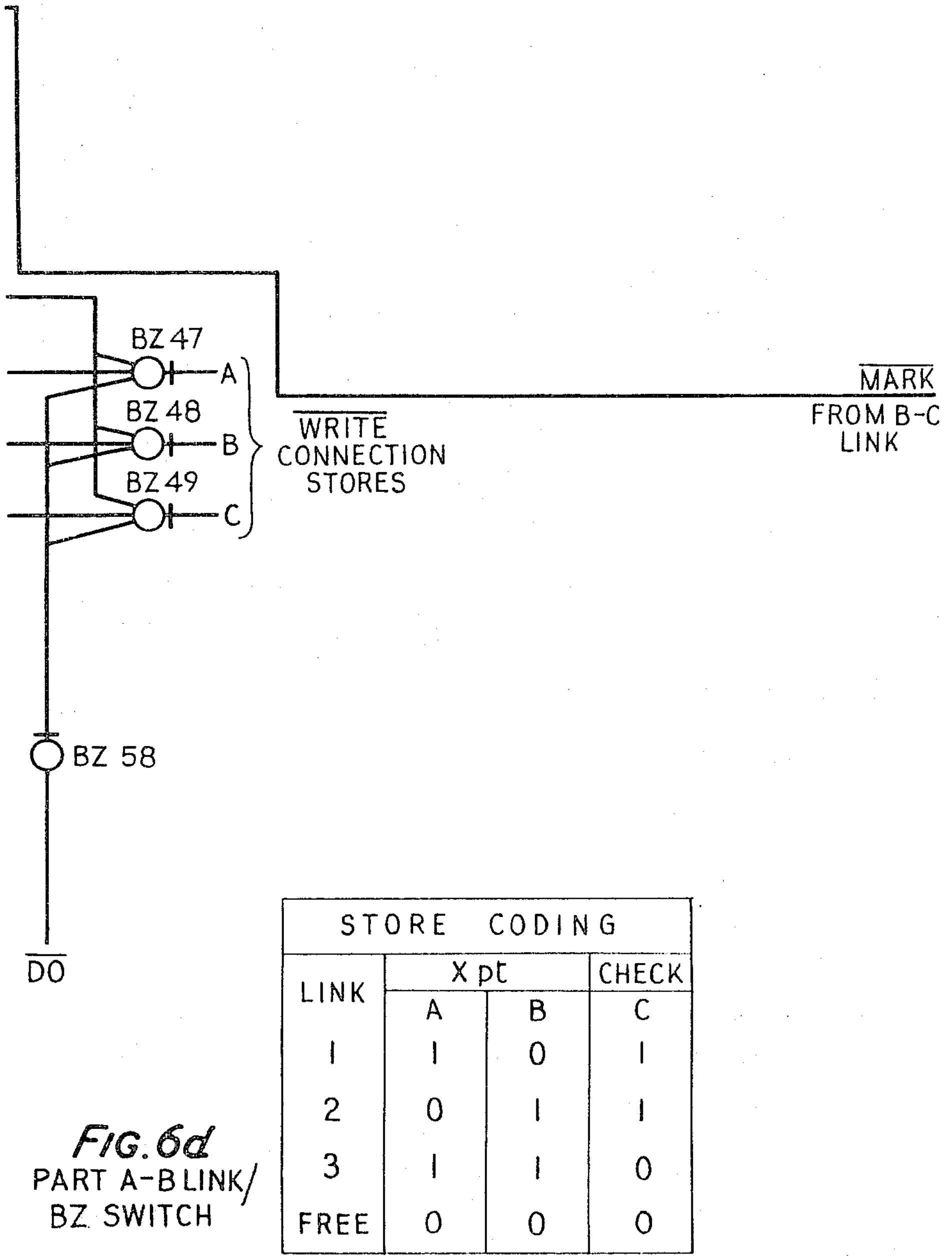
Figure 7A:
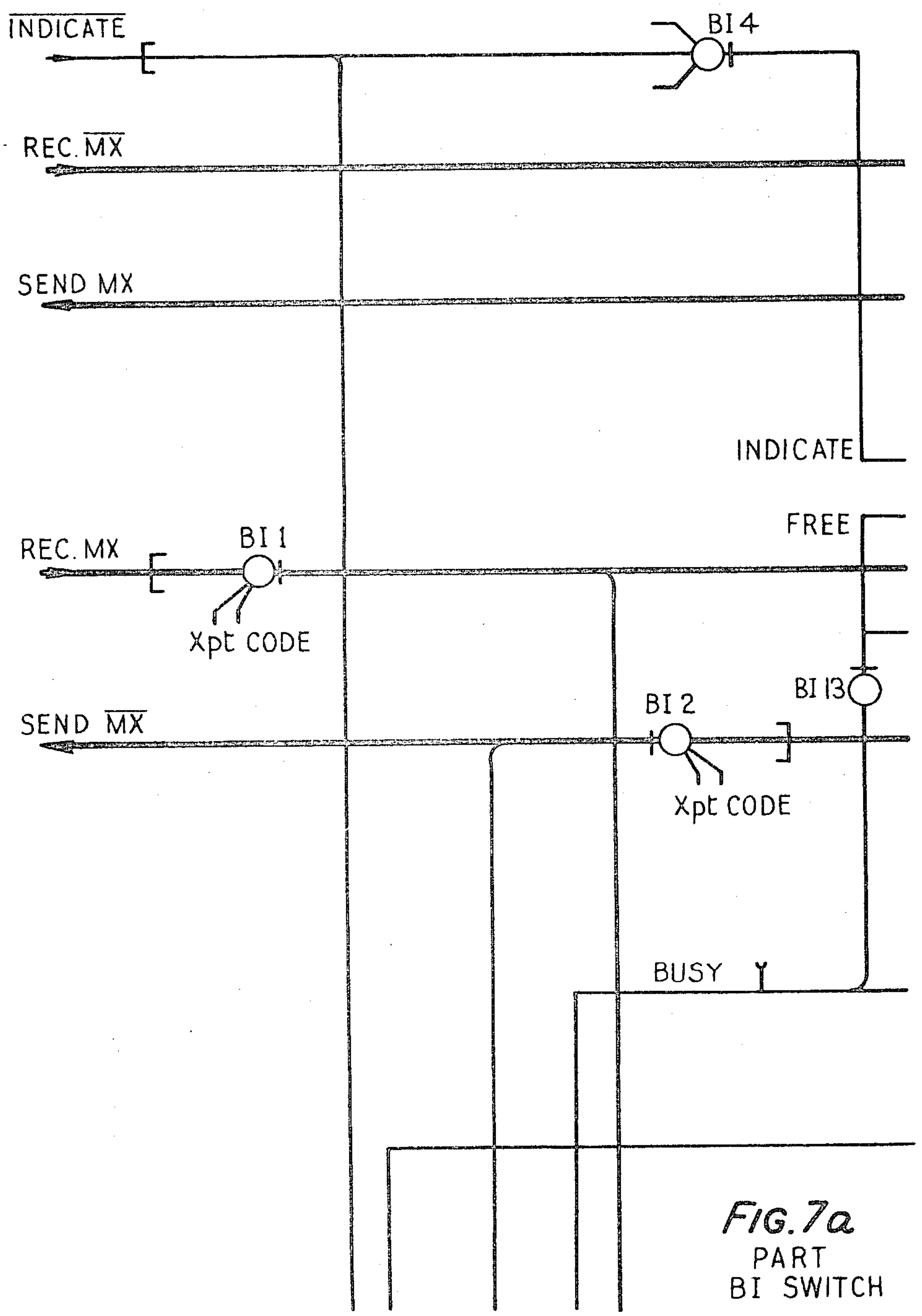
Figure 7B:
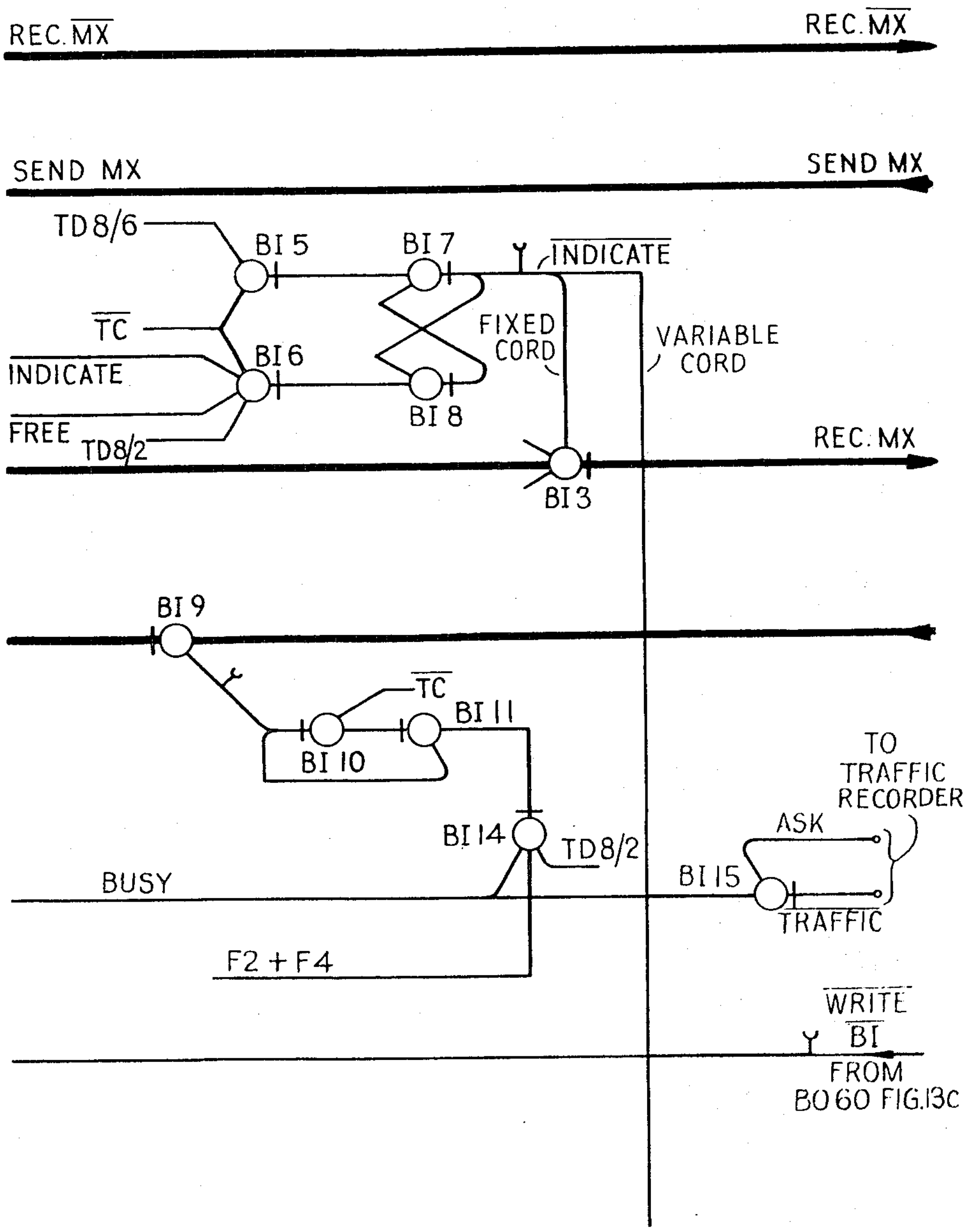
Figure 7C:
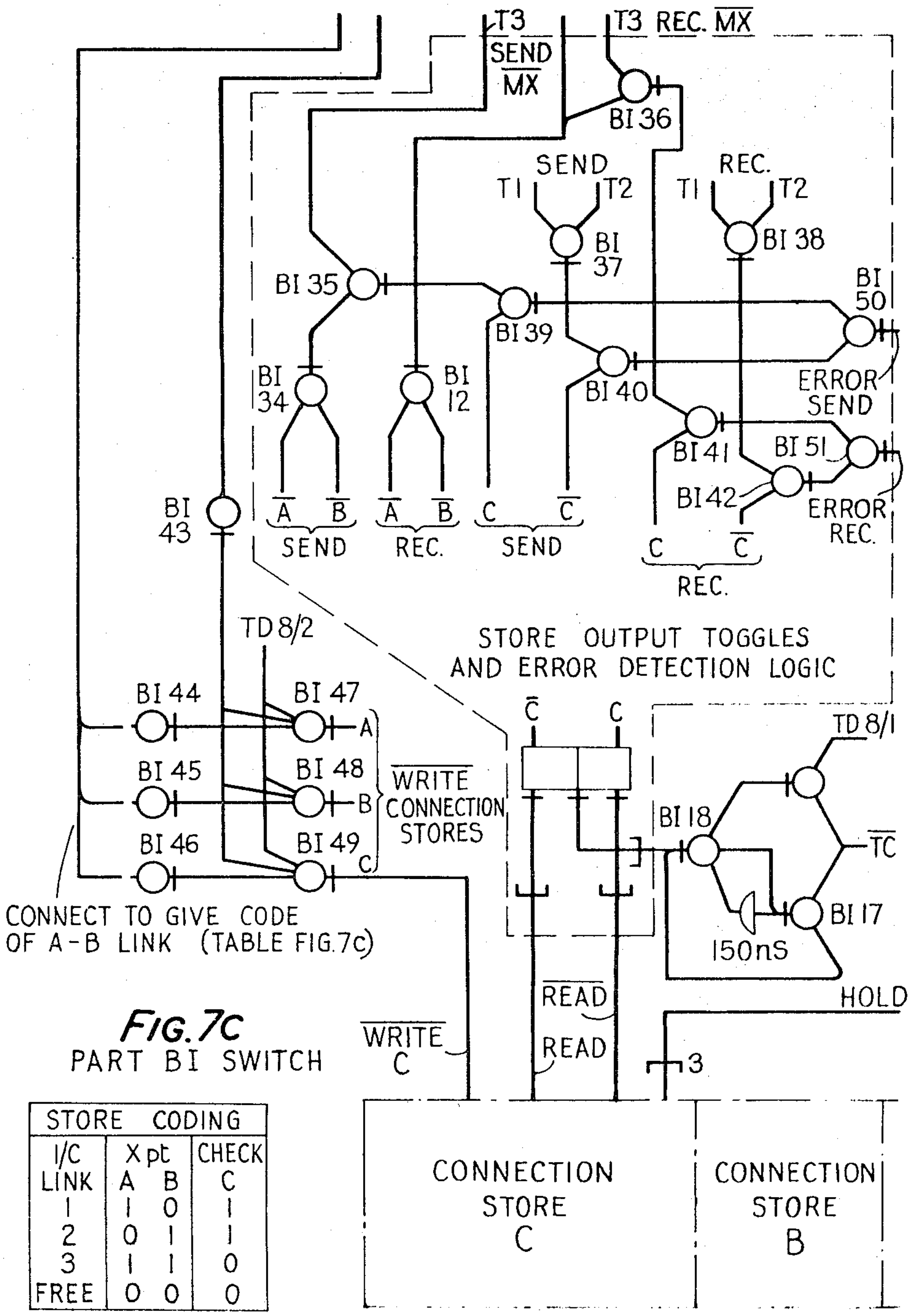
Figure 7D:
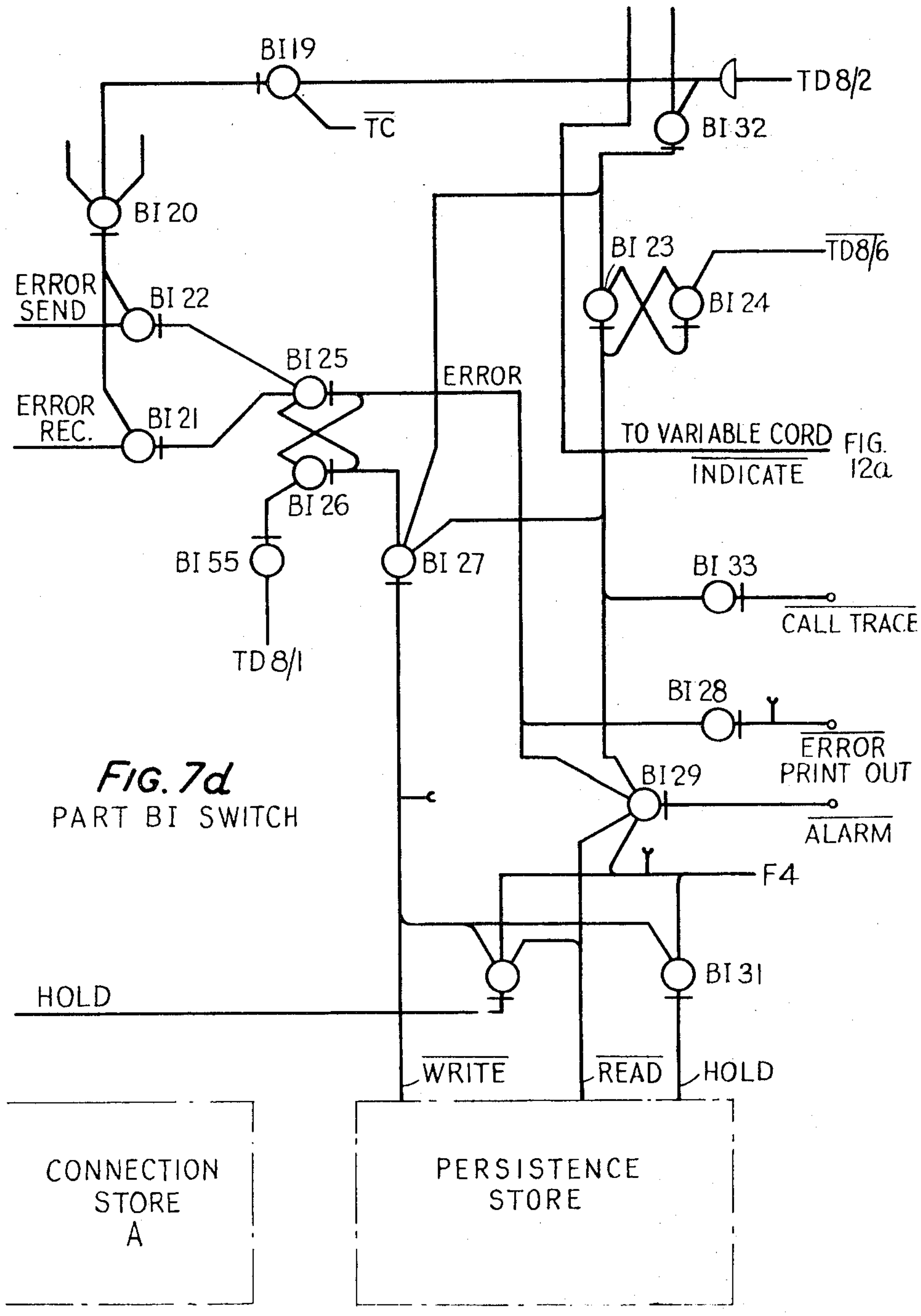
Figure 8A:
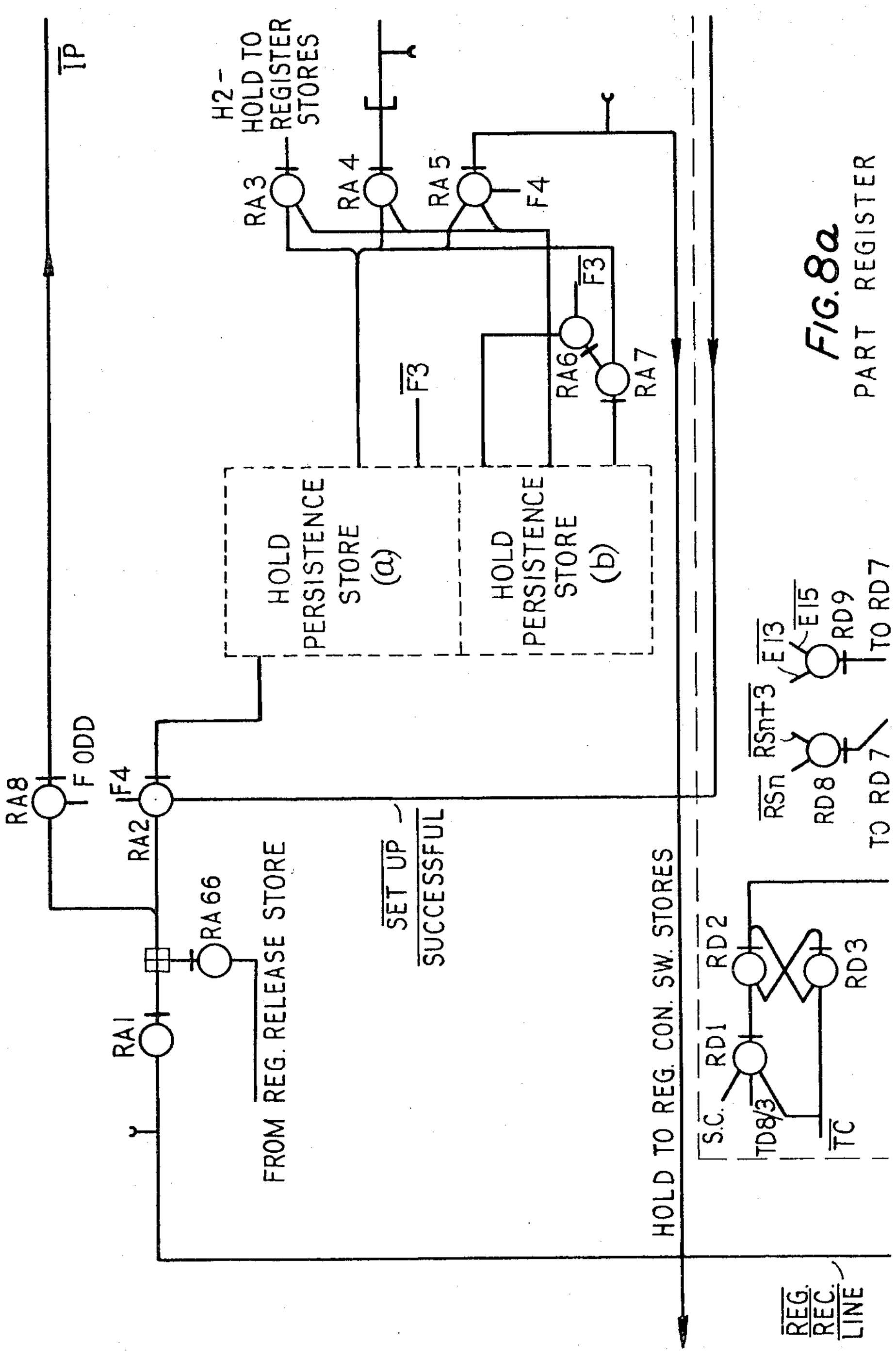
Figure 8C:
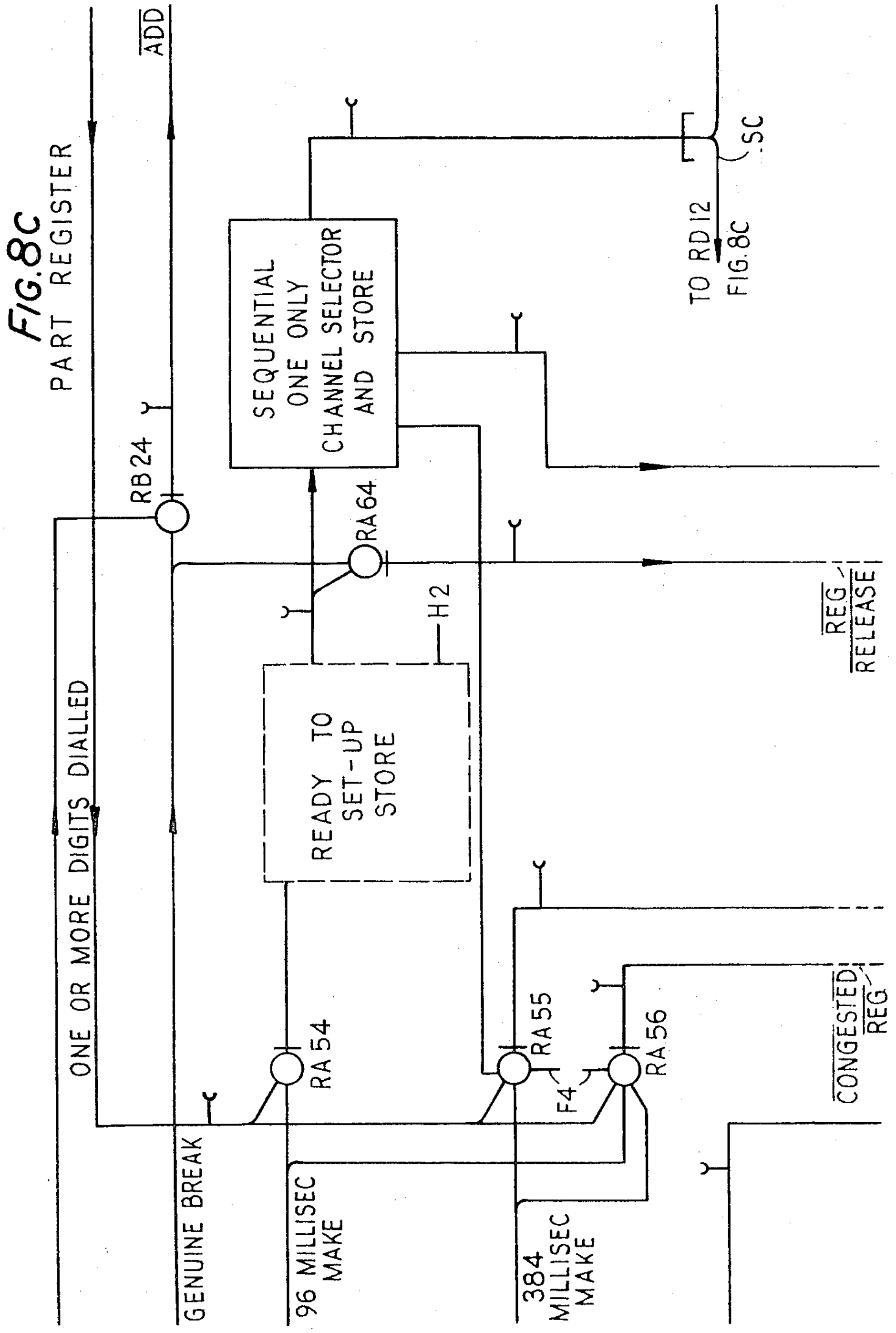
Figure 8E:
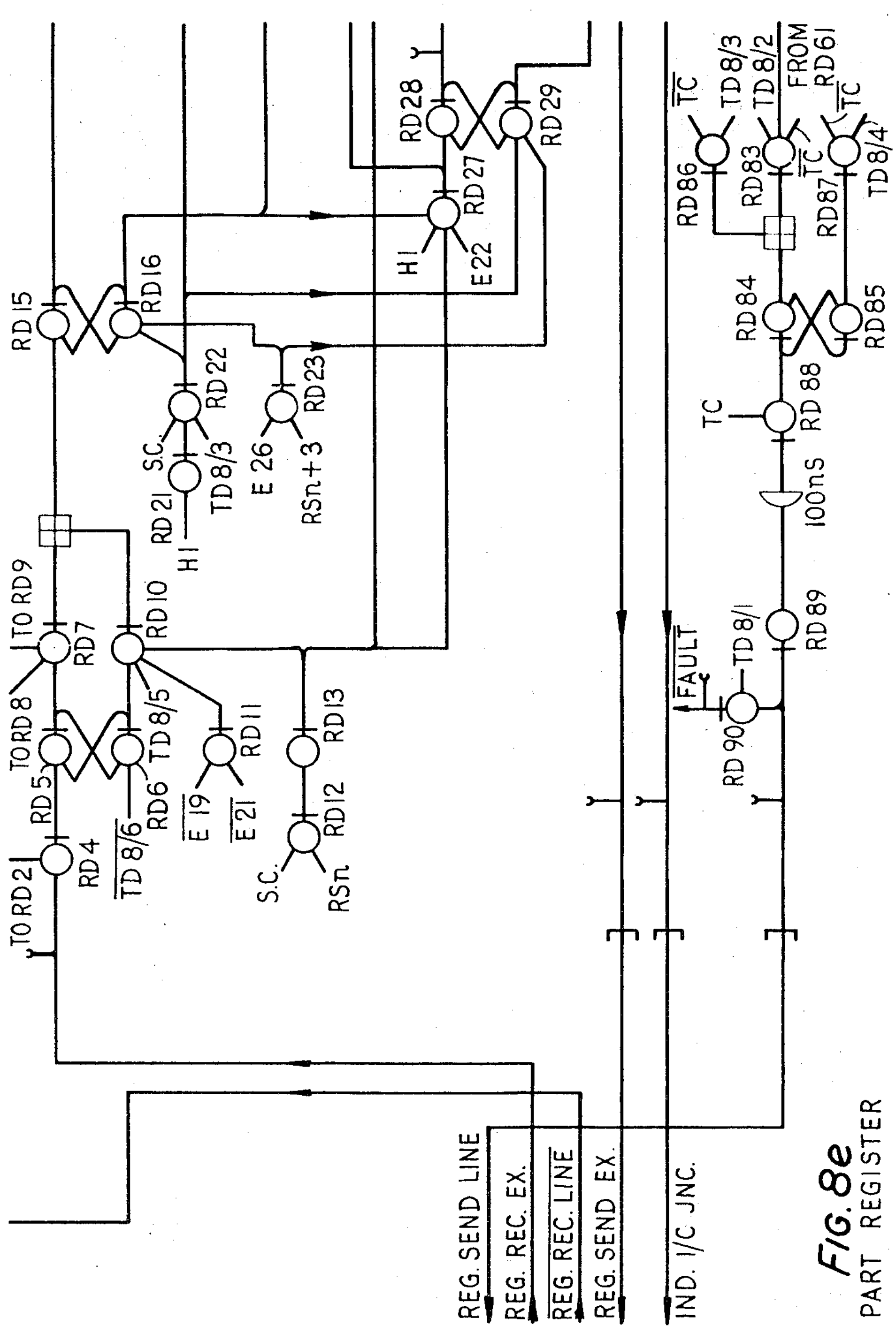
Figure 8F:
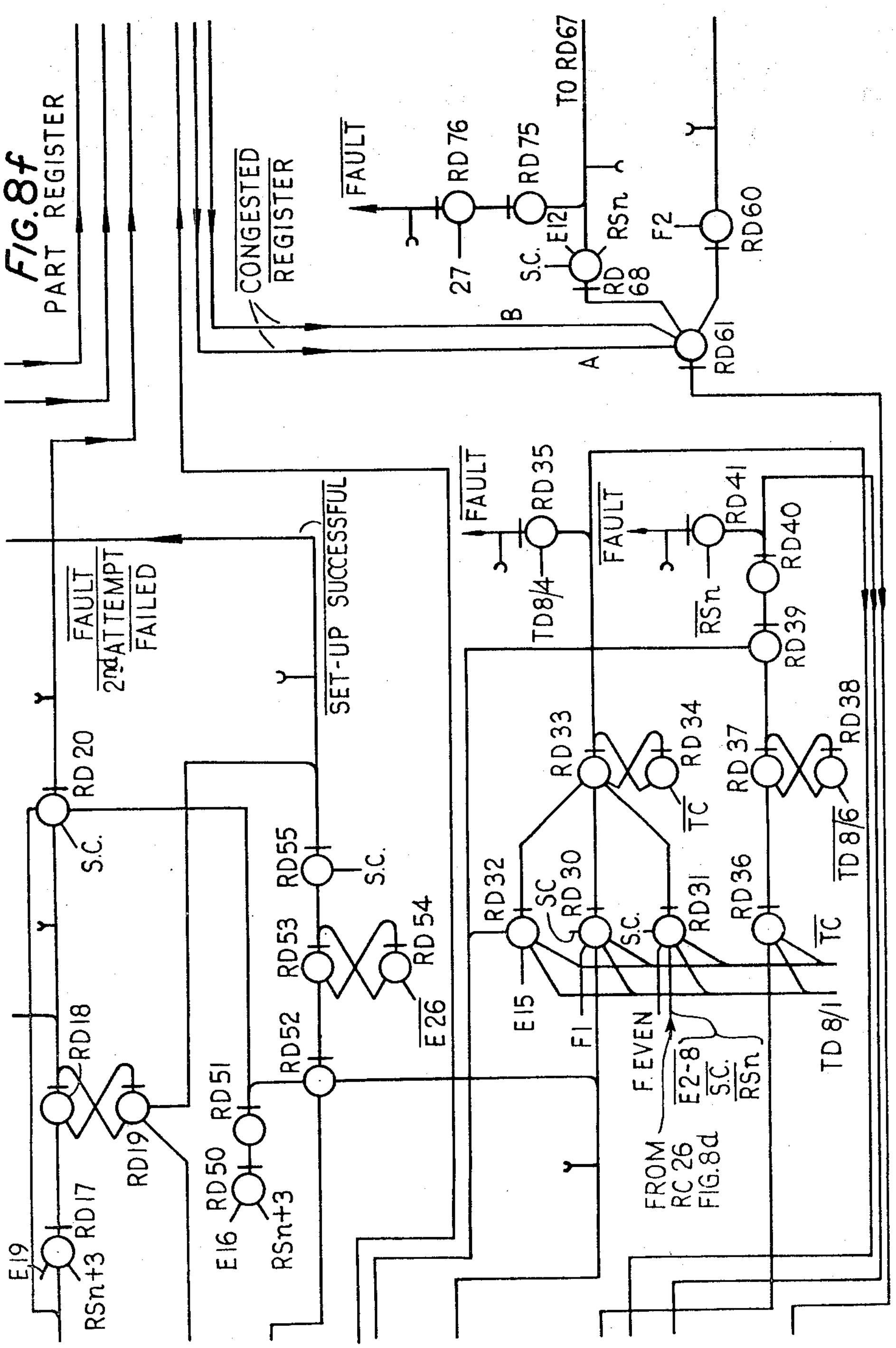
Figure 8G:
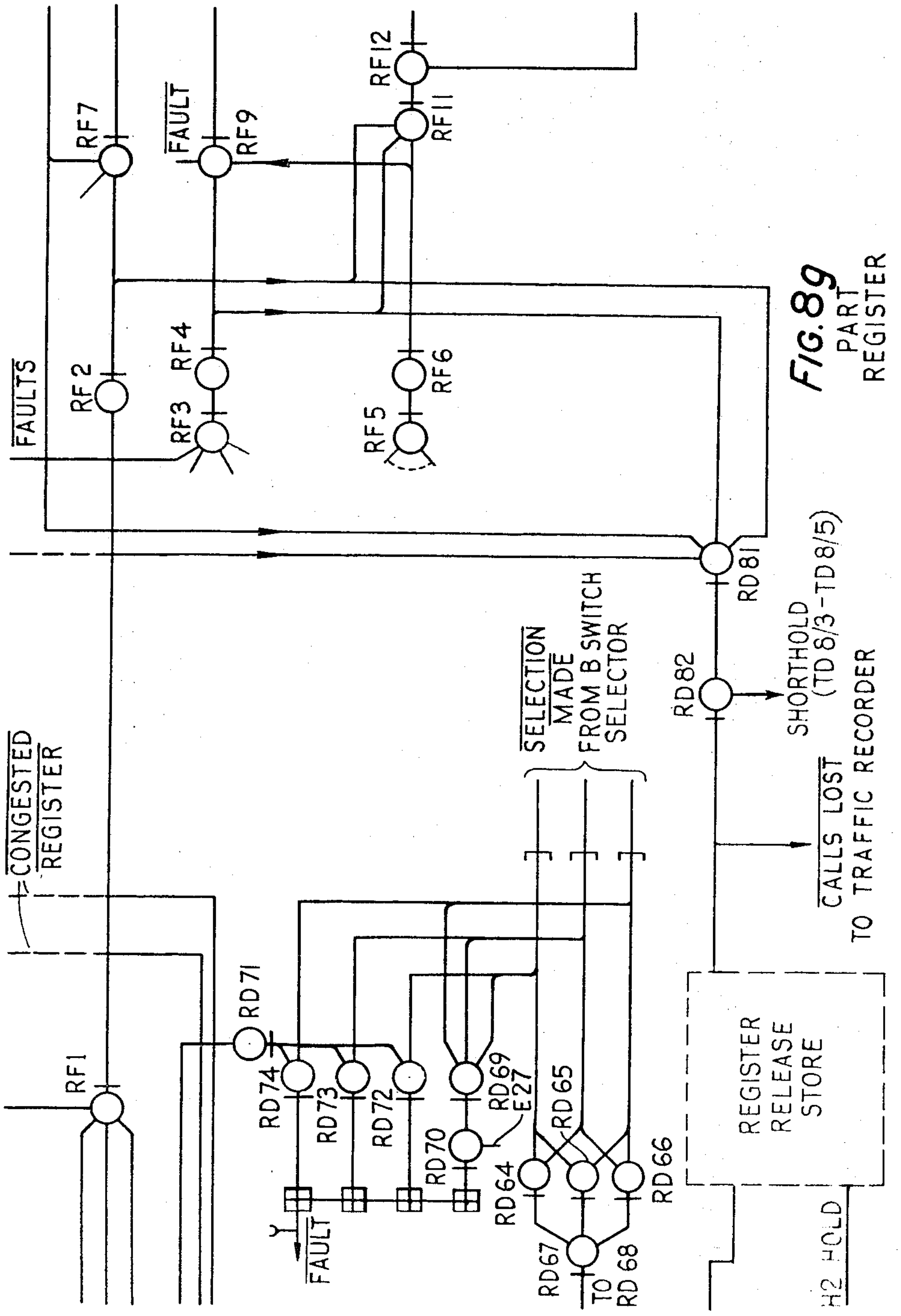
Figure 9:
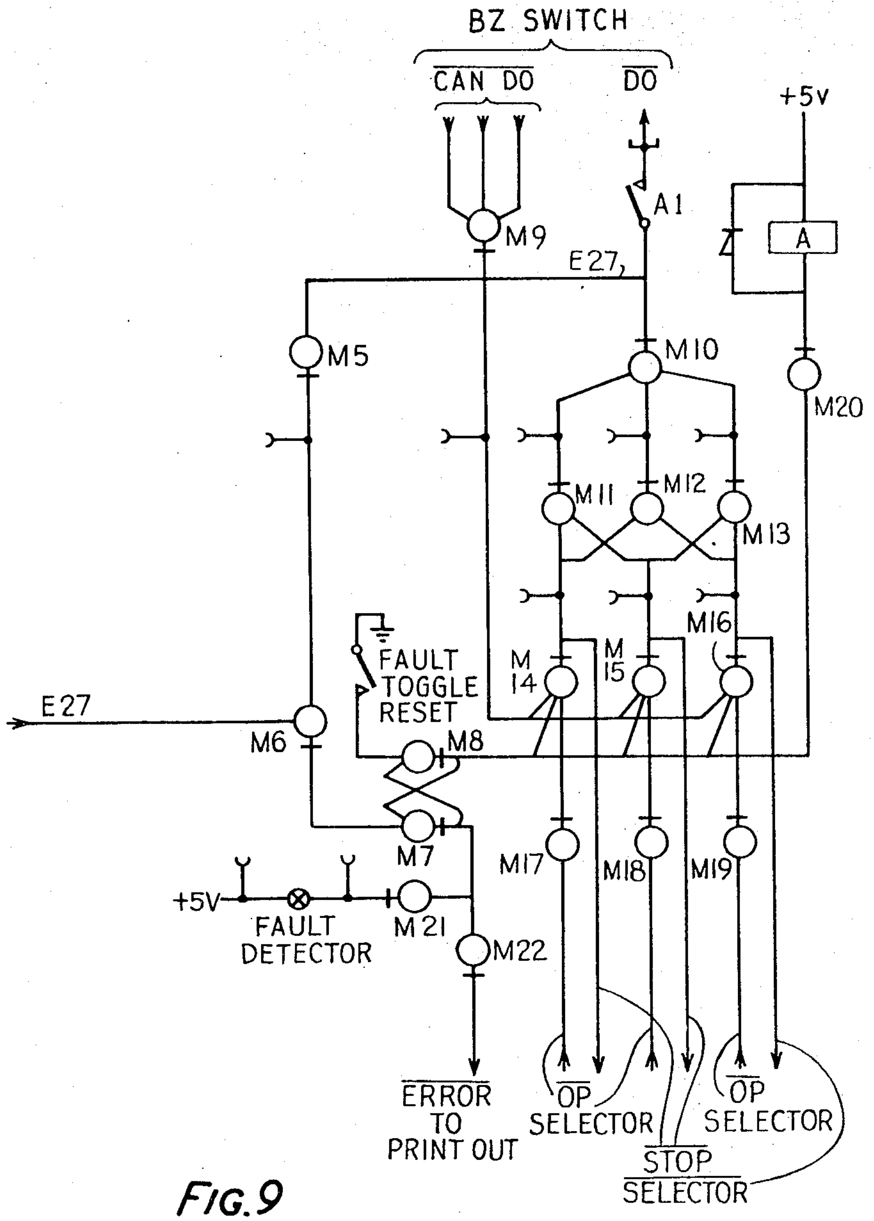
Figure 10:
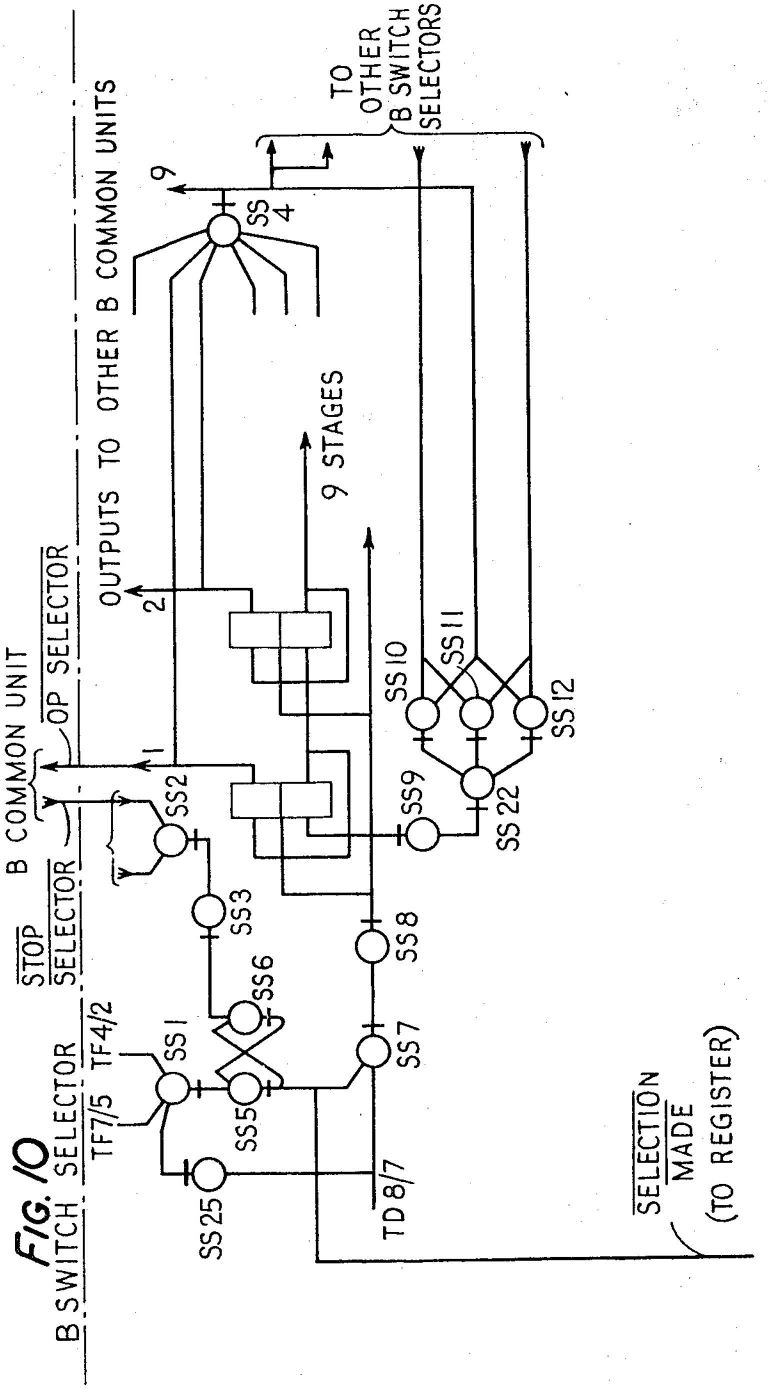

The A Switch (FIG. 5) the output Trunk T3 of cross-point A1 in the REC. multiplex is connected as input to gate A38. In accordance with the Coding Table shown on FIG. 5C, Trunk T3 is coded as A(1) HIgh, B(1) HIgh and C(O) Low The output of cross-point A1 is therefore low as input to gate A38. The output of which is high as input to gate A40. The other input to gate A40 is check digit C(0) Low which inhibits the gate to prevent an output to indicate an error.

If due to an error the cross-point code ABC(110) for Trunk T3, was changed to say 100, then the AB code 10 would operate cross-point A1 of Trunk 1, the low output of which is connected as input to gate A63, whose high output is connected as input to gate A65. The other input to gate A65 is $\overline{C}$ lead which for the O condition is high, so that gate A65 will open and provide a low output indicating an error.

Similar techniques are adopted at the other switches to detect errors.

RELEASE OF UNSUCCESSFUL ATTEMPT

If the first attempt to setup is unsuccessful the REGISTER will try again. It is desirable to steer this second attempt to a different path through the exchange SWITCHES and to a different outgoing channel.

The REGISTER can apply HOLD D1.(F2+F4) towards the exchange for all its active channels. Prior to setup this HOLD is disconnected by the A SWITCH cross-points i.e., until E.11. This HOLD maintains the connection BUSY during the period between first and second attempt and blocks the unsatisfactory path until the second attempt has been made. In order to release a first attempt, if say, the REGISTER inhibits D1 towards the exchange from E2 to E8. This covers the consecutive appearance of F4 and releases the B or C SWITCH STORES. The A SWITCH STORE release follows the release of BZ or BI SWITCH STORES. Since this does not BUSY the outgoing channel originally used during the selection frame E9 the BUSY STORE in the OUTGOING TRUNK UNIT is arranged to clear only during E16.

PATH READ OUT

If the REGISTER test for CIRCUIT FREE is satisfactory the INDICATE *i/c* CHANNEL is inhibited at gate RD39 from E22 until the end of the scanning period. If not, the set up is unsuccessful and it is desired to print out the details of the unsatisfactory attempt.

During E23 the PATH READER interrogates the common point of the INDICATE paths in the *i/c* TRUNK UNIT at gate IT16. If a channel pulse is returned it implies an unsuccessful attempt. The returned channel and the identity of the *i/c* TRUNK UNIT is passed to the PRINT STATICIZER and a signal is produced to interrogate the B SWITCHES and the *o/g* TRUNK UNITS during E24. The identity of the selected B SWITCH, selected CORD, and marked *o.g.* TRUNK UNITS is returned and passed to the PRINT STATICIZER The identity of the REGISTER is deduced from the REG.SCAN PERIOD in which this occurs so that the identity of the REGISTER can also be STATICIZED.

A failure to set up thus results in a message being printed out giving the REGISTER, calling channel, *i/c* TRUNK UNIT, B SWITCH, CORD and wanted *o/g* ROUTE.

We claim:

1. A time division multiplex switching system comprising in combination a plurality of pulse code modulated communication channels, a plurality of communication paths each incorporating a fixed time delay, some at least of the fixed time delays being of different values including zero, each path having an input and an output, first switching means interconnecting at least some of said communication channels with the inputs of said paths, second switching means interconnecting at least the remainder of said communication channels with the outputs of said paths, channel pulse time indicating connections from said at least some of said communication channels to said inputs, said indicating connections bypassing said first switching means, channel pulse time comparison means connected to said outputs and to at least the remainder of said communication channels, selecting means responsive to said channel pulse time comparison means for selecting a communication path, and further means for operating said first and second switching means to place a path selected by said selecting means in communication with channels to be placed in communication one with another.

2. A system as claimed in claim 1 and further comprising additional communication paths each incorporating a variable time delay, means for determining the delay to be imposed by said variable time delays, and, in said selecting means, precedent means for ensuring selection, as a first preference, a communication path of zero time delay, as a second preference a communication path having a fixed time delay other than zero, and, as a third preference, a communication path having a variable time delay.

3. A system as claimed in claim 1 in which some of said pulse code modulated communication channels are divided into a number of first pulse code modulated communication subsystems, the remainder of said pulse code modulated communication channels are divided into a number of second pulse code modulated communication subsystems, the channels in a subsystem being numbered sequentially, said system further comprising incoming and outgoing trunk units, each incoming trunk unit being connected to the even-numbered channels only of one of said first subsystems and to the odd-numbered channels of another of said first subsystems, each incoming trunk unit also being connected to said first switching means, each outgoing trunk unit being connected to the even-numbered channels of one of said second subsystems and to the odd-numbered channels of another of said second subsystems, said outgoing trunk units also being connected to said second switching means.

4. A system as claimed in claim 1 in which said first switching means comprises switching means interconnecting said at least some of said communication channels with the inputs of communication paths incorporating zero time delay and with further switching means connected to the inputs of communication paths incorporating time delays of fixed values other than zero.

5. A system as claimed in claim 2 in which the first switching means comprises first channel switching means interconnecting said at least some of said communication channels with the inputs of communication paths incorporating zero time delay and with second channel switching means connected to the inputs of communication paths incorporating time delays of fixed values other than zero and connected to the inputs of communication paths incorporating variable time delay.

6. A system as claimed in claim 4 in which said second switching means comprises third channel switching means connected to the outputs of communication paths incorporating zero time delay, fourth channel switching means connected to the outputs of communication paths incorporating time delays of values other than zero, said second switching means also comprising fifth channel switching means interconnected between said third and fourth channel switching means and said remainder of said communication channels.

7. A system as claimed in claim 1 and further comprising at least one register and register switching means for connection of a register to a communication channel.

8. A system as claimed in claim 7 and further comprising a translator and connections from each register to said translator.

* * * * *